United States Patent
Nagatoshi et al.

(10) Patent No.: US 8,270,092 B2
(45) Date of Patent: Sep. 18, 2012

(54) ZOOM LENS FOR PROJECTION AND PROJECTION-TYPE DISPLAY APPARATUS

(75) Inventors: Yukiko Nagatoshi, Saitama (JP); Hiroshi Yamada, Saitama (JP); Akiko Nagahara, Saitama (JP)

(73) Assignee: Fujifilm Corporation, Tokyo (JP)

( * ) Notice: Subject to any disclaimer, the term of this patent is extended or adjusted under 35 U.S.C. 154(b) by 149 days.

(21) Appl. No.: 12/978,947

(22) Filed: Dec. 27, 2010

(65) Prior Publication Data
US 2011/0157716 A1 Jun. 30, 2011

(30) Foreign Application Priority Data

Dec. 28, 2009 (JP) .................................. 2009-299001
Jun. 10, 2010 (JP) .................................. 2010-132786

(51) Int. Cl.
*G02B 15/14* (2006.01)
(52) U.S. Cl. ....................................... 359/682; 359/680
(58) Field of Classification Search .................. 359/680, 359/681, 682
See application file for complete search history.

(56) References Cited

U.S. PATENT DOCUMENTS

| 7,522,348 | B2 | 4/2009 | Nagahara | |
|---|---|---|---|---|
| 7,710,659 | B2 * | 5/2010 | Nagatoshi | ...................... 359/682 |
| 8,179,606 | B2 * | 5/2012 | Amano | .......................... 359/649 |
| 8,223,435 | B2 * | 7/2012 | Amano | .......................... 359/649 |

FOREIGN PATENT DOCUMENTS

| JP | 2008-293932 | 12/2008 |
|---|---|---|
| JP | 2008-312145 | 12/2008 |

* cited by examiner

*Primary Examiner* — David N Spector
(74) *Attorney, Agent, or Firm* — Young & Thompson

(57) ABSTRACT

A zoom lens for projection includes a first negative lens group, a second positive lens group, a third positive lens group, a fourth lens group, and a fifth positive lens group, which are sequentially arranged from the magnification side of the zoom lens. The first lens group and the fifth lens group are fixed, and the second lens group, the third lens group and the fourth lens group move along the optical axis of the zoom lens when magnification of the zoom lens is changed. Each of the first lens group and the second lens group is composed of two lenses. Each of the third lens group and the fifth lens group is composed of a positive lens, and the fourth lens group is composed of five lenses. Further, the reduction side of the zoom lens is telecentric.

18 Claims, 37 Drawing Sheets

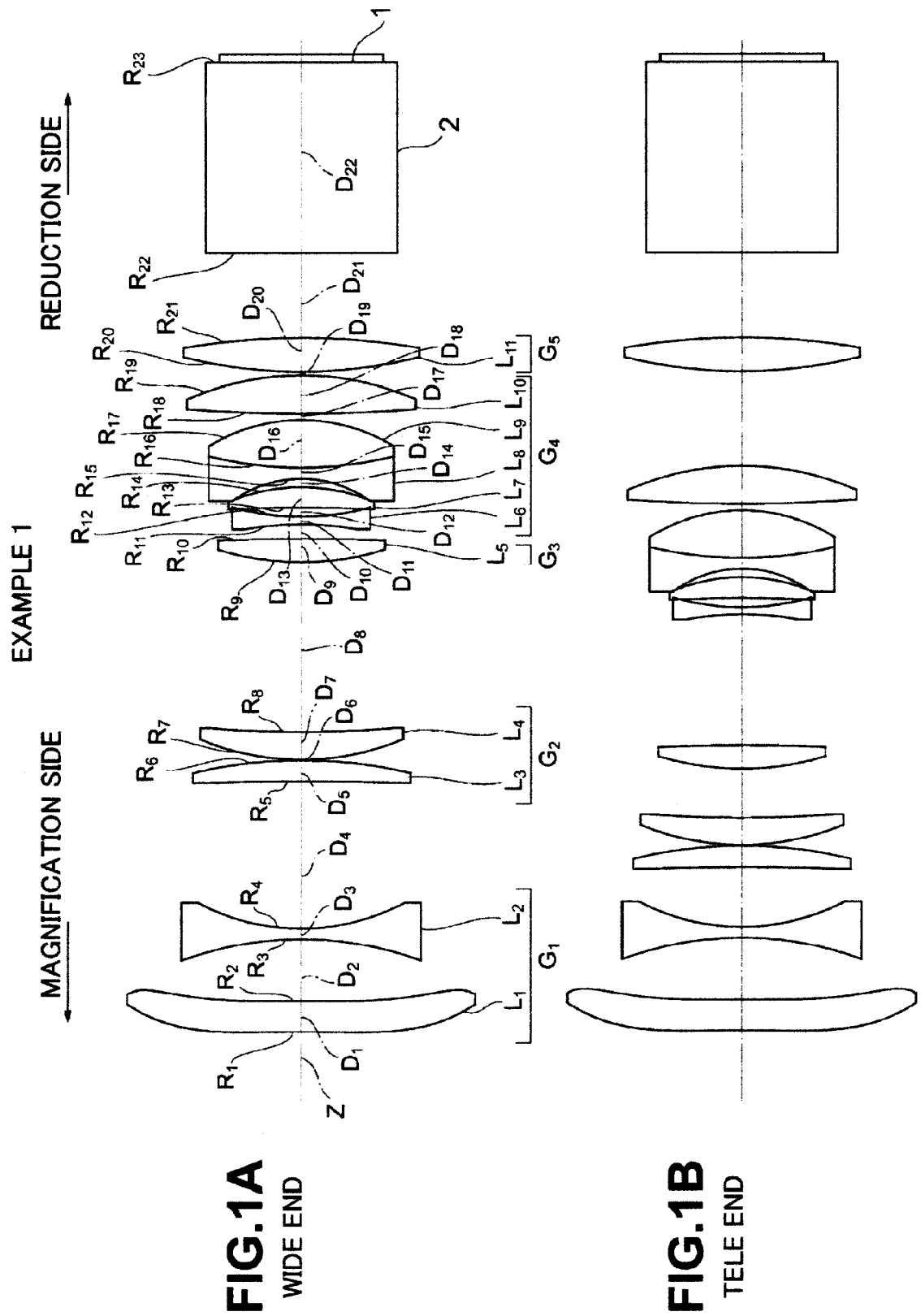
FIG.1A WIDE END
FIG.1B TELE END

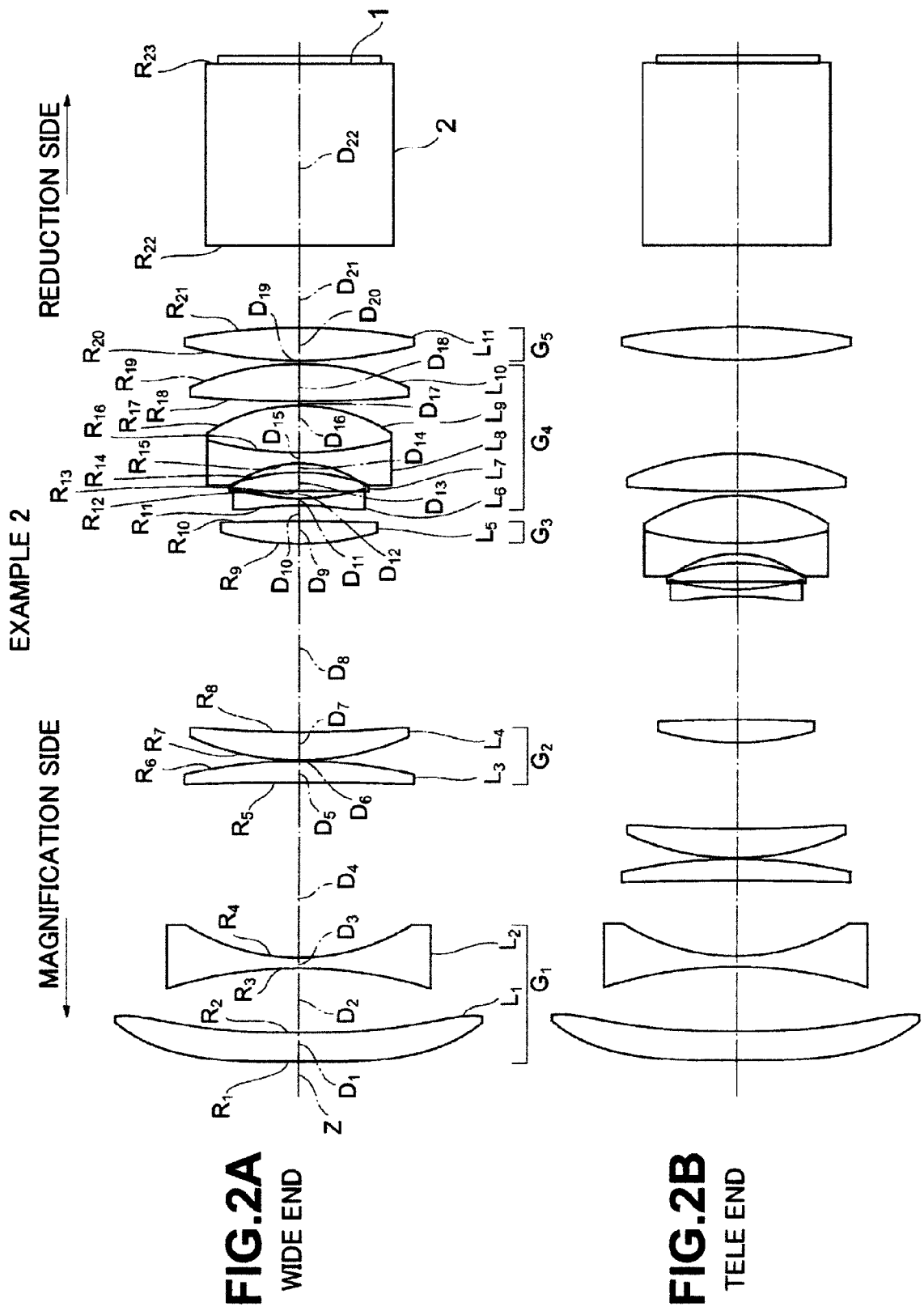
FIG.2A WIDE END
FIG.2B TELE END

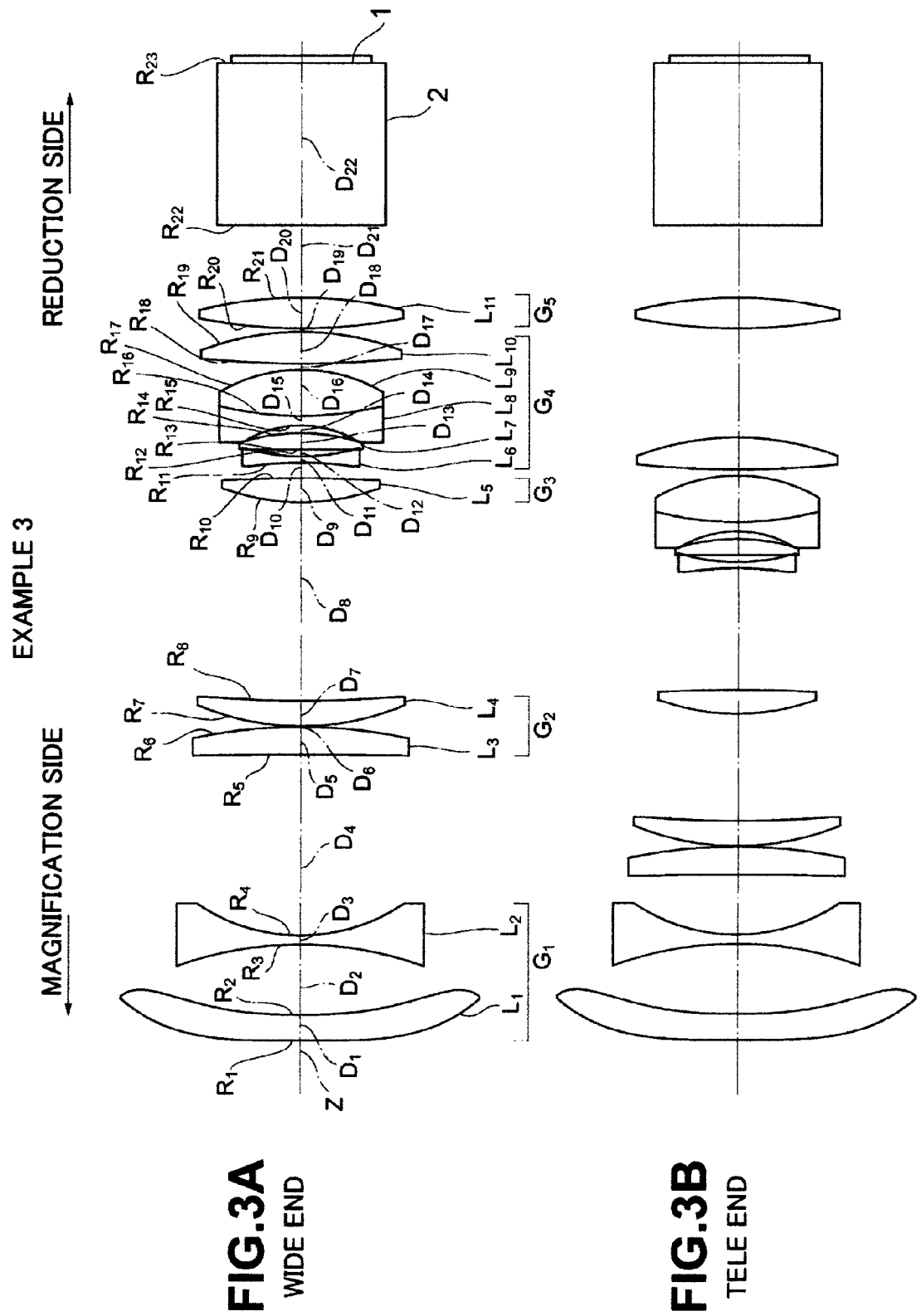
FIG.3A WIDE END
FIG.3B TELE END

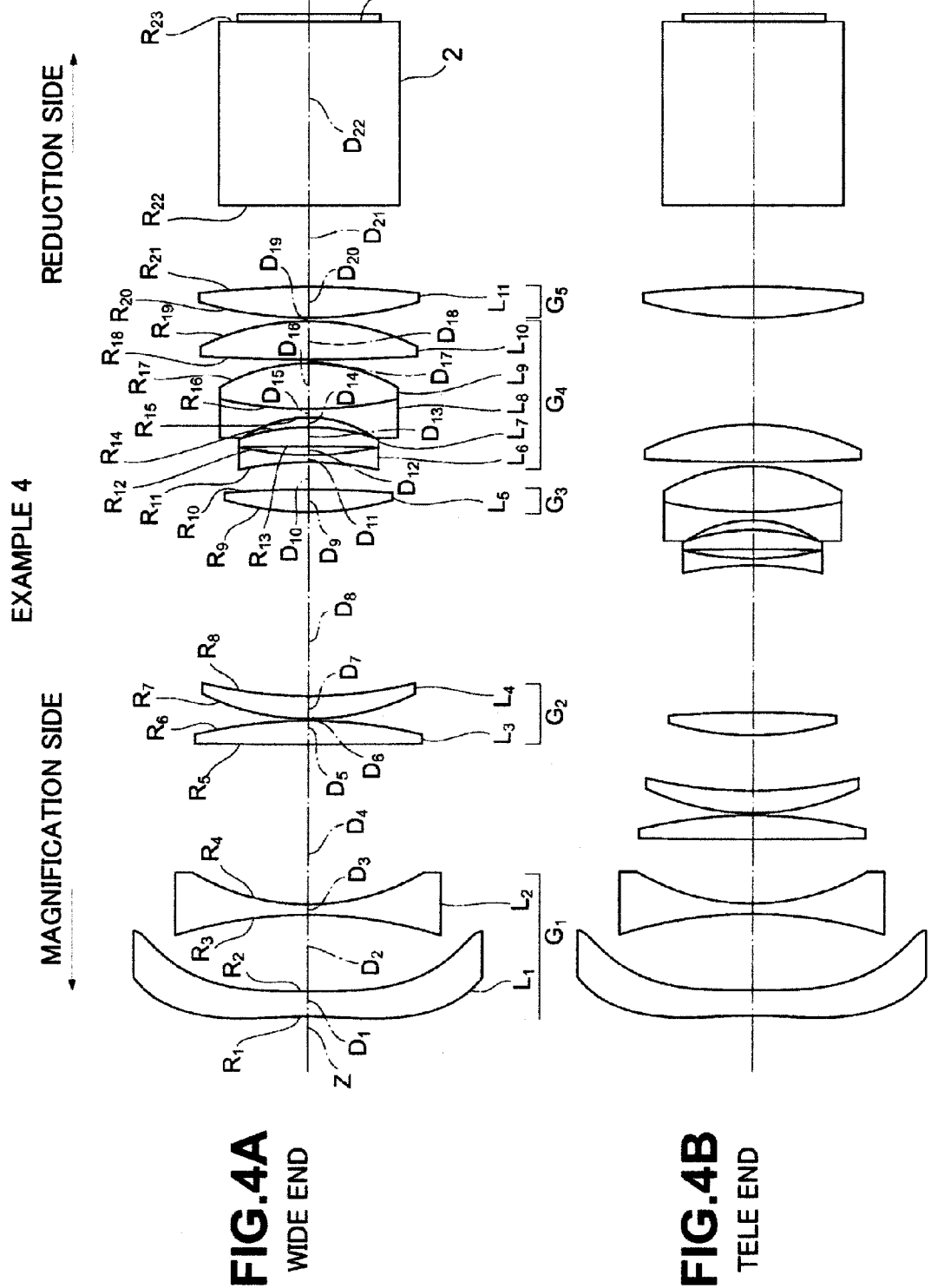

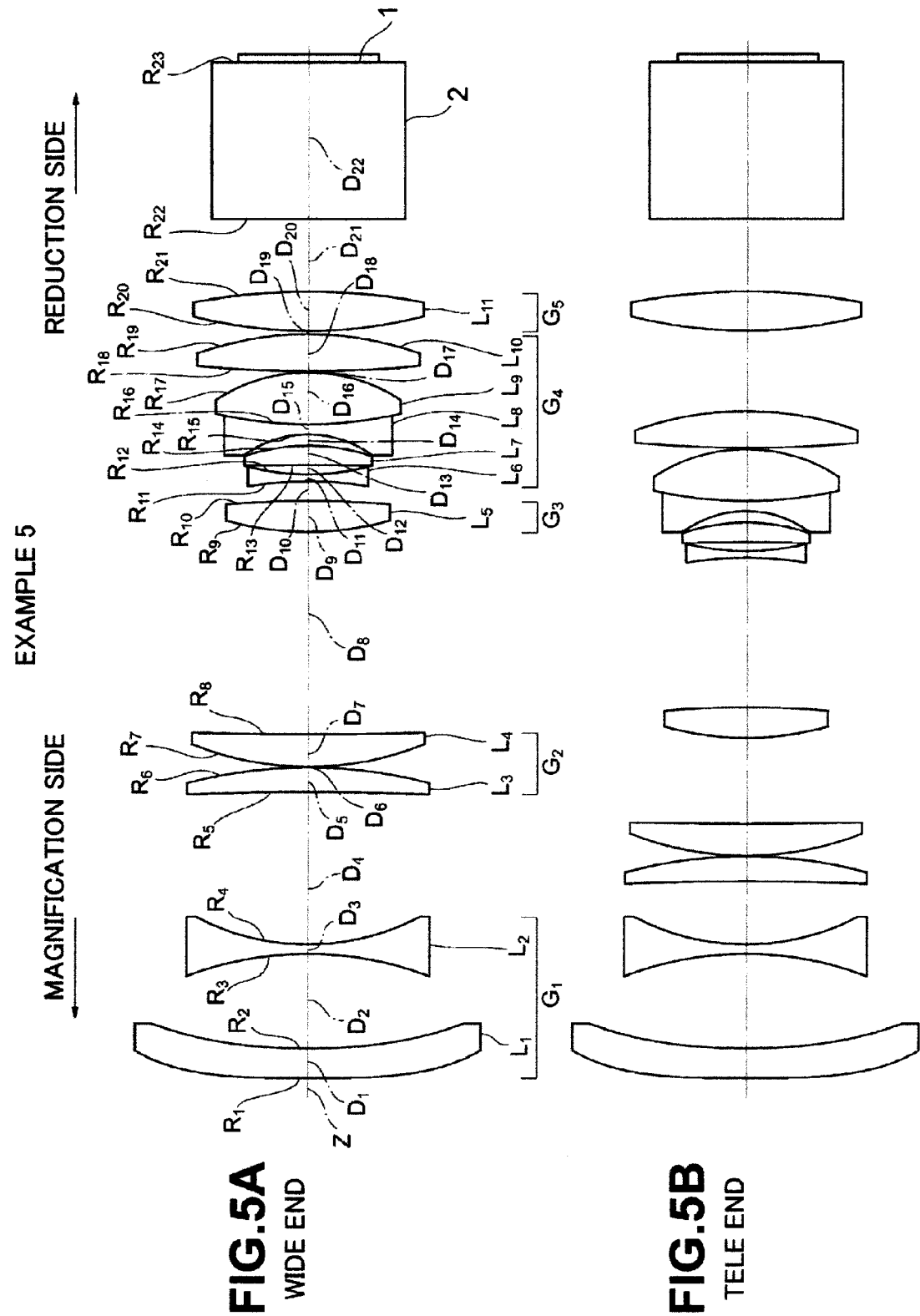

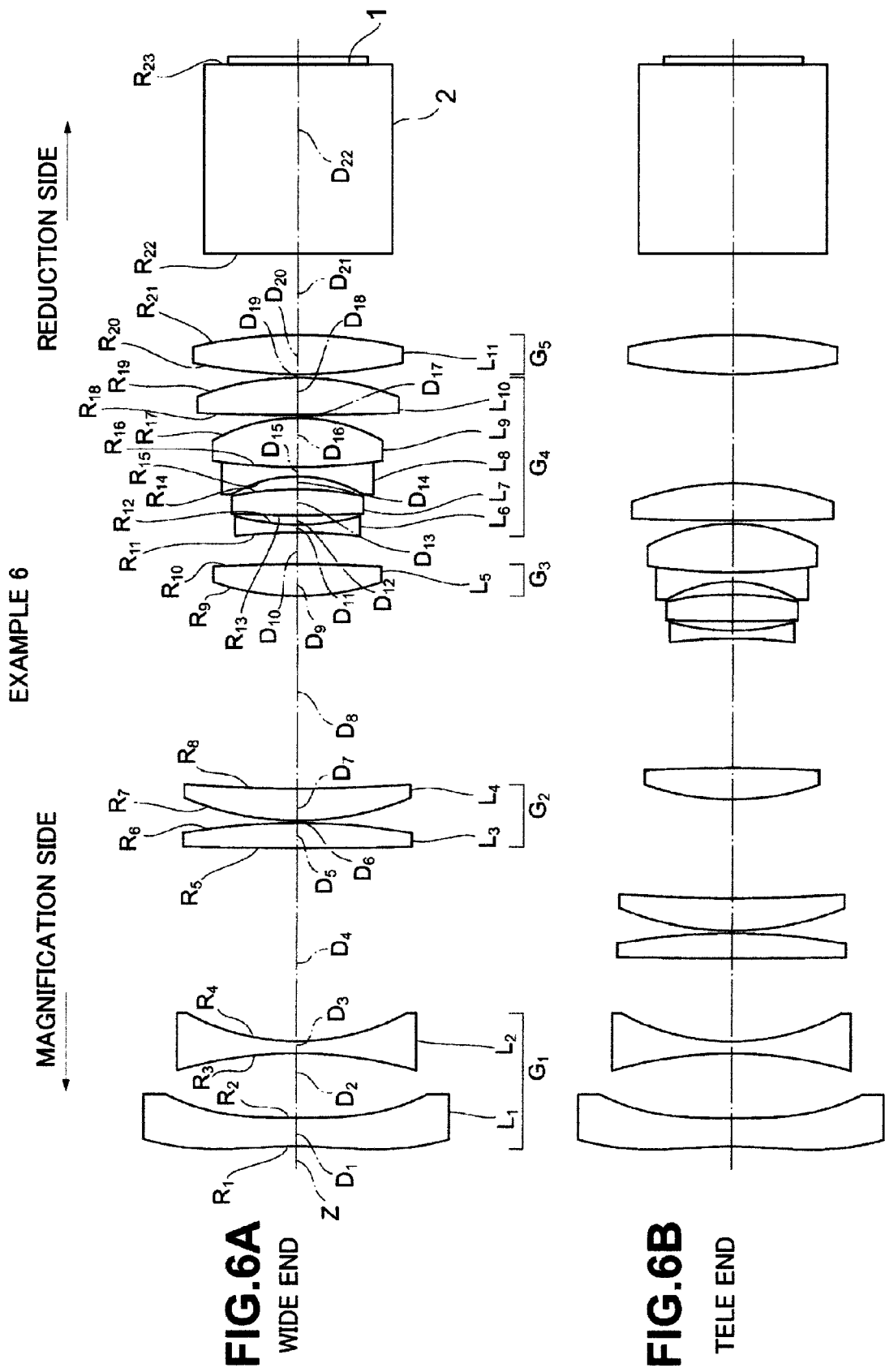
FIG.6A WIDE END
FIG.6B TELE END

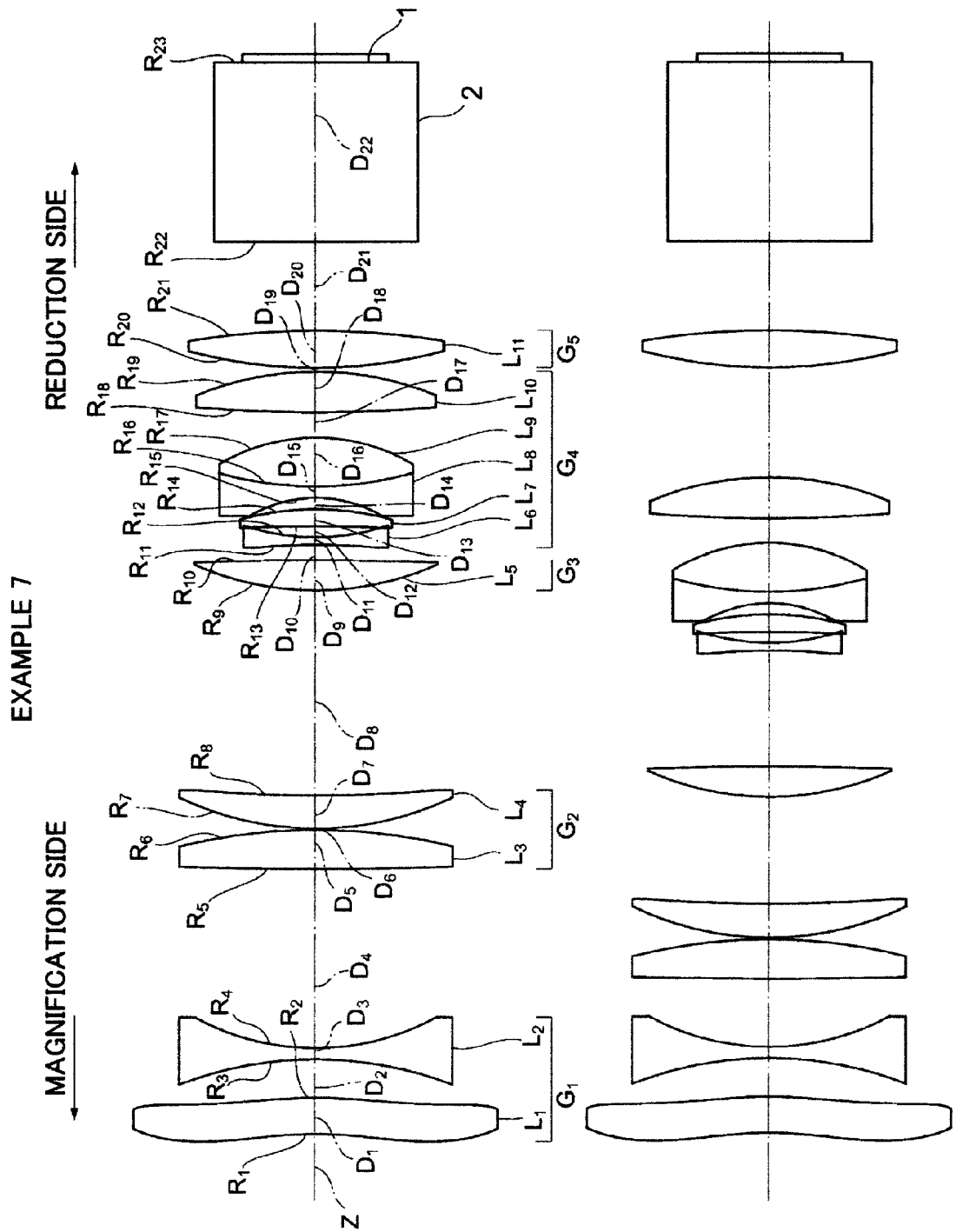
FIG.7A WIDE END
FIG.7B TELE END

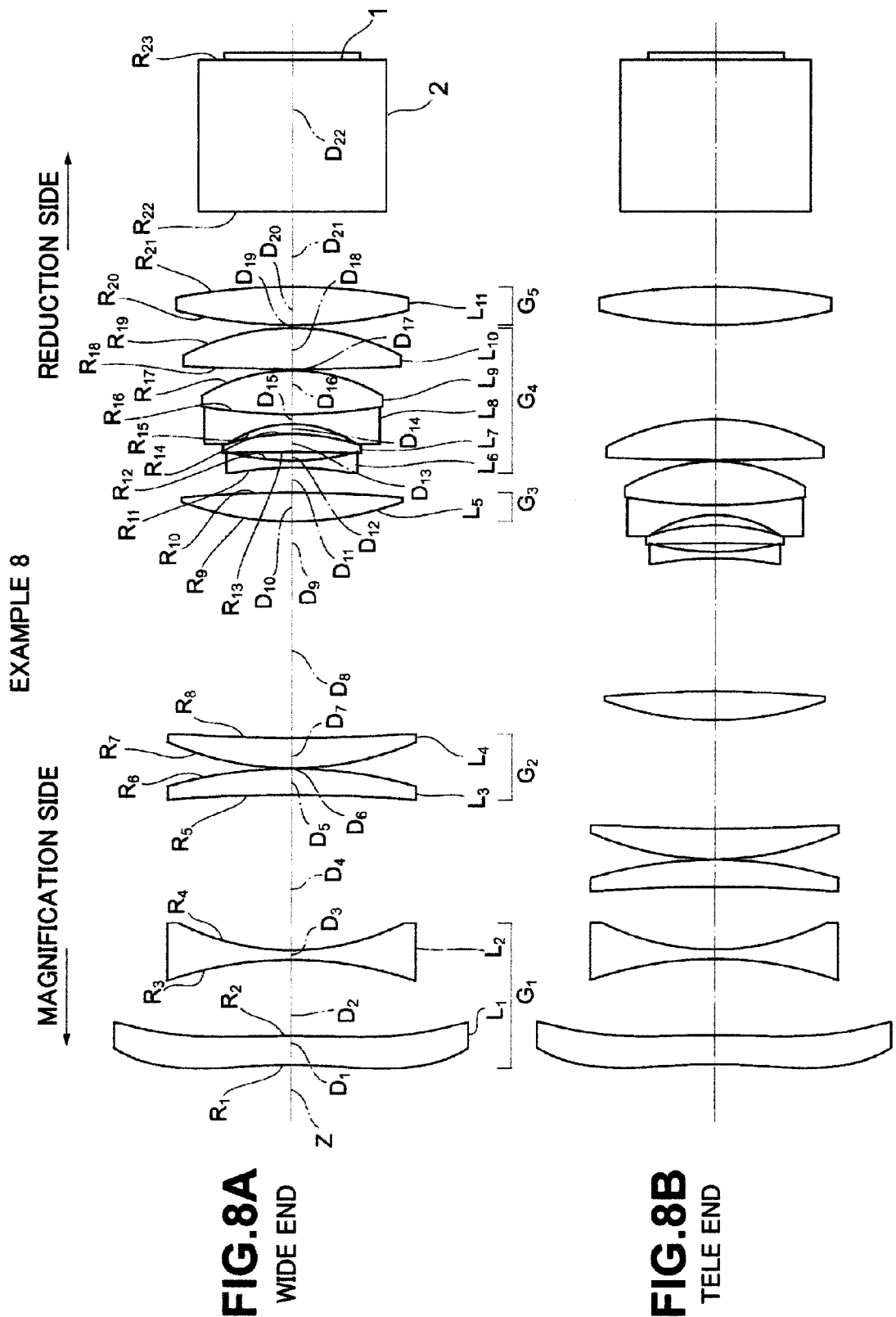

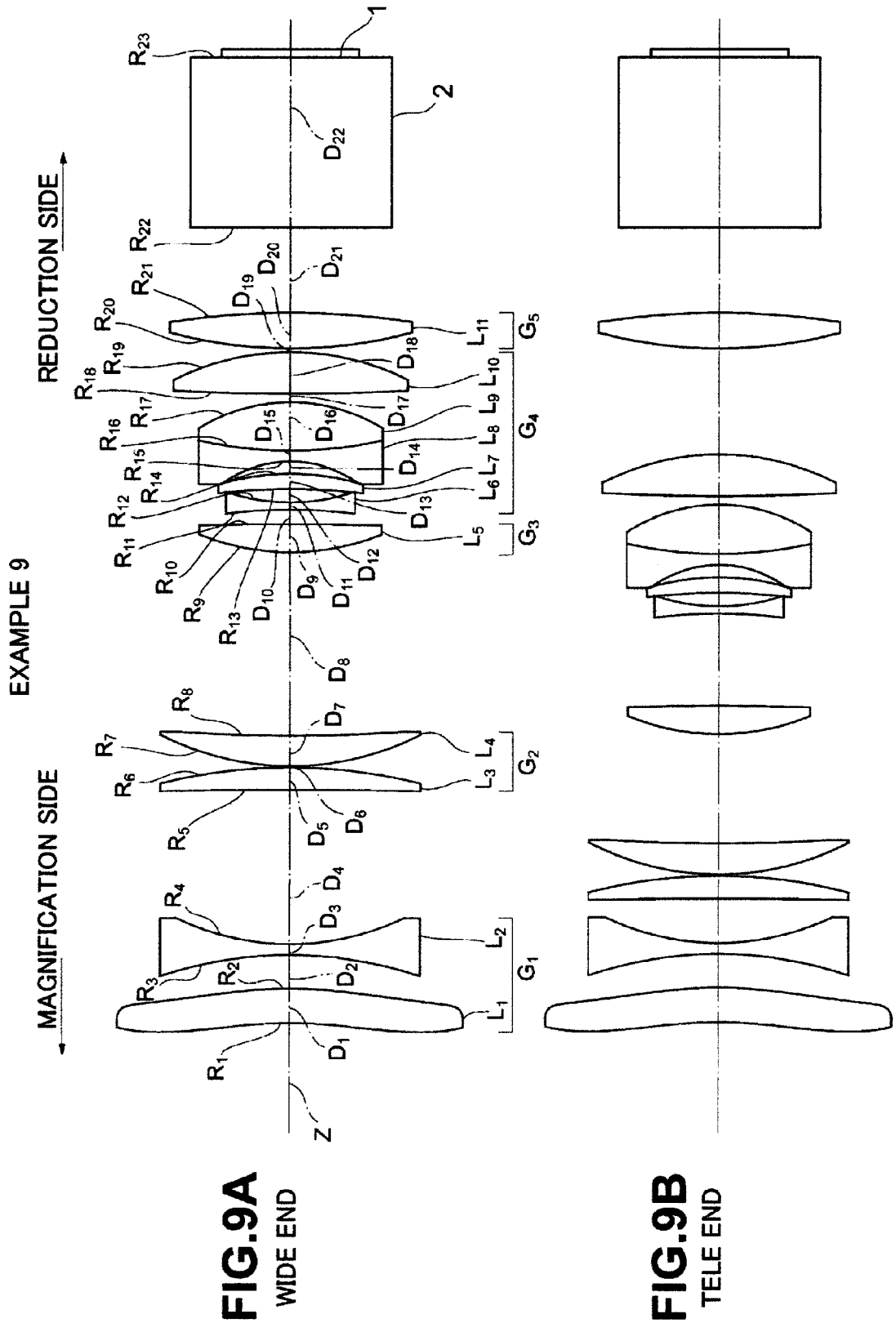
FIG.9A WIDE END
FIG.9B TELE END

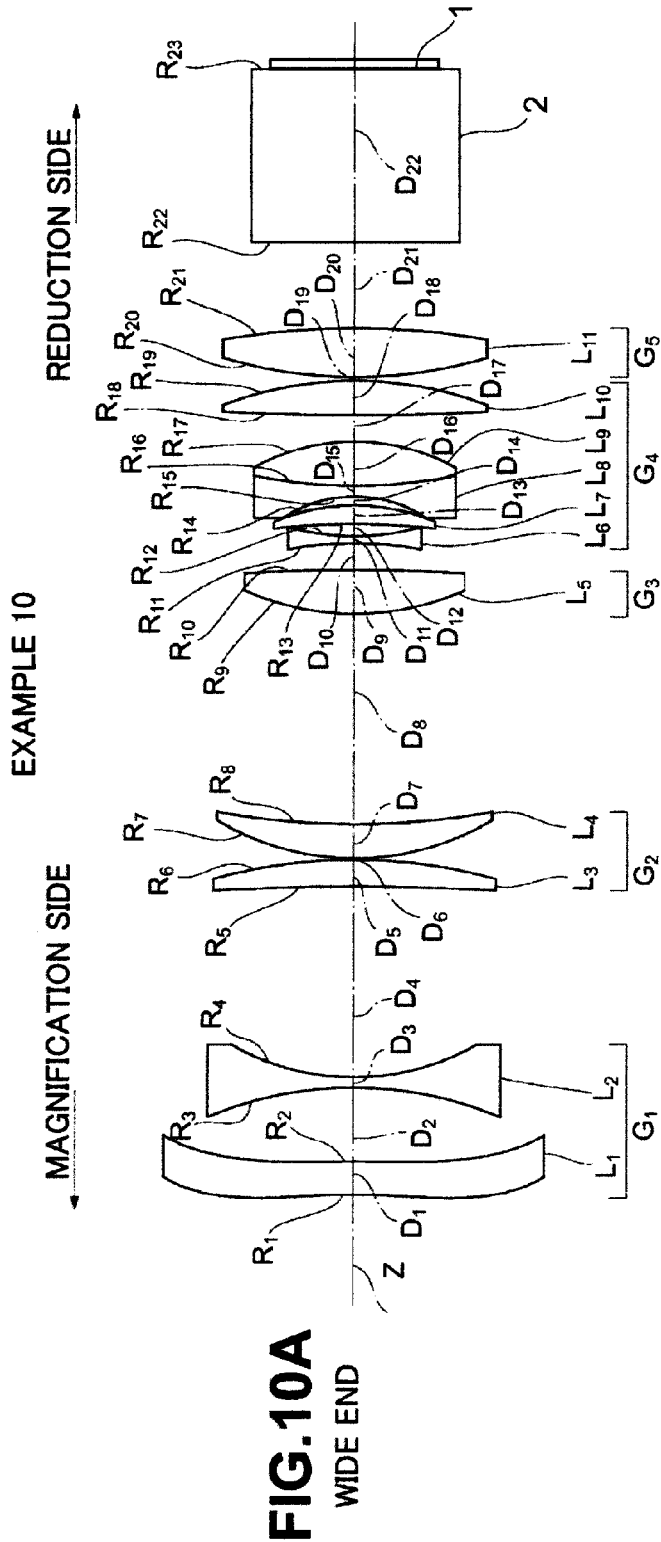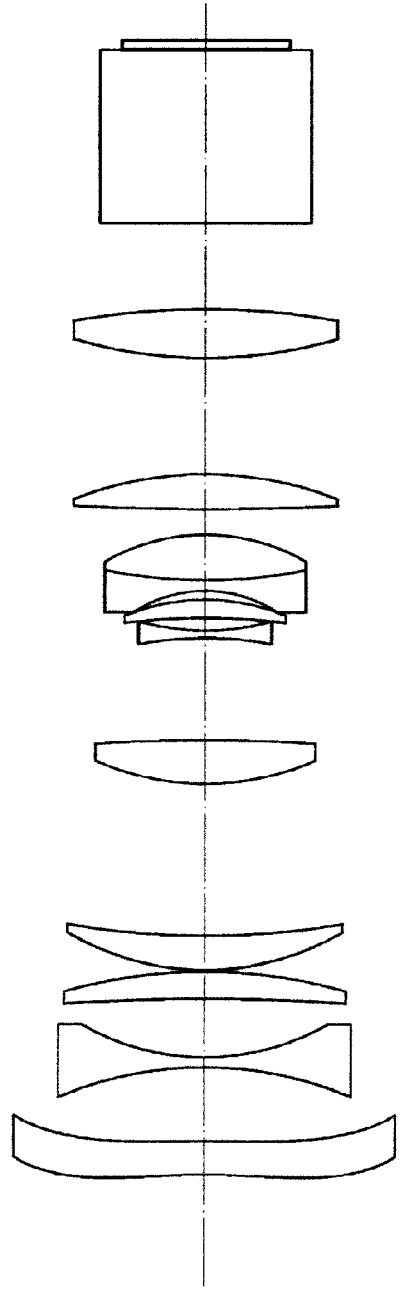
FIG.10A WIDE END
FIG.10B TELE END

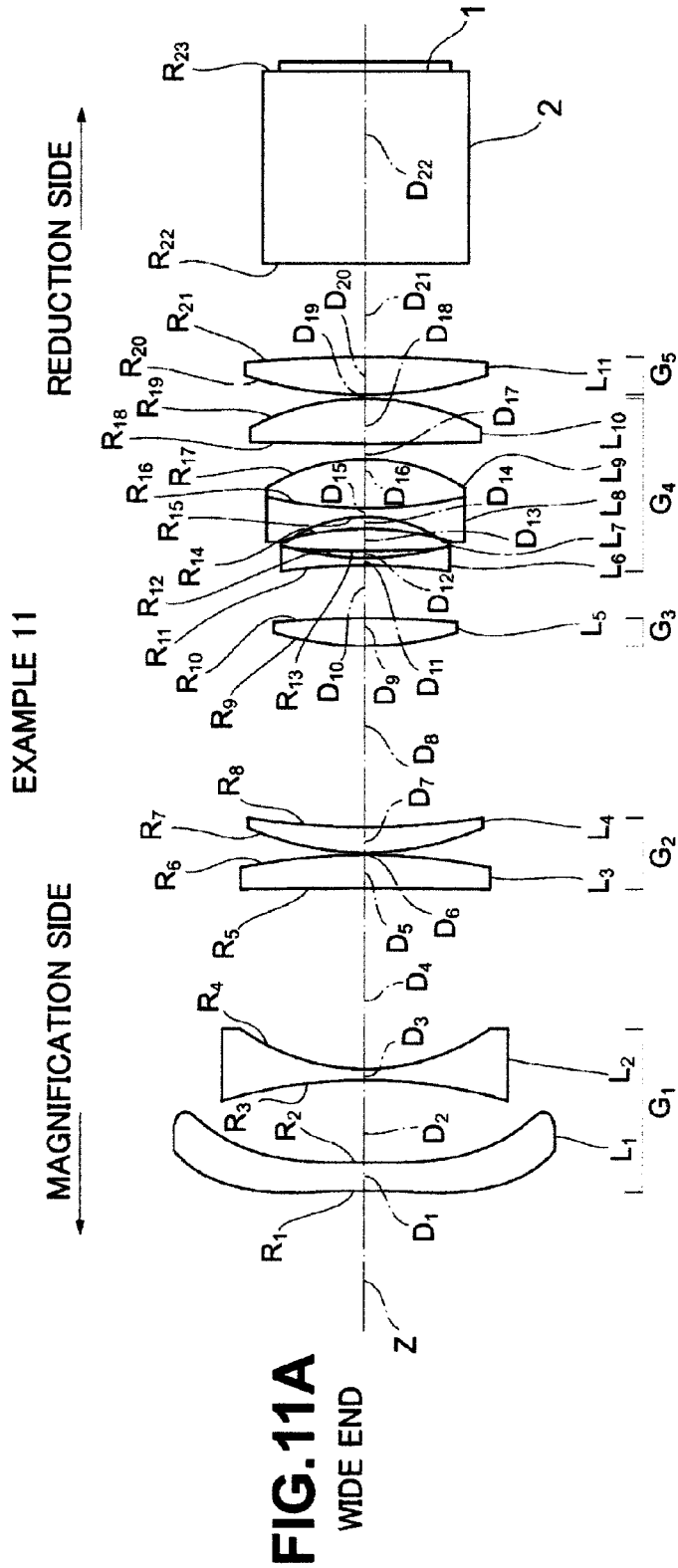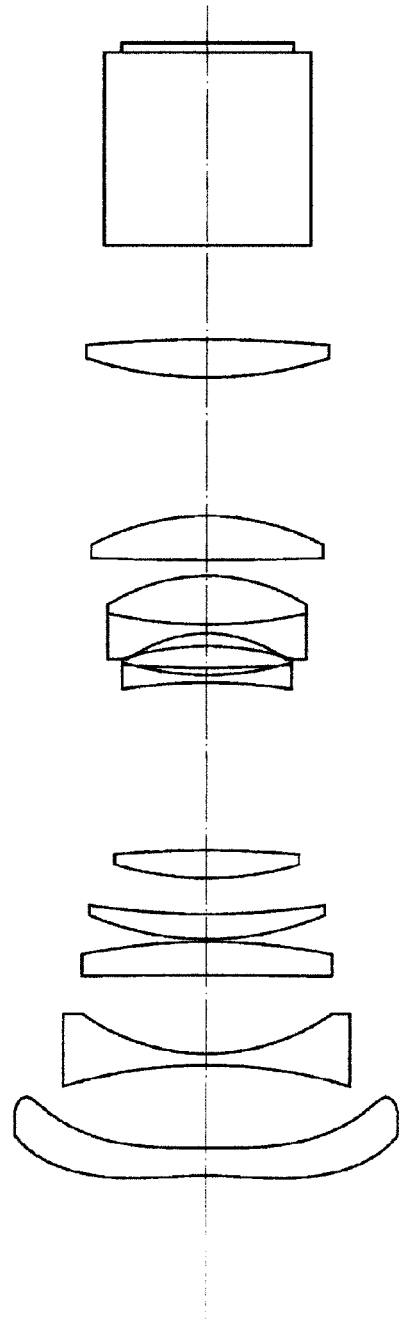
FIG.11A WIDE END
FIG.11B TELE END

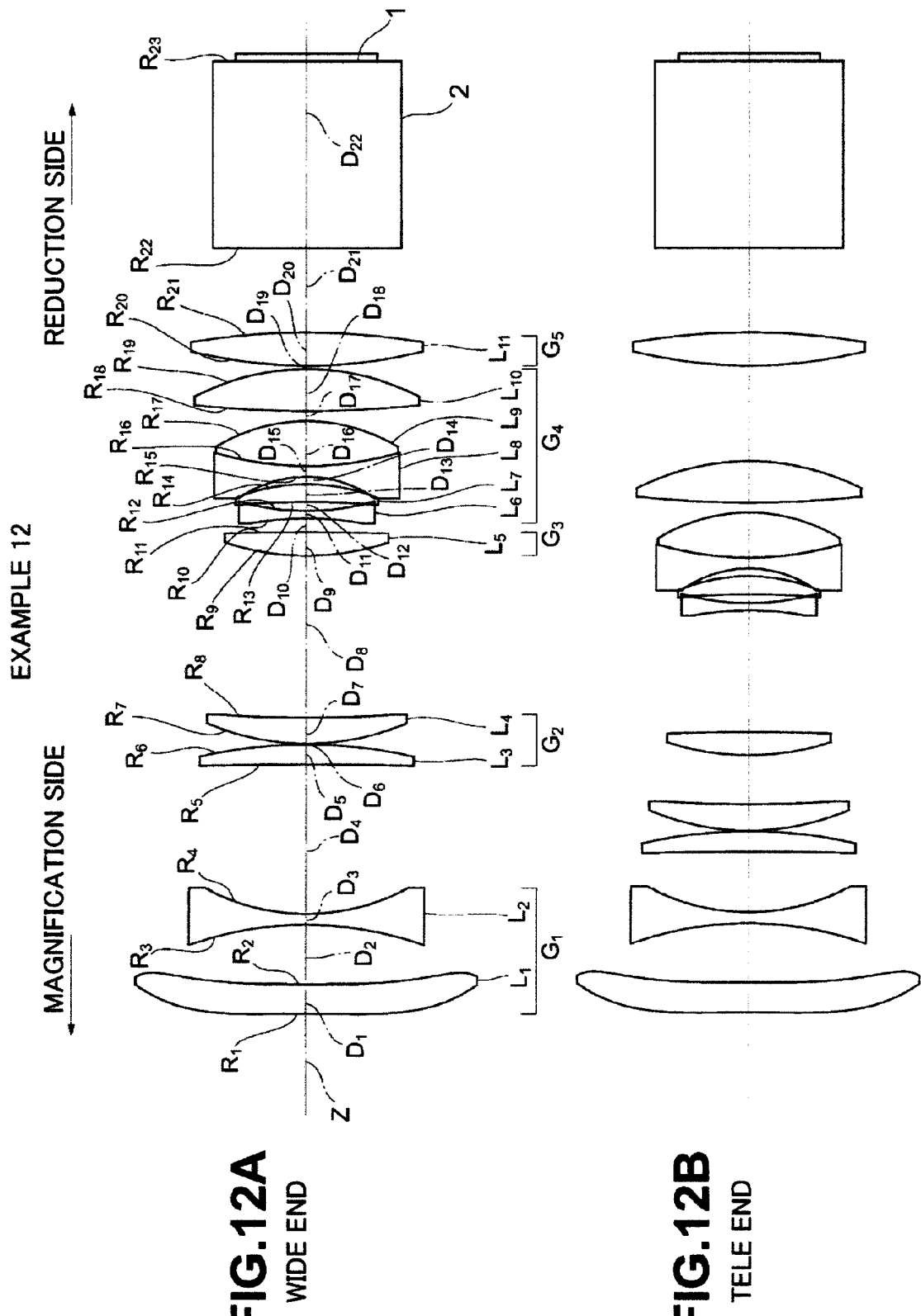
FIG.12A WIDE END
FIG.12B TELE END

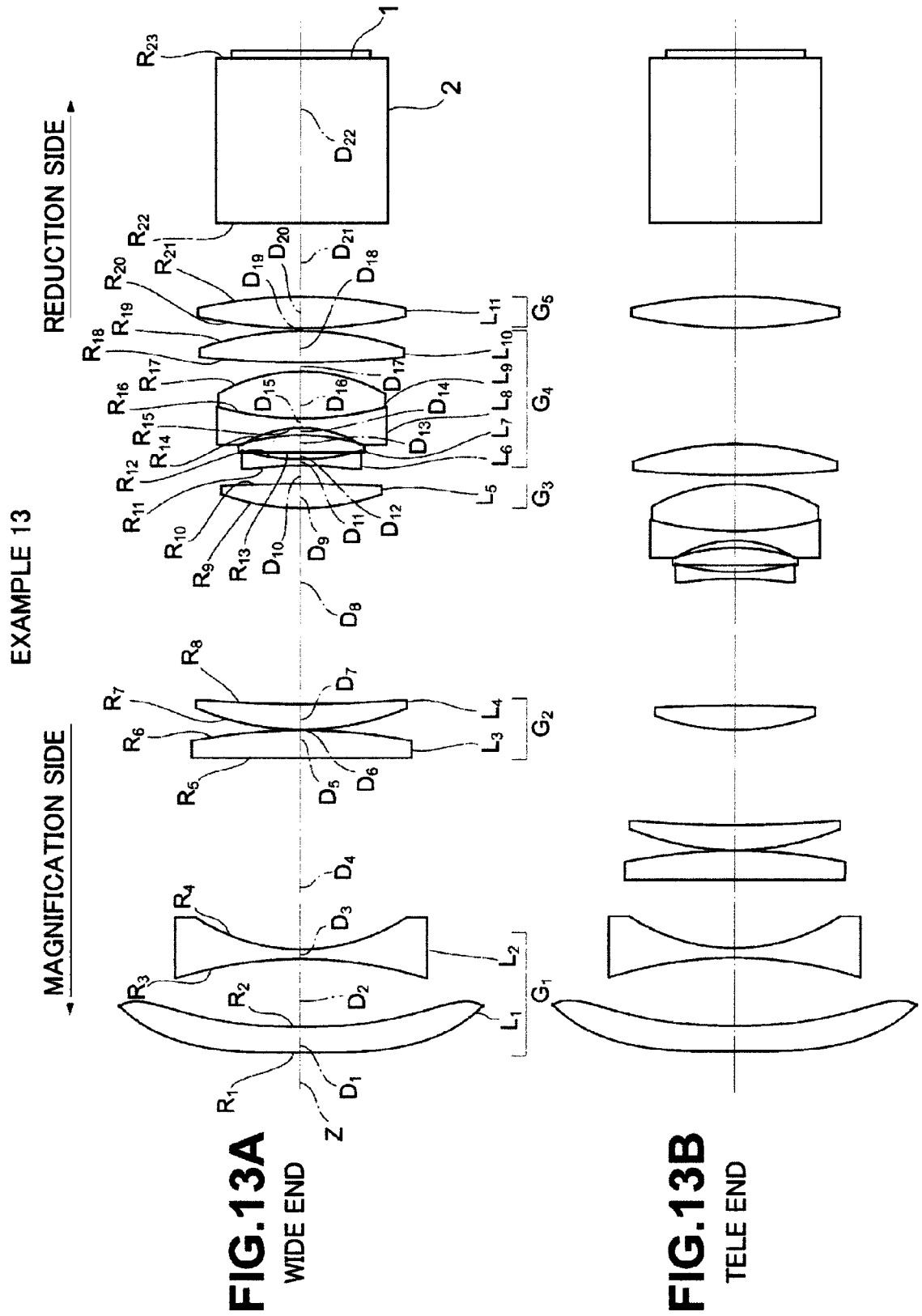
FIG.13A WIDE END
FIG.13B TELE END

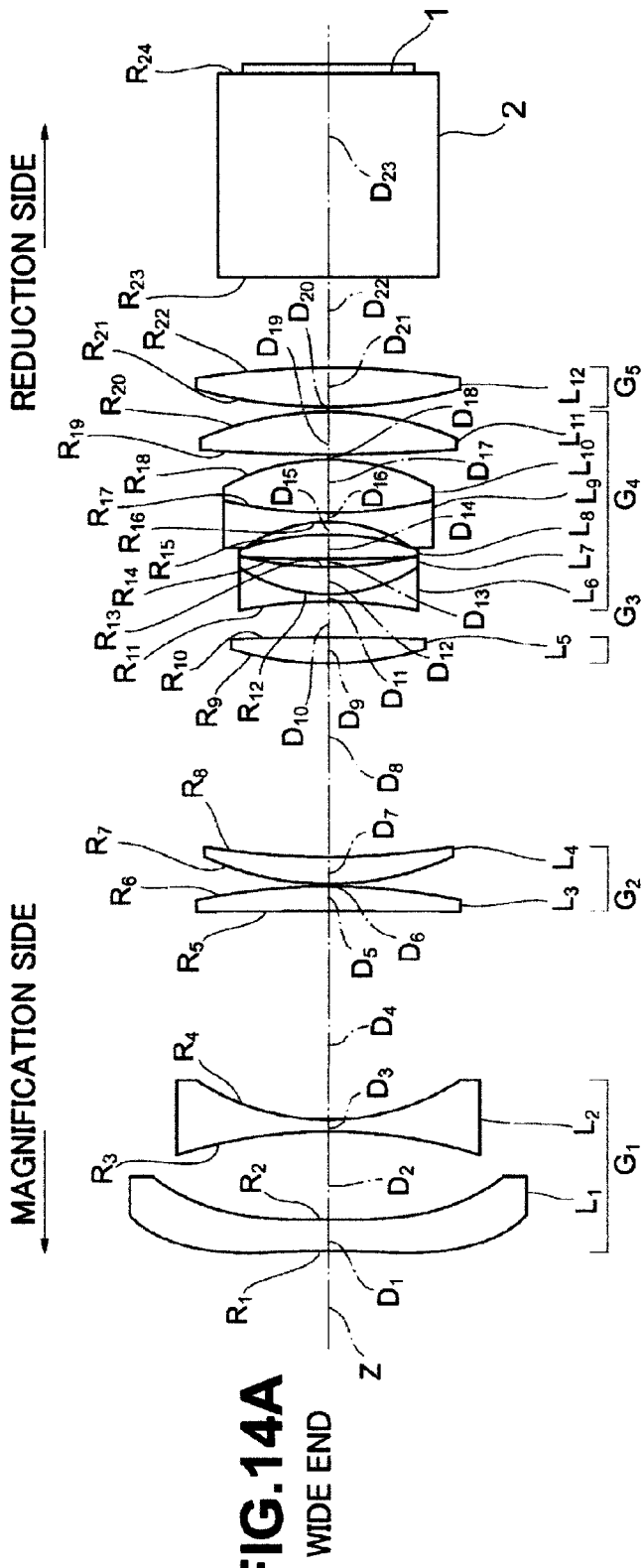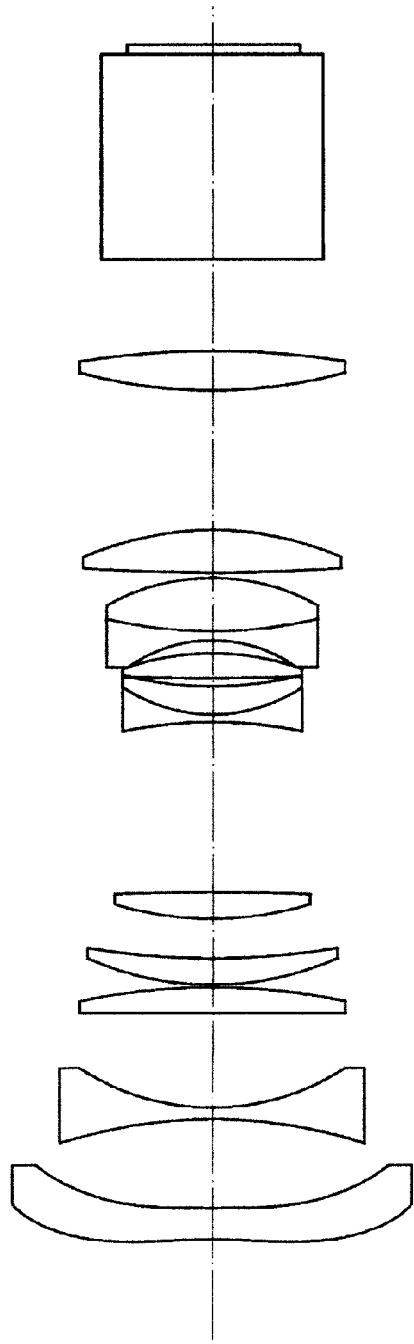

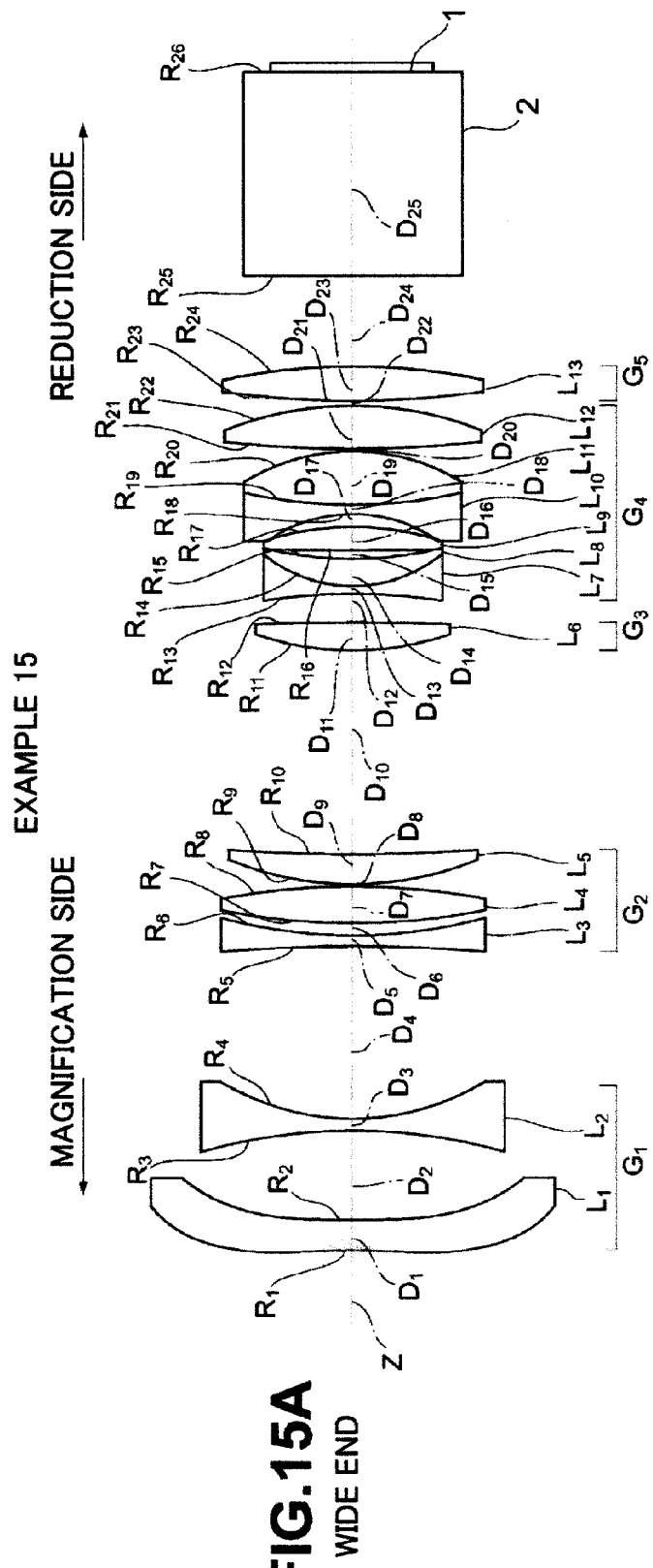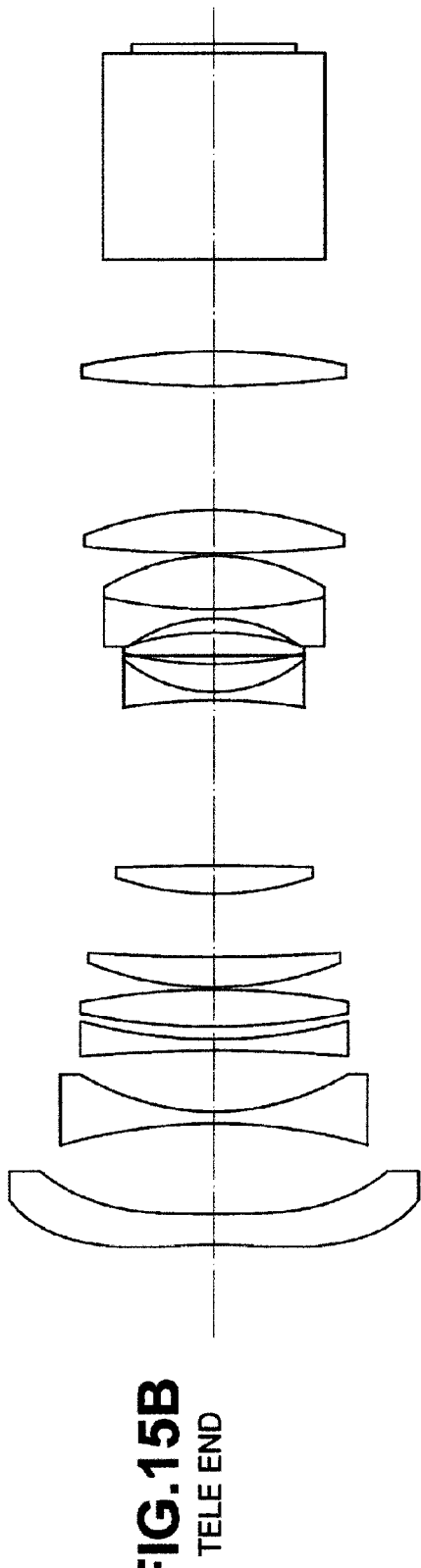
FIG.15A WIDE END
FIG.15B TELE END
EXAMPLE 15

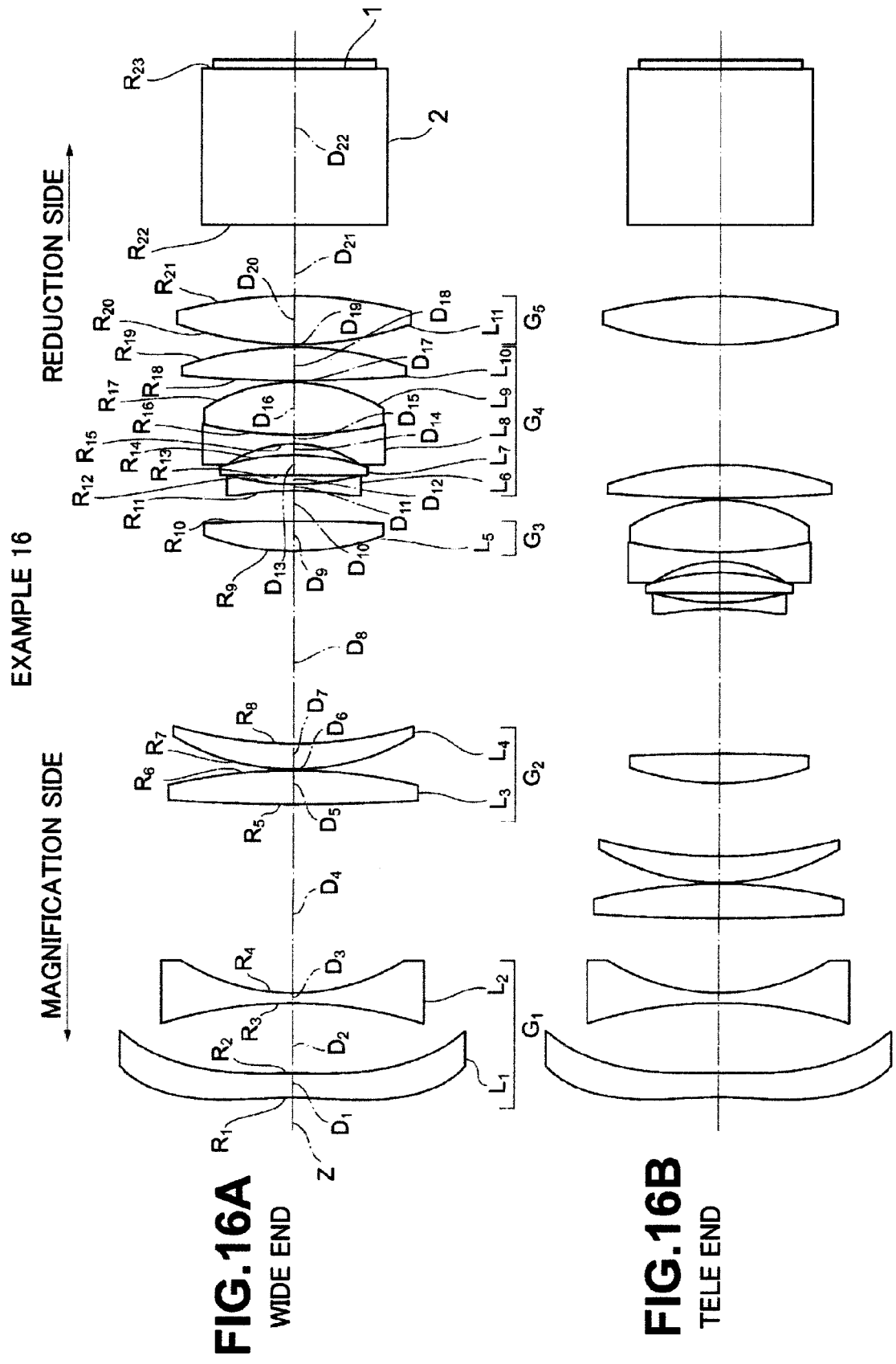

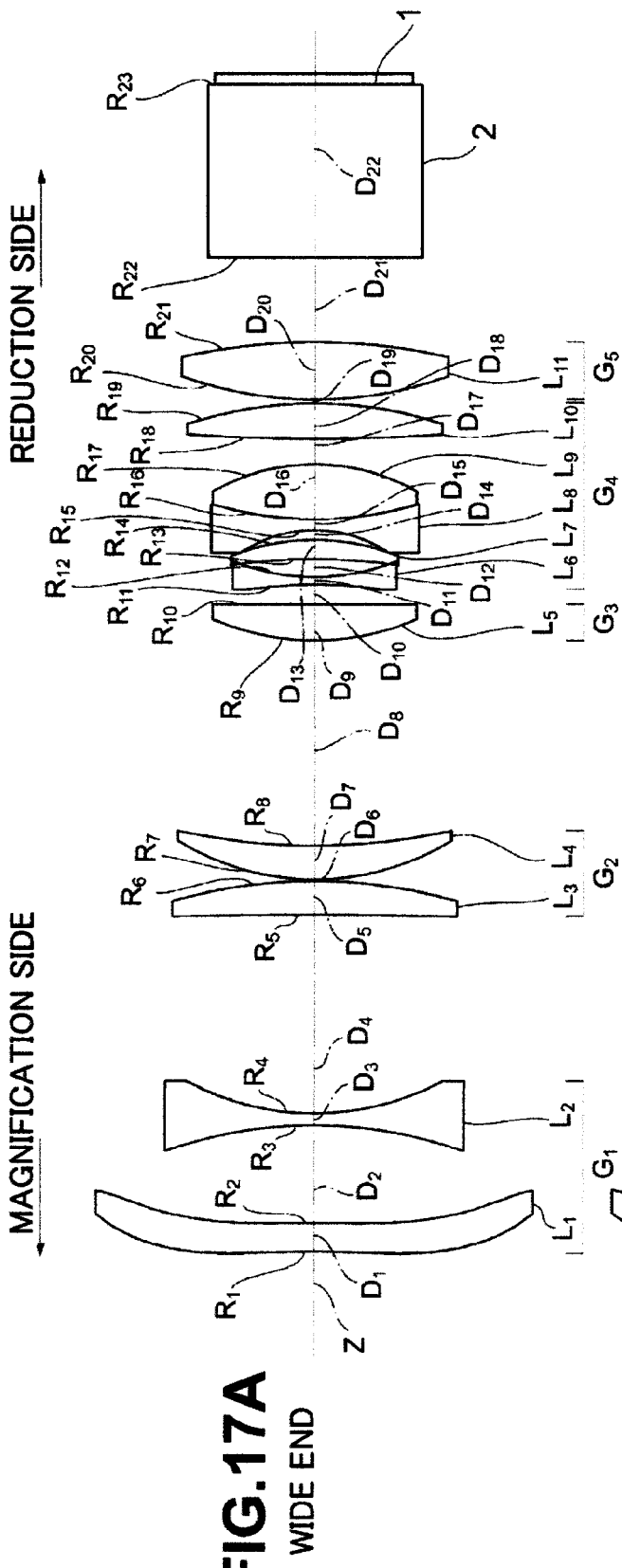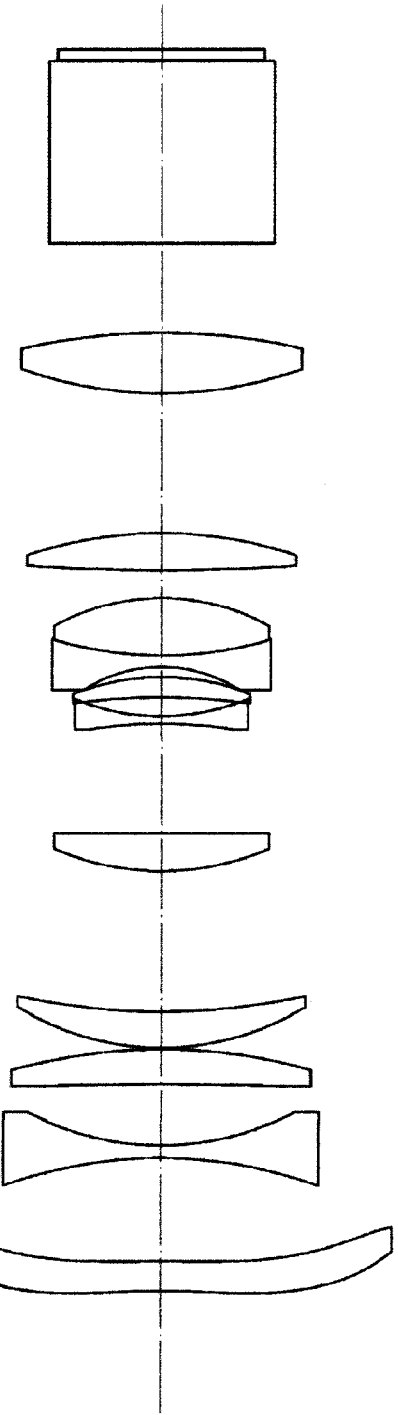
FIG.17A WIDE END
FIG.17B TELE END

EXAMPLE 1
WIDE END
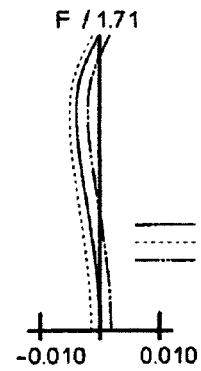
FIG. 18A-i
SPHERICAL ABERRATION
FIG. 18A-ii
ASTIGMATISM
FIG. 18A-iii
DISTORTION
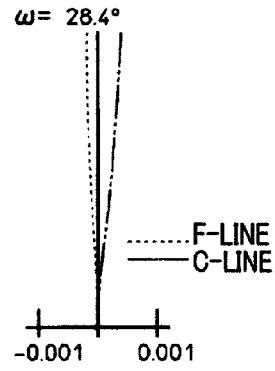
FIG. 18A-iv
LATERAL CHROMATIC ABERRATION
MIDDLE
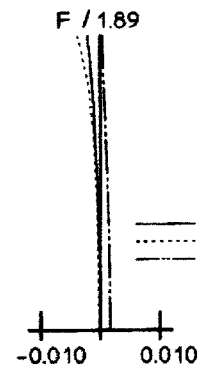
FIG. 18B-i
SPHERICAL ABERRATION
FIG. 18B-ii
ASTIGMATISM
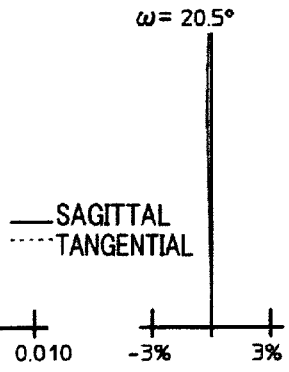
FIG. 18B-iii
DISTORTION
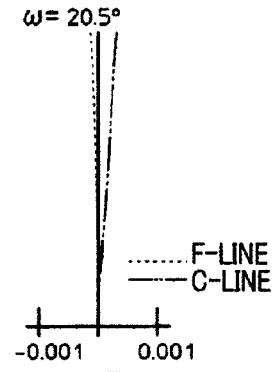
FIG. 18B-iv
LATERAL CHROMATIC ABERRATION
TELE END
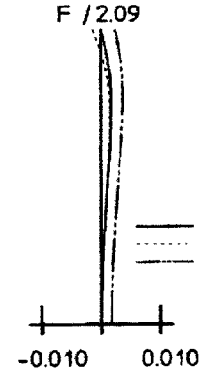
FIG. 18C-i
SPHERICAL ABERRATION
FIG. 18C-ii
ASTIGMATISM
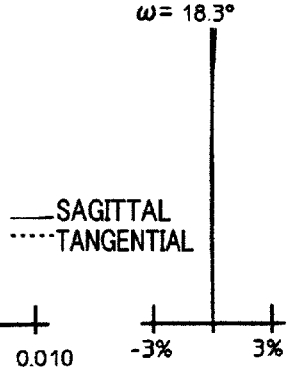
FIG. 18C-iii
DISTORTION
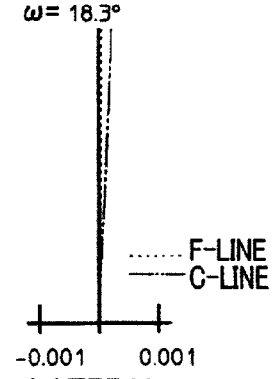
FIG. 18C-iv
LATERAL CHROMATIC ABERRATION EXAMPLE 2
WIDE END
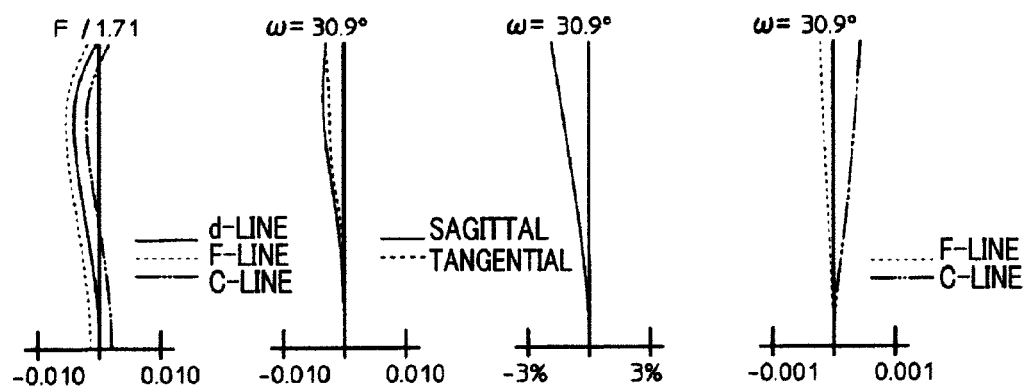
FIG. 19A-i  FIG. 19A-ii  FIG. 19A-iii  FIG. 19A-iv
MIDDLE
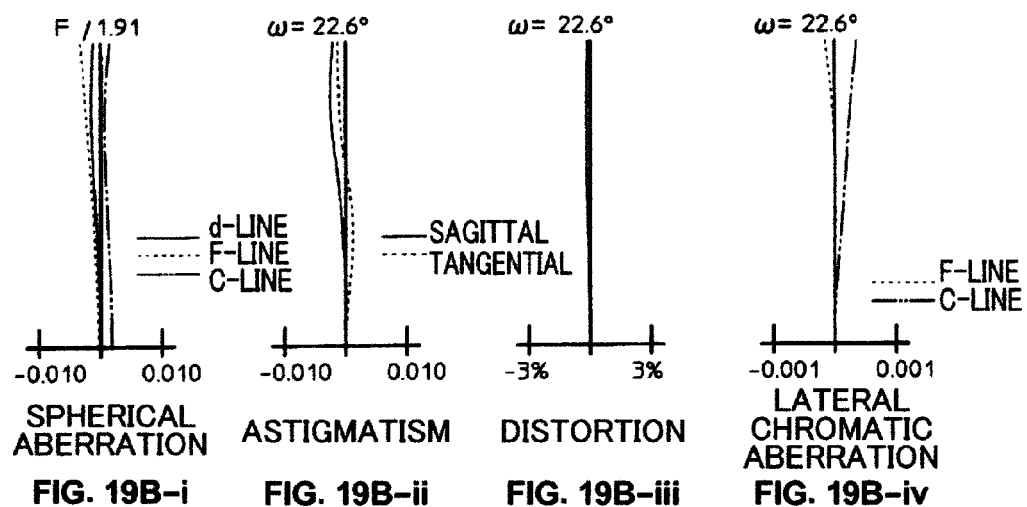
FIG. 19B-i  FIG. 19B-ii  FIG. 19B-iii  FIG. 19B-iv
TELE END
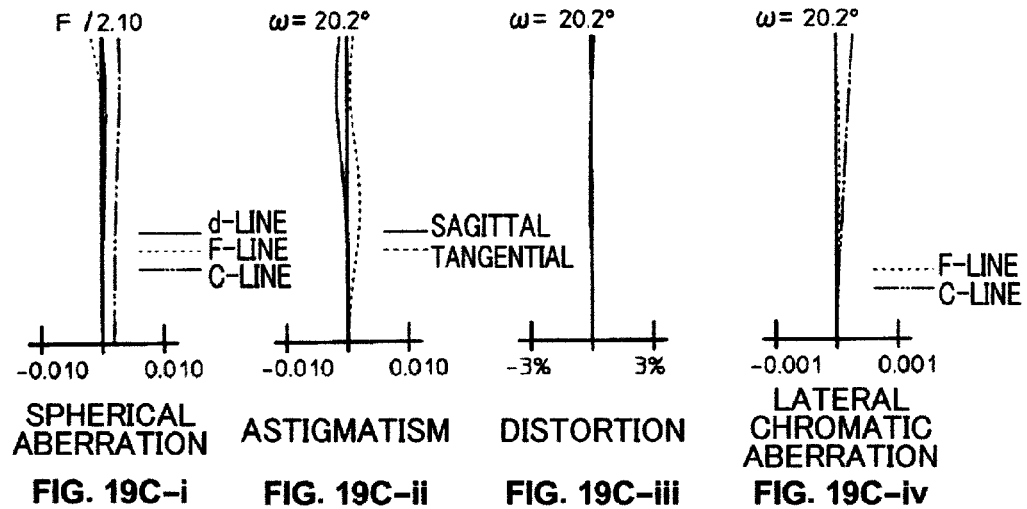
FIG. 19C-i  FIG. 19C-ii  FIG. 19C-iii  FIG. 19C-iv EXAMPLE 3
WIDE END
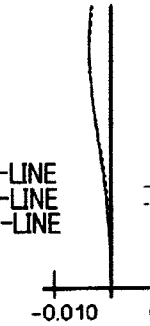
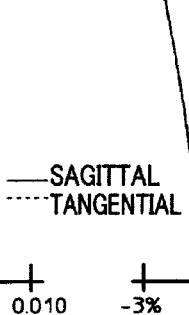
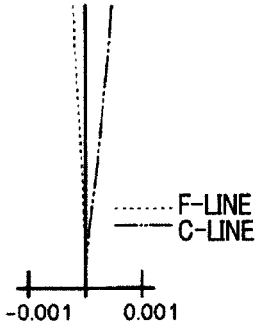
FIG. 20A-i  FIG. 20A-ii  FIG. 20A-iii  FIG. 20A-iv
MIDDLE
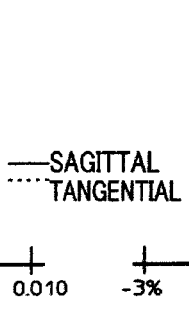
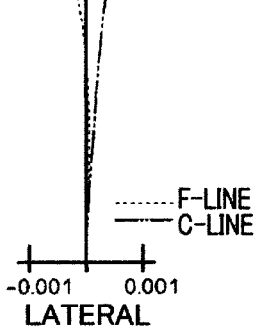
FIG. 20B-i  FIG. 20B-ii  FIG. 20B-iii  FIG. 20B-iv
TELE END
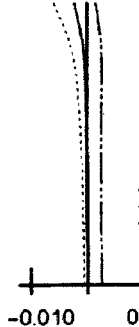
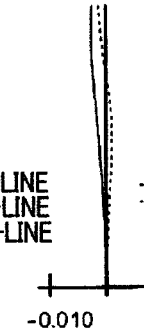
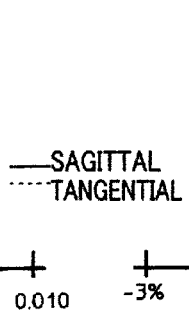
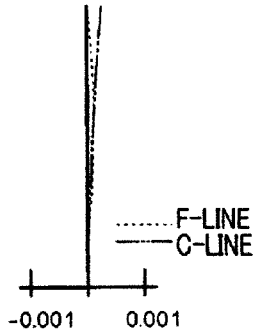
FIG. 20C-i  FIG. 20C-ii  FIG. 20C-iii  FIG. 20C-iv

EXAMPLE 4
WIDE END
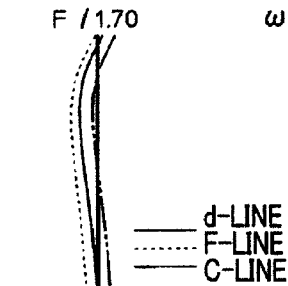
FIG. 21A-i
SPHERICAL ABERRATION
FIG. 21A-ii
ASTIGMATISM
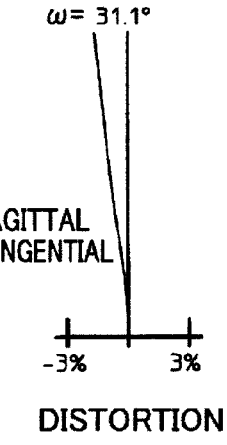
FIG. 21A-iii
DISTORTION
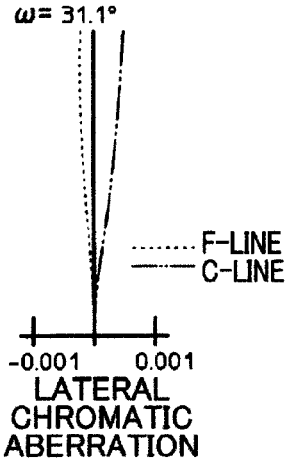
FIG. 21A-iv
LATERAL CHROMATIC ABERRATION
MIDDLE
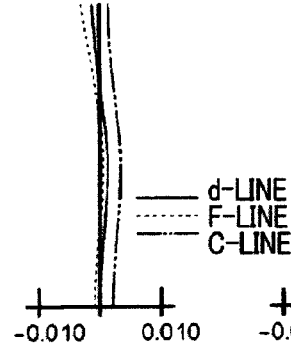
FIG. 21B-i
SPHERICAL ABERRATION
FIG. 21B-ii
ASTIGMATISM
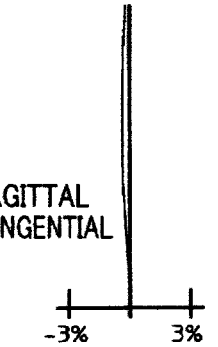
FIG. 21B-iii
DISTORTION
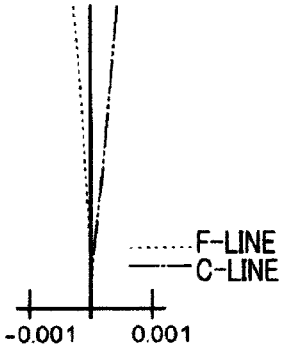
FIG. 21B-iv
LATERAL CHROMATIC ABERRATION
TELE END
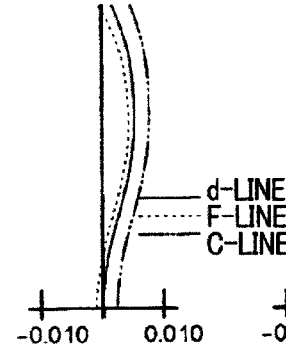
FIG. 21C-i
SPHERICAL ABERRATION
FIG. 21C-ii
ASTIGMATISM
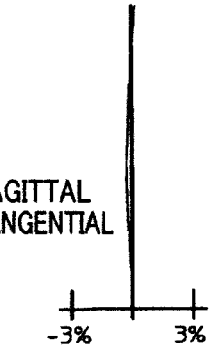
FIG. 21C-iii
DISTORTION
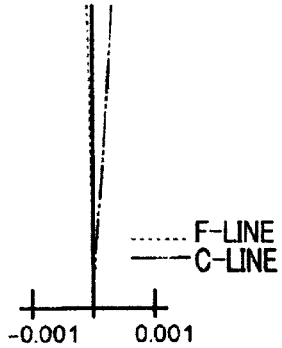
FIG. 21C-iv
LATERAL CHROMATIC ABERRATION EXAMPLE 5
WIDE END
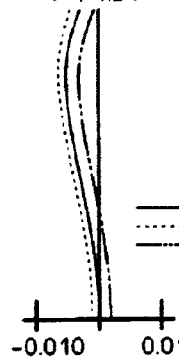
FIG. 22A-i
SPHERICAL ABERRATION
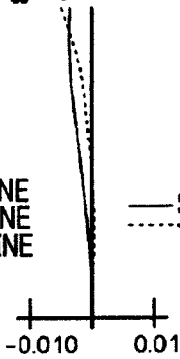
FIG. 22A-ii
ASTIGMATISM
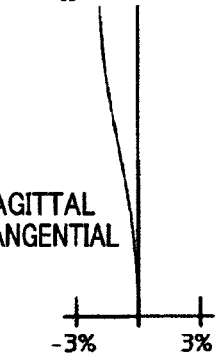
FIG. 22A-iii
DISTORTION
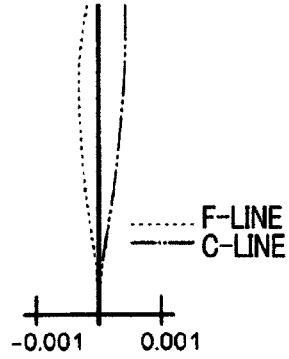
FIG. 22A-iv
LATERAL CHROMATIC ABERRATION
MIDDLE
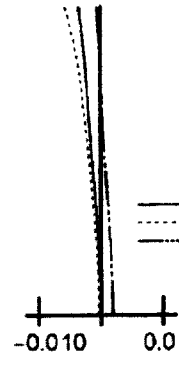
FIG. 22B-i
SPHERICAL ABERRATION
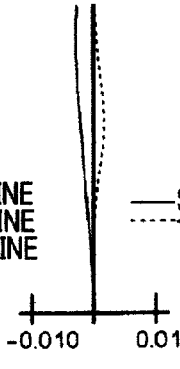
FIG. 22B-ii
ASTIGMATISM
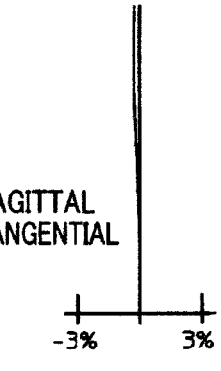
FIG. 22B-iii
DISTORTION
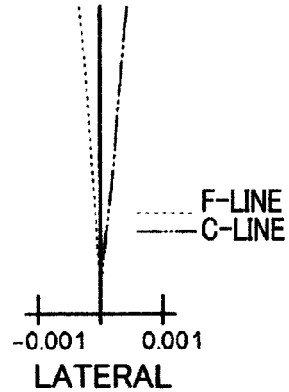
FIG. 22B-iv
LATERAL CHROMATIC ABERRATION
TELE END
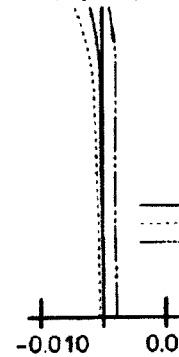
FIG. 22C-i
SPHERICAL ABERRATION
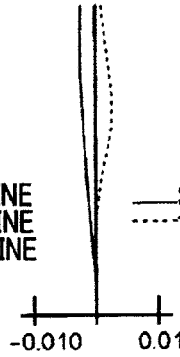
FIG. 22C-ii
ASTIGMATISM
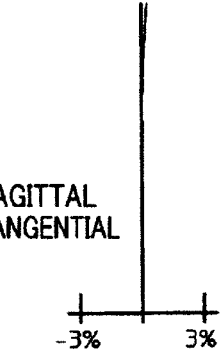
FIG. 22C-iii
DISTORTION
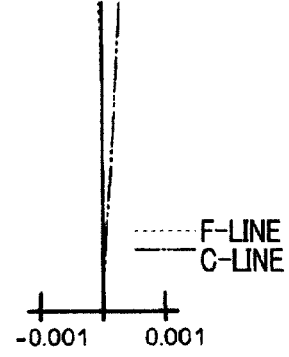
FIG. 22C-iv
LATERAL CHROMATIC ABERRATION EXAMPLE 6
WIDE END
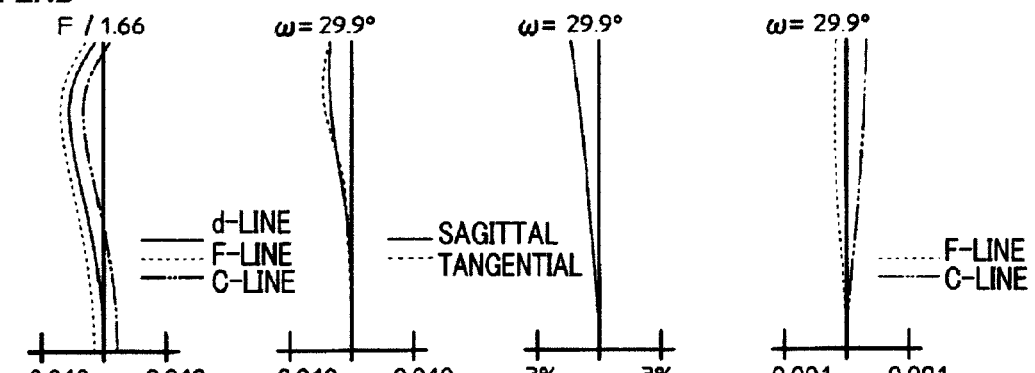
FIG. 23A-i SPHERICAL ABERRATION
FIG. 23A-ii ASTIGMATISM
FIG. 23A-iii DISTORTION
FIG. 23A-iv LATERAL CHROMATIC ABERRATION
MIDDLE
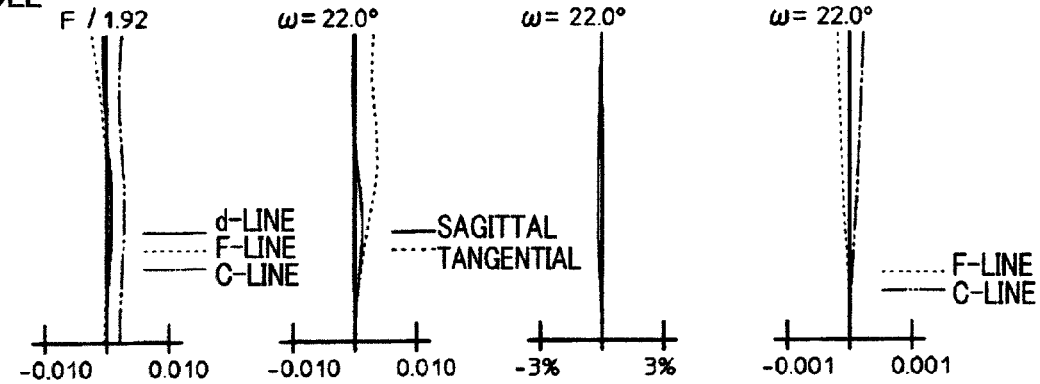
FIG. 23B-i SPHERICAL ABERRATION
FIG. 23B-ii ASTIGMATISM
FIG. 23B-iii DISTORTION
FIG. 23B-iv LATERAL CHROMATIC ABERRATION
TELE END
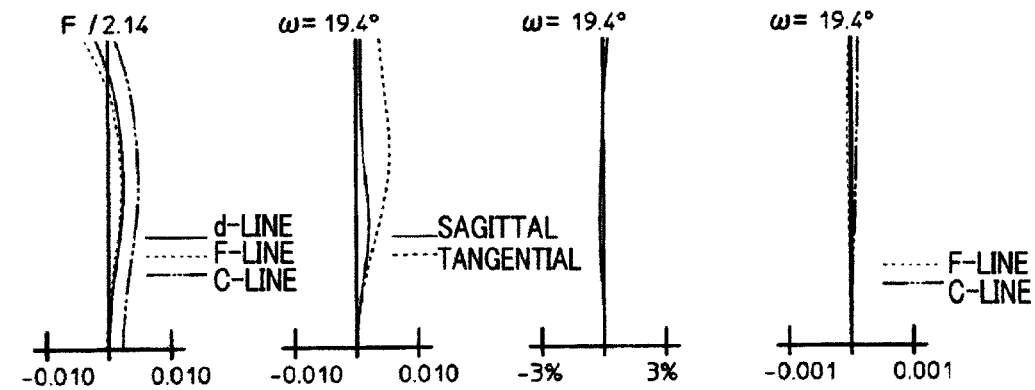
FIG. 23C-i SPHERICAL ABERRATION
FIG. 23C-ii ASTIGMATISM
FIG. 23C-iii DISTORTION
FIG. 23C-iv LATERAL CHROMATIC ABERRATION

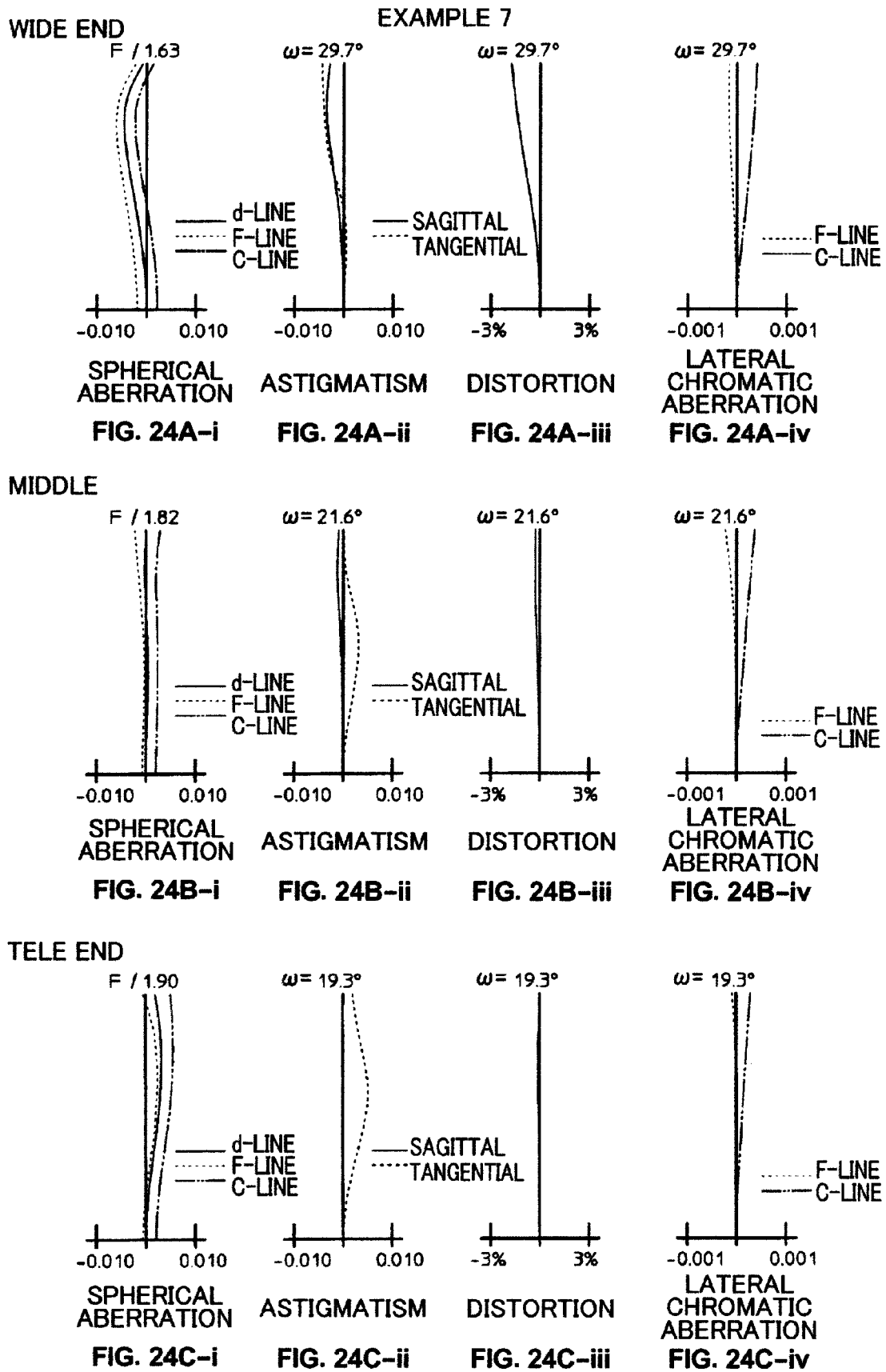

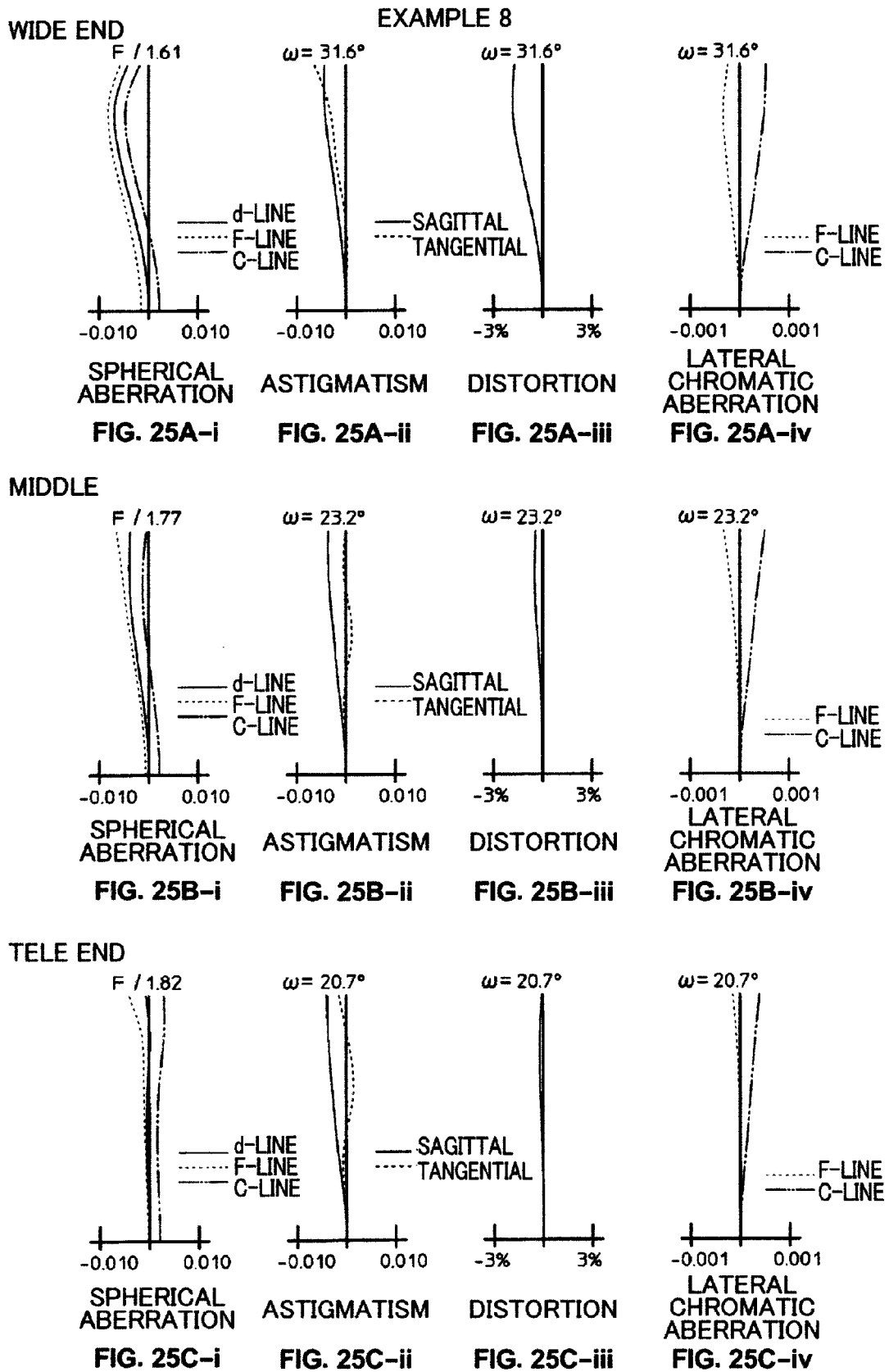

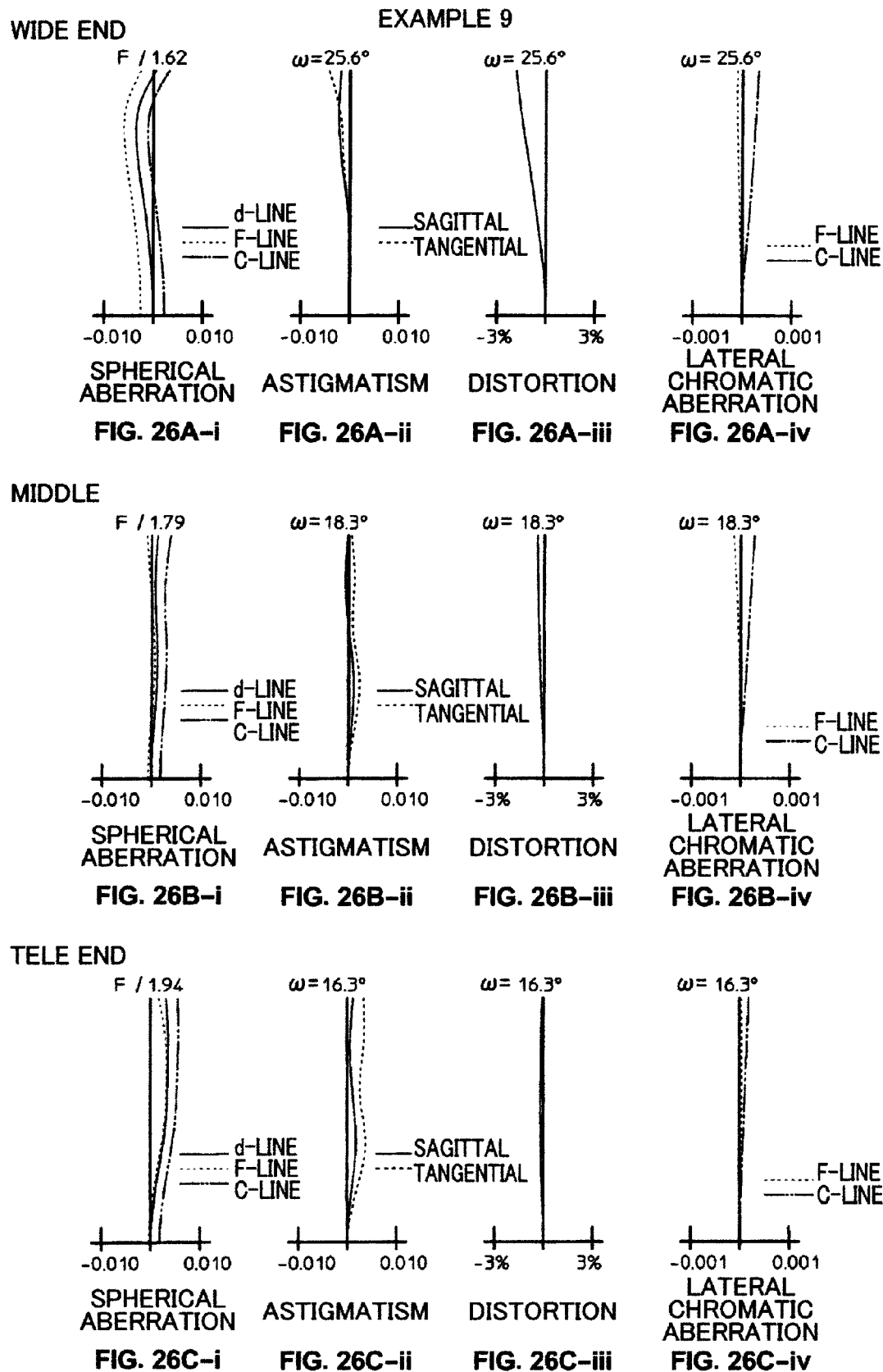

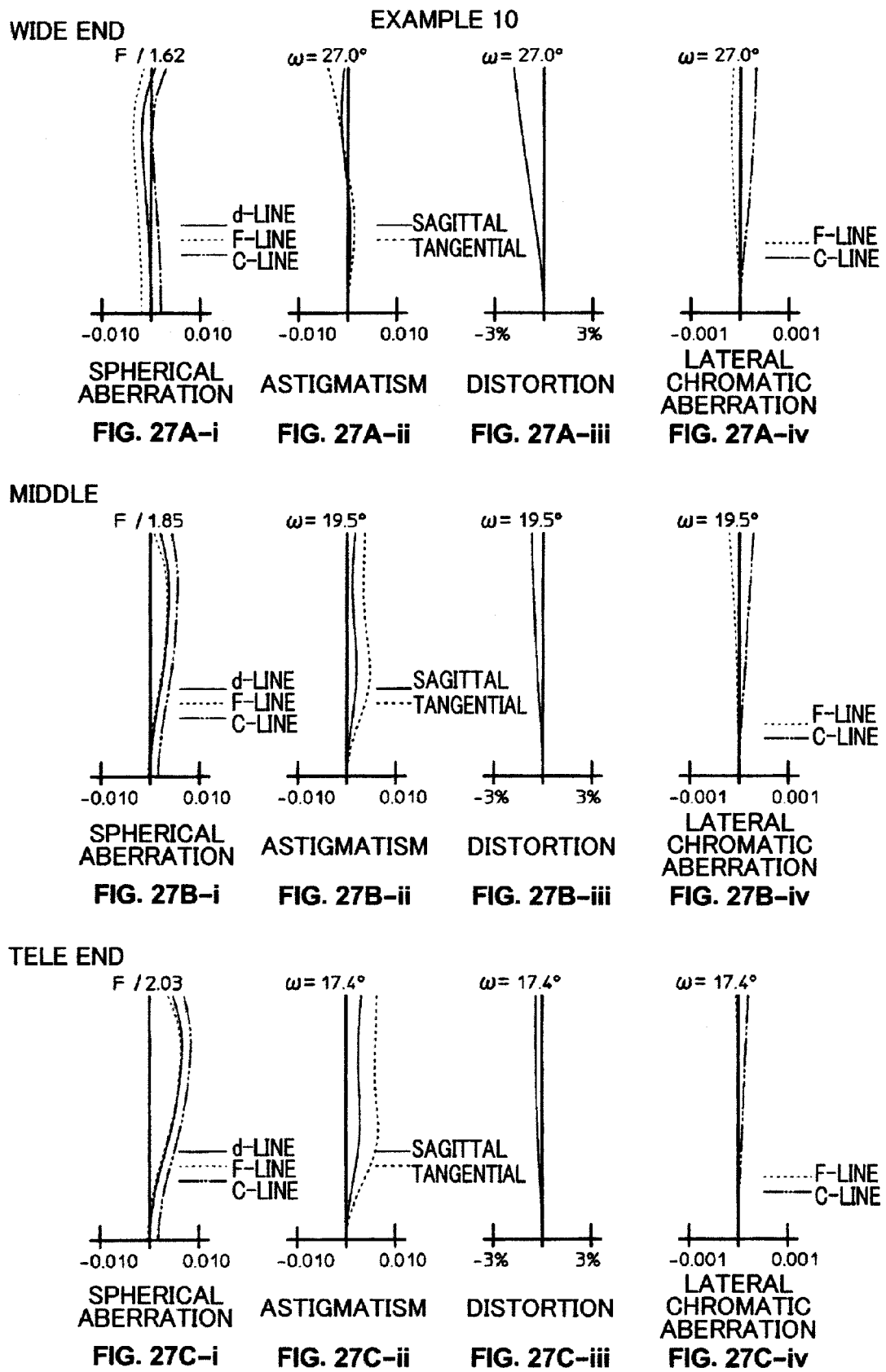

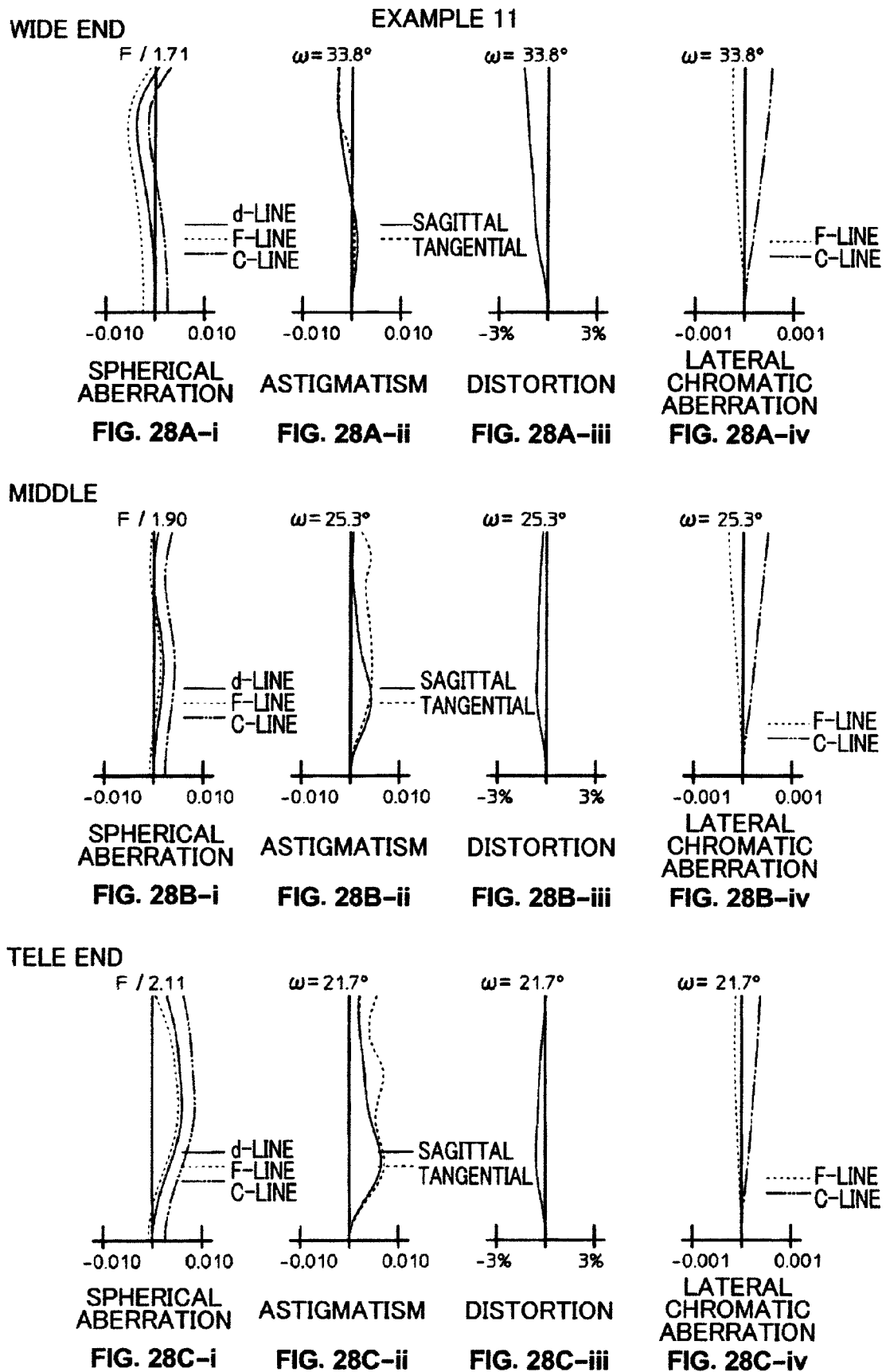

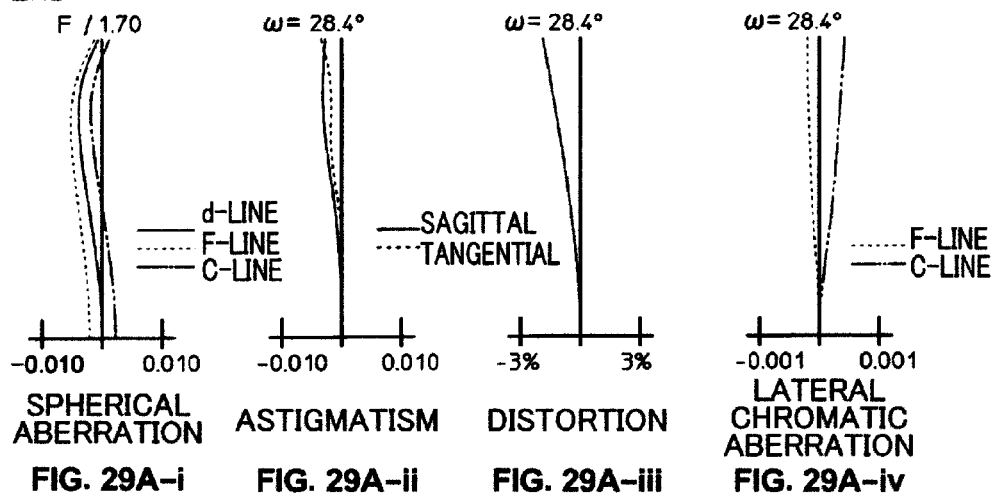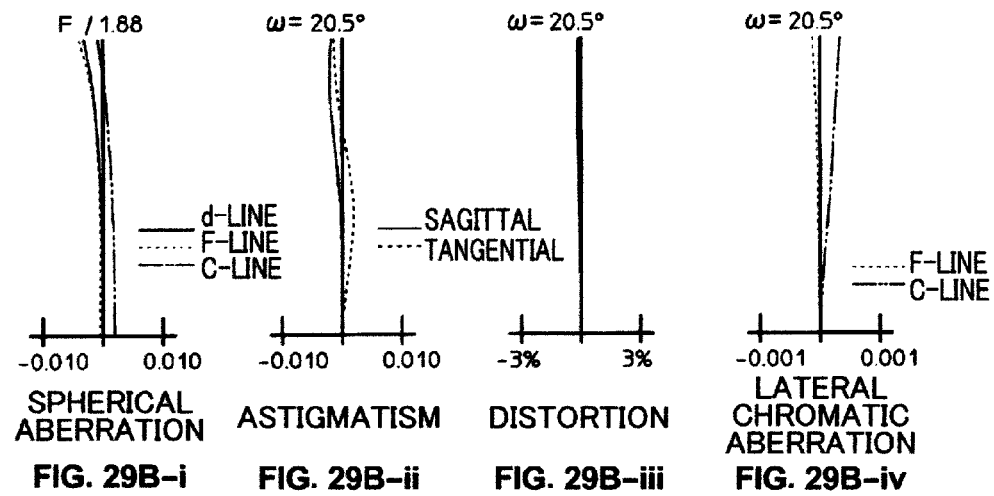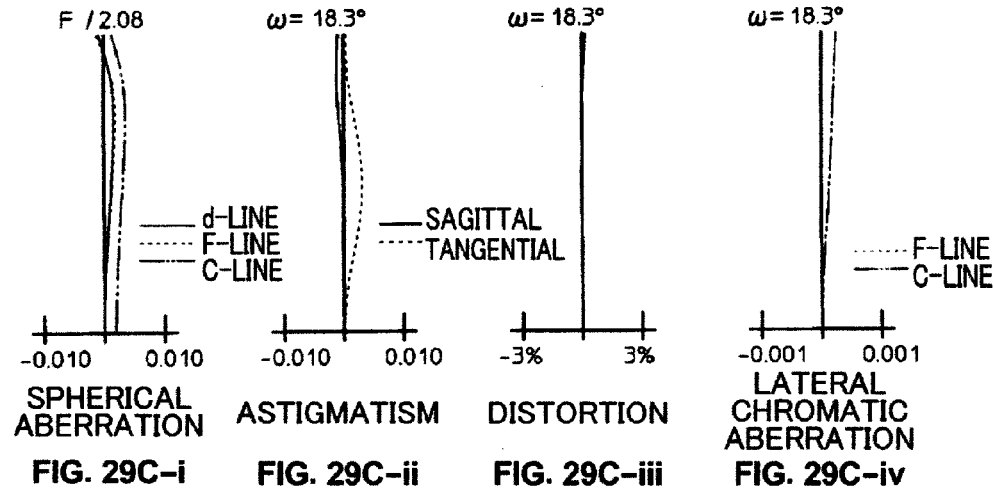

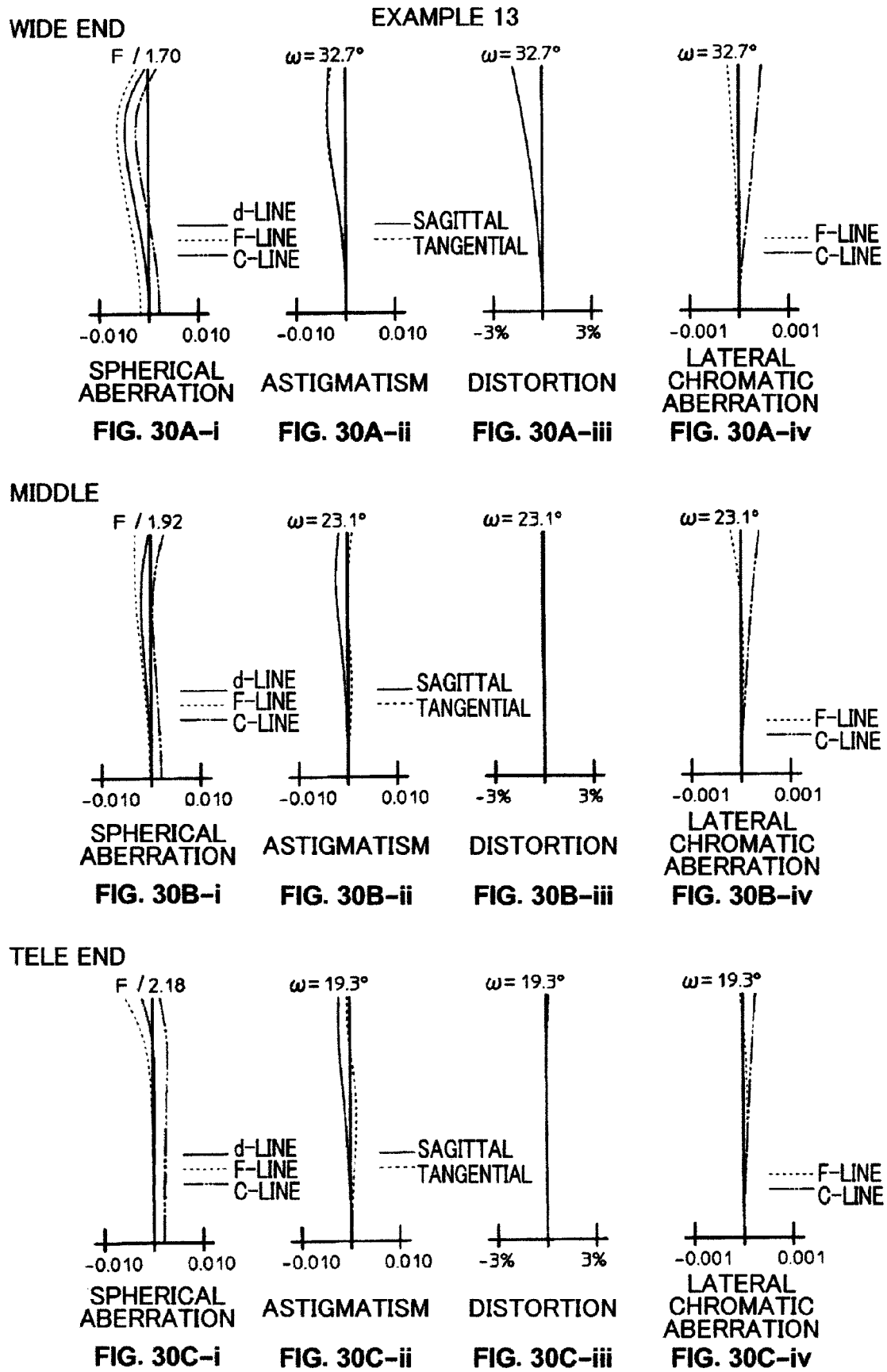

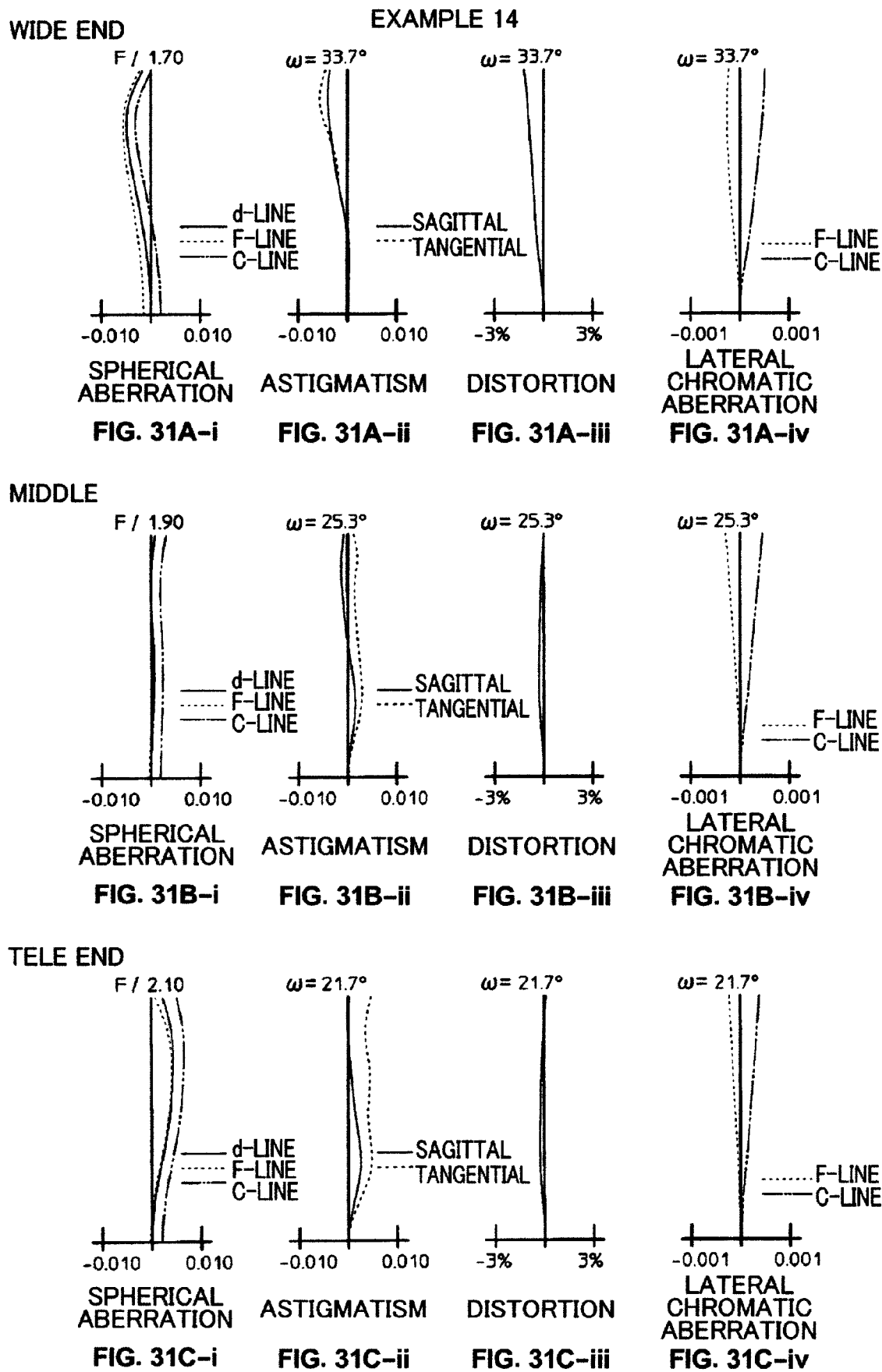

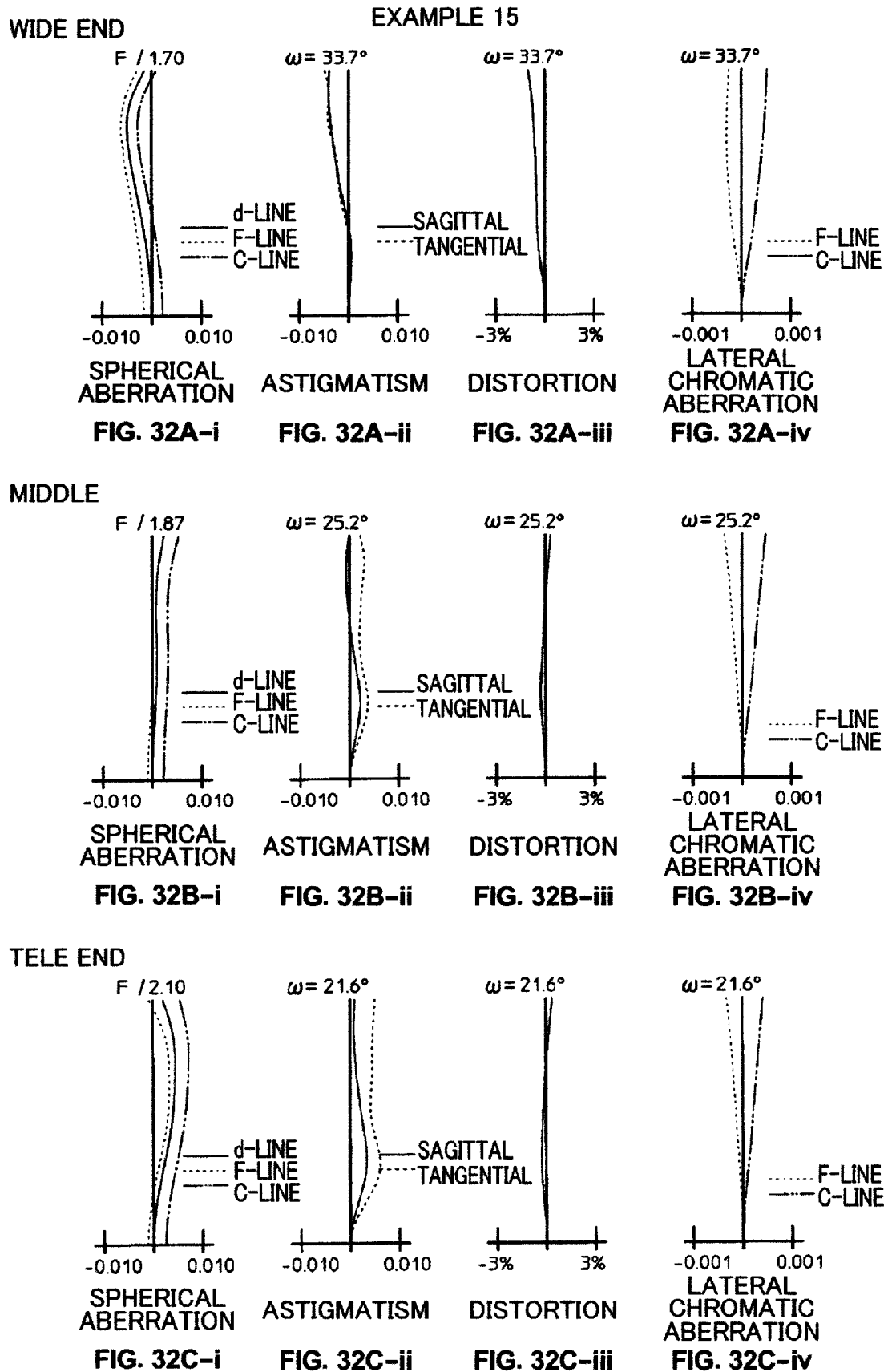

EXAMPLE 16
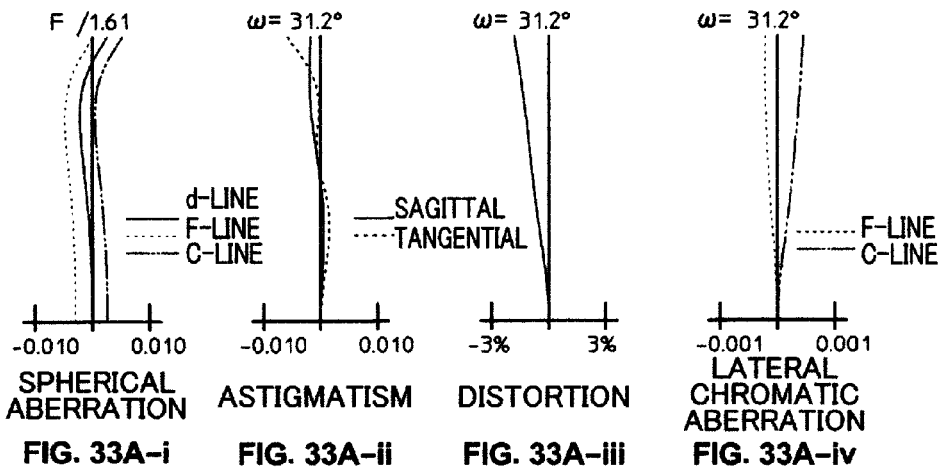
FIG. 33A-i  FIG. 33A-ii  FIG. 33A-iii  FIG. 33A-iv
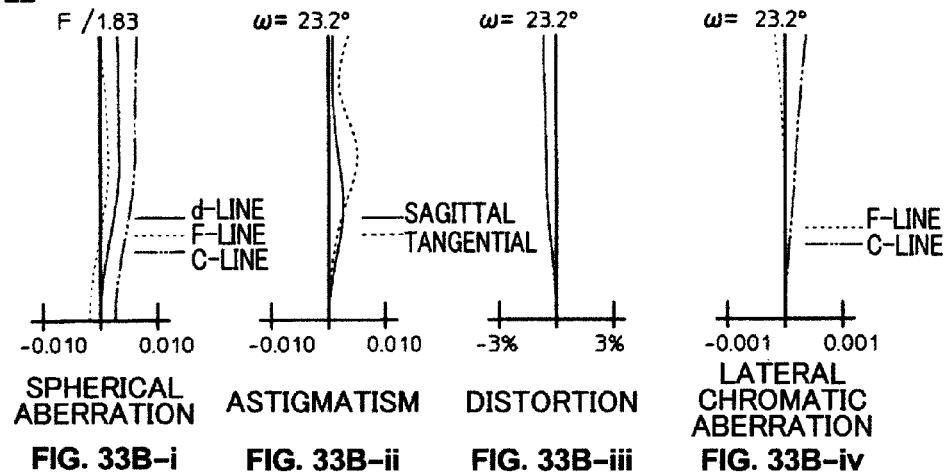
FIG. 33B-i  FIG. 33B-ii  FIG. 33B-iii  FIG. 33B-iv
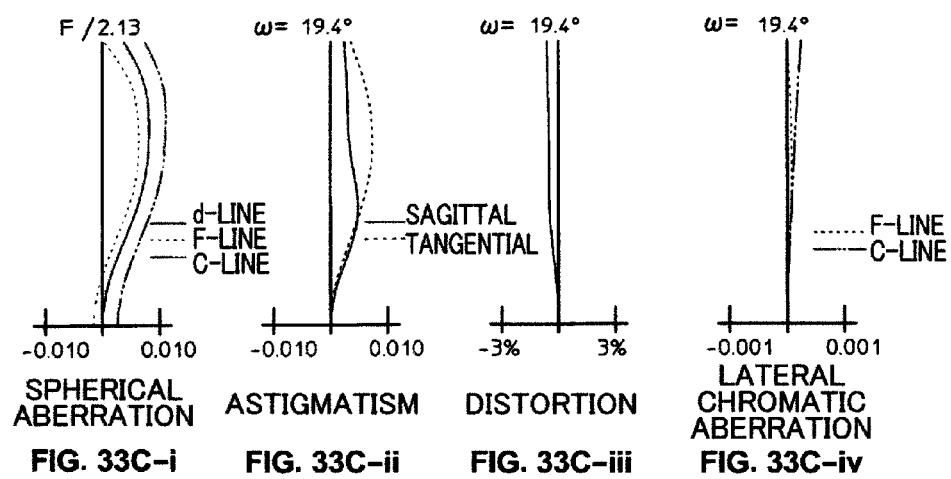
FIG. 33C-i  FIG. 33C-ii  FIG. 33C-iii  FIG. 33C-iv

EXAMPLE 17
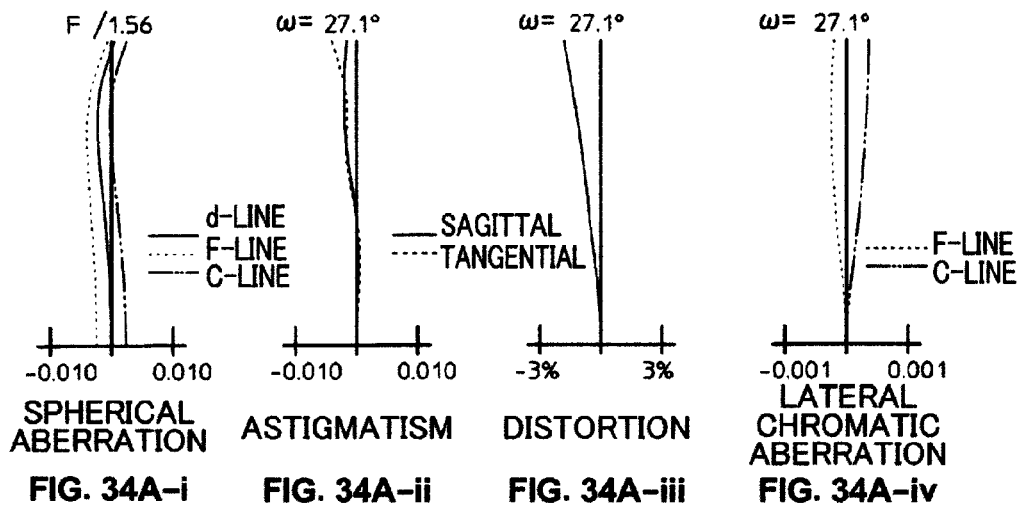
WIDE END
FIG. 34A-i  FIG. 34A-ii  FIG. 34A-iii  FIG. 34A-iv
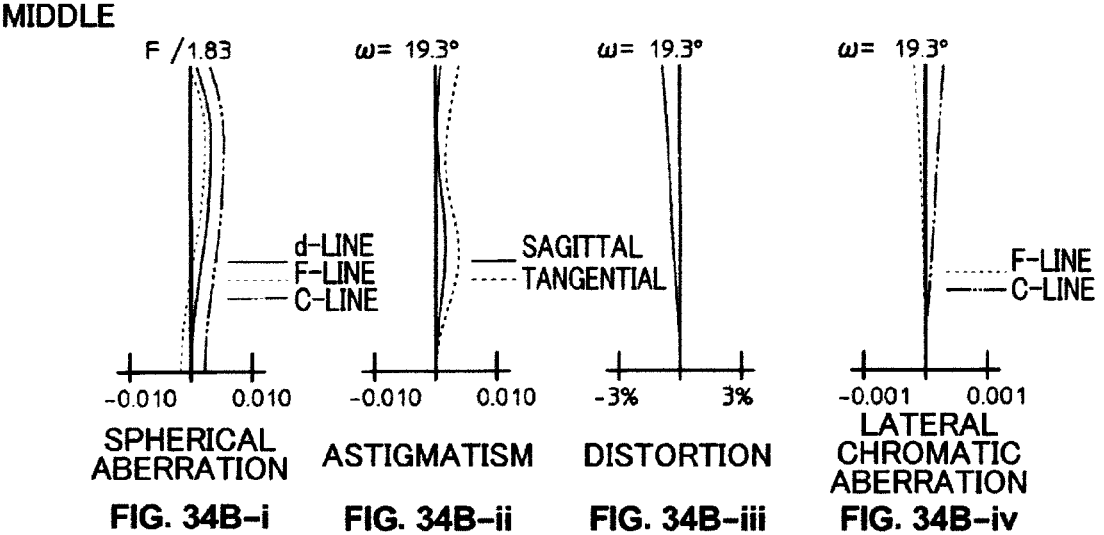
MIDDLE
FIG. 34B-i  FIG. 34B-ii  FIG. 34B-iii  FIG. 34B-iv
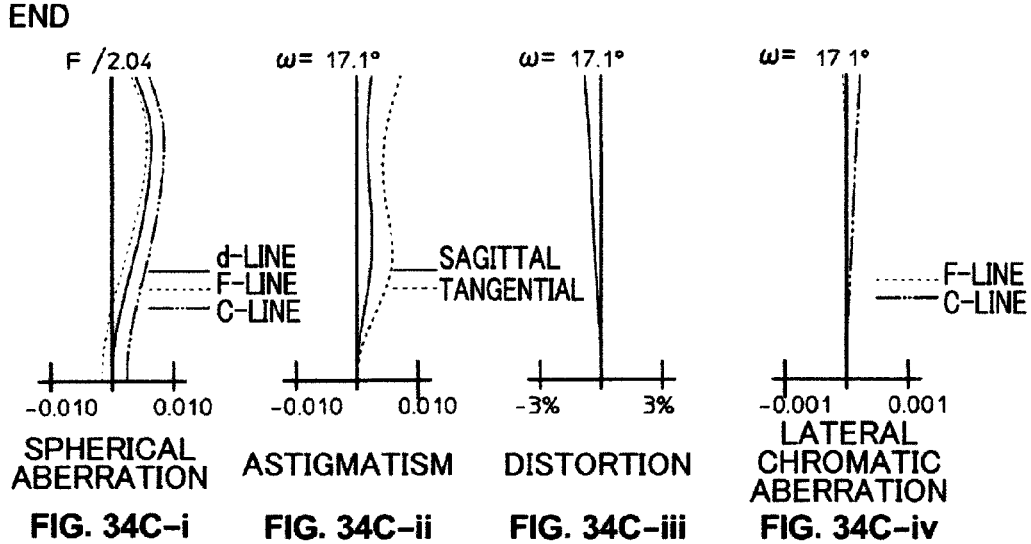
TELE END
FIG. 34C-i  FIG. 34C-ii  FIG. 34C-iii  FIG. 34C-iv

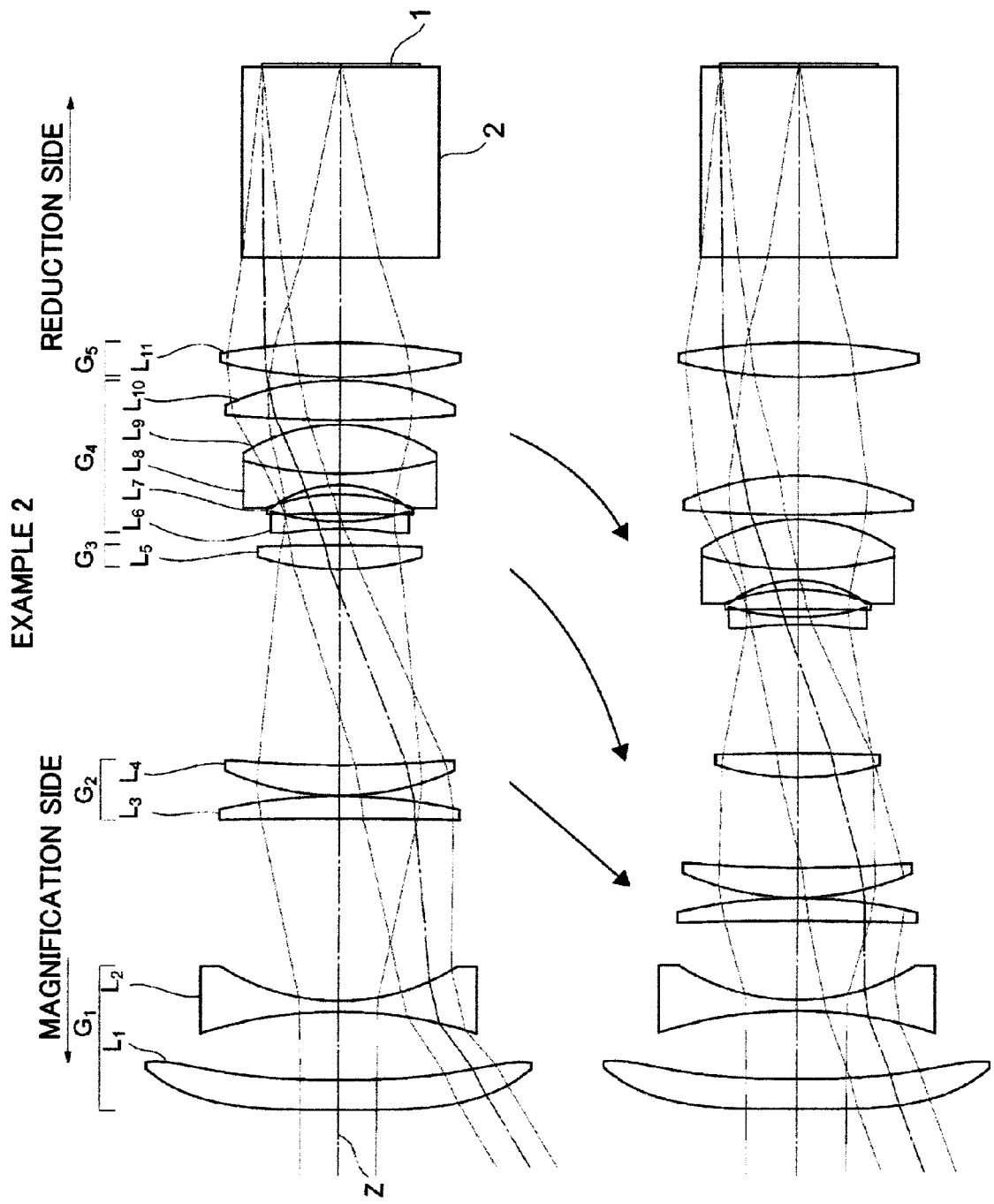
FIG.35A WIDE END
FIG.35B TELE END

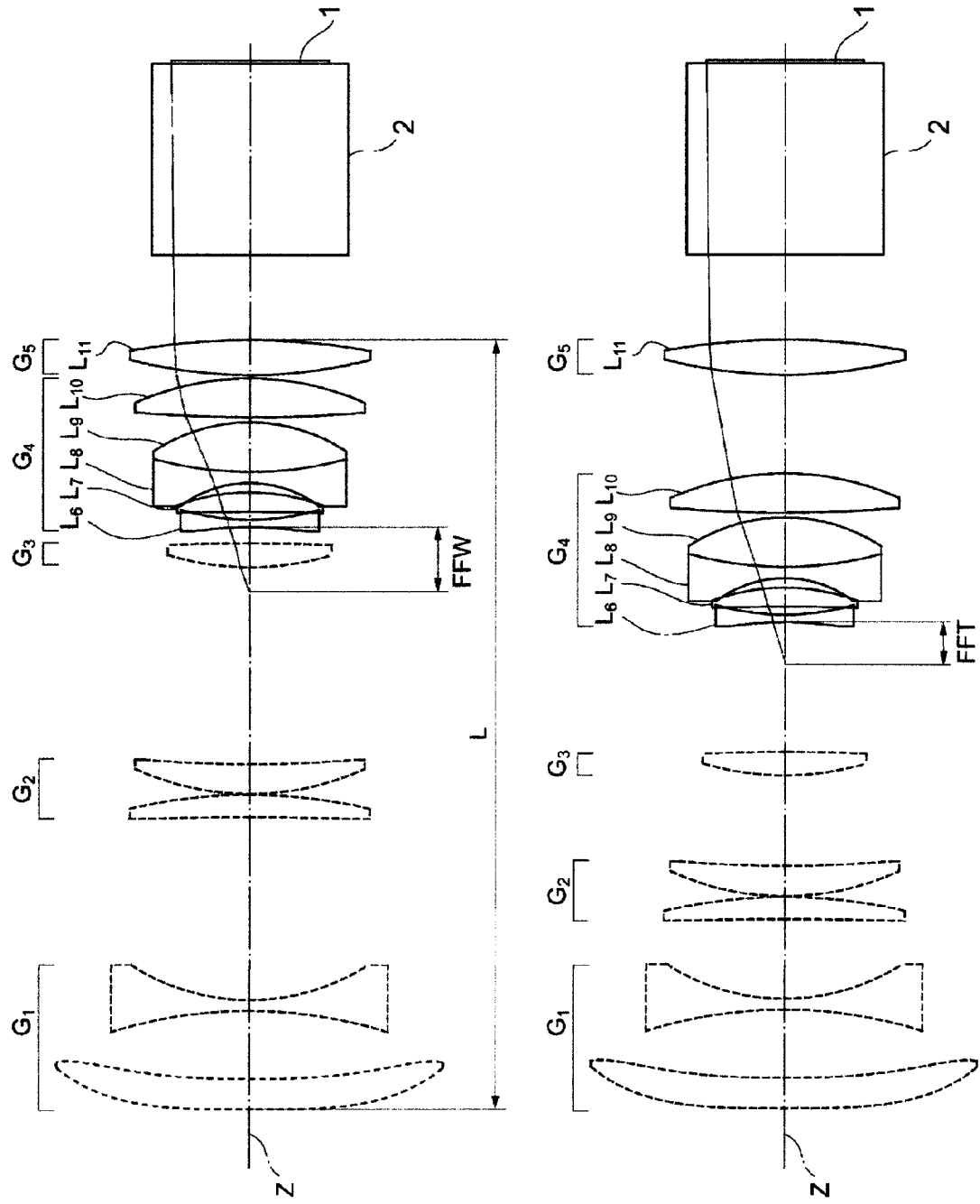
FIG.36A WIDE END
FIG.36B TELE END

ZOOM LENS FOR PROJECTION AND PROJECTION-TYPE DISPLAY APPARATUS

BACKGROUND OF THE INVENTION

1. Field of the Invention

The present invention relates to a zoom lens for projection composed of five lens groups, and a projection-type display apparatus on which the zoom lens for projection is mounted. In particular, the present invention relates to a zoom lens for projection and a projection-type display apparatus that are appropriate for magnified projection of a light beam output from a light bulb onto a screen. The light beam to be projected is output from the light bulb of a transmission-type or reflection-type liquid crystal display device, a DMD (digital micromirror device) display device or the like, and carries image or video information.

2. Description of the Related Art

In recent years, projection-type display devices, such as liquid crystal display devices and DMD display devices, which use light bulbs, became widely used. Especially, a projection-type display device using three light bulbs corresponding to illumination light of RGB primary colors to modulate the illumination light of respective colors are widely used. In the projection-type display device using three light bulbs, light modulated by the respective light bulbs is combined by a prism or the like, and an image is displayed on a screen through a projection lens.

A projection lens that is mounted on the above-mentioned projection-type display device, which combines modulation light output from three light bulbs by using a color combination optical system, requires long back focus to arrange a prism or the like for combining colors, and to prevent thermal problems or the like. Further, the spectrum characteristics of the color combination optical system change depending on the incident angle of light entering the color combination optical system. Therefore, the projection lens needs to have a characteristic that the entrance pupil viewed from the reduction side is located sufficiently far, in other words, the projection lens needs to be telecentric. Further, it is necessary that the projection lens has a low F-number, and that aberrations are corrected appropriately for the resolution of the light bulbs.

Further, a zoom lens, which can change the size of an image projected onto the screen, is often used as the projection lens. Recently, a zoom lens that can change the size of the image at a high ratio, in other words, a zoom lens with a high zoom ratio is needed. Further, as the price of a projector has become lower, the cost of the projection lens needs to be reduced.

Conventionally, a zoom lens composed of five lens groups, three of which move when magnification is changed, and the small conjugate length side of the zoom lens being substantially telecentric is, disclosed, for example, in U.S. Pat. No. 7,522,348 (Patent Document 1), Specification of Japanese Patent Application No. 2008-293932 (Patent Document 2) and Specification of Japanese Patent Application No. 2008-312145 (Patent Document 3).

The zoom lens disclosed in Patent Document 1 has a low F-number. Although the total number of lenses in Patent Document 1 is small, various aberrations are corrected in a relatively excellent manner. However, the zoom ratio of the zoom lens disclosed in Patent Document 1 is only 1.2 times. If the zoom ratio is increased without changing the structure of the zoom lens disclosed in Patent Document 1, variation of aberrations increases, and it becomes impossible to maintain the good performance of the lens.

Meanwhile, the zoom lenses disclosed in Patent Documents 2 and 3 have low F-numbers. Further, the zoom ratios are approximately 1.6 times, which is high, and various aberrations are corrected in a relatively excellent manner in spite of the high zoom ratio. However, the total number of lenses is 13, which is many. Further, since anomalous dispersion glass is used as the glass material of the zoom lenses, the need for reducing the production cost of zoom lenses is not satisfied.

SUMMARY OF THE INVENTION

In view of the foregoing circumstances, it is an object of the present invention to provide a zoom lens for projection composed of five lens groups that can be produced at low cost. Further, it is an object of the present invention to provide the zoom lens that has a low F-number of less than or equal to 1.7 at wide end, while realizing a zoom ratio 1.6 times or higher. Further, it is an object of the present invention to provide the zoom lens for projection that can correct various aberrations in an excellent manner for the whole range of variable magnification. Further, it is another object of the present invention to provide a projection-type display device including the zoom lens for projection.

A zoom lens for projection according to the first aspect of the present invention is a zoom lens for projection comprising:

a first lens group having negative refractive power;
a second lens group having positive refractive power;
a third lens group having positive refractive power;
a fourth lens group; and
a fifth lens group having positive refractive power, which are sequentially arranged from the magnification side of the zoom lens, wherein the first lens group and the fifth lens group are fixed, and the second lens group, the third lens group and the fourth lens group move along the optical axis of the zoom lens when magnification of the zoom lens is changed, and wherein each of the first lens group and the second lens group is composed of two lenses, and wherein each of the third lens group and the fifth lens group is composed of a positive lens, and wherein the fourth lens group is composed of five lenses, and wherein the reduction side of the zoom lens is telecentric.

In the zoom lens for projection according to the first aspect of the present invention, it is desirable that the second lens group is composed of two positive lenses, and satisfies the following formulas (1) and (2):

$$0.5 < (R3a + R3b)/(R3a - R3b) \quad (1); \text{ and}$$

$$(R4a + R4b)/(R4a - R4b) < -1 \quad (2), \text{ where}$$

R3a: curvature radius of a magnification-side surface of the third lens from the magnification side of the zoom lens, the third lens being the magnification-side lens in the second lens group, R3b: curvature radius of a reduction-side surface of the third lens from the magnification side of the zoom lens, the third lens being the magnification-side lens in the second lens group), R4a: curvature radius of a magnification-side surface of the fourth lens from the magnification side of the zoom lens, the fourth lens being the reduction-side lens in the second lens group, and R4b: curvature radius of a reduction-side surface of the fourth lens from the magnification side of the zoom lens, the fourth lens being the reduction-side lens in the second lens group.

A zoom lens for projection according to the second aspect of the present invention is a zoom lens for projection comprising:
a first lens group having negative refractive power;
a second lens group having positive refractive power;
a third lens group having positive refractive power;
a fourth lens group; and
a fifth lens group having positive refractive power, which are sequentially arranged from the magnification side of the zoom lens,
wherein the first lens group and the fifth lens group are fixed, and the second lens group, the third lens group and the fourth lens group move along the optical axis of the zoom lens when magnification of the zoom lens is changed, and
wherein the reduction side of the zoom lens is telecentric, and
wherein the Abbe number vd of glass material forming all lenses in each of the lens groups is less than or equal to 80, and the most-reduction-side lens in the fourth lens group is a positive lens, and
wherein the following formulas (3) and (4) are satisfied:

$$vd(a)<30 \quad (3);$$

$$0.01<\theta gF(a)-(0.6415-0.001618 \times vd(a)) \quad (4),\text{ where}$$

vd(a): Abbe number of the most-reduction-side lens in the fourth lens group,
θgF(a): partial dispersion ratio of the most-reduction-side lens in the fourth lens group when partial dispersion ratio θgF is represented by (Ng−NF)/(NF−NC),
Ng: refractive index of lens glass material for g-line,
NF: refractive index of lens glass material for F-line, and
NC: refractive index of lens glass material for C-line.
Further, it is desirable that the following formula (5) is satisfied:

$$1.5<fa/fw<3.0 \quad (5),\text{ where}$$

fa: focal length of the most-reduction-side lens in the fourth lens group, and
fw: focal length of the entire system of the zoom lens at wide end.
In the zoom lens for projection according to the first aspect of the present invention and the zoom lens for projection according to the second aspect of the present invention, it is desirable that the following formula (6) is satisfied:

$$|FFW(4,5)/L|<0.2 \quad (6),\text{ where}$$

FFW (4,5): absolute value of distance between a front-side combined focal position of the fourth lens group and the fifth lens group and the most-magnification-side lens surface of the fourth lens group at wide end, and
L: absolute value of distance from an apex of a most-magnification-side lens surface in the entire system of the zoom lens to an apex of a most-reduction-side lens surface in the entire system of the zoom lens.
Further, in the zoom lens for projection according to the first aspect of the present invention and the zoom lens for projection according to the second aspect of the present invention, it is desirable that the following formula (7) is satisfied:

$$|(FFT(4,5)-FFW(4,5))/L|<0.2 \quad (7),\text{ where}$$

FFW (4,5): absolute value of distance between a front-side combined focal position of the fourth lens group and the fifth lens group and the most-magnification-side lens surface of the fourth lens group at wide end,
FFT (4,5): absolute value of distance between a front-side combined focal position of the fourth lens group and the fifth lens group and the most-magnification-side lens surface of the fourth lens group at tele end, and
L: absolute value of distance from an apex of a most-magnification-side lens surface in the entire system of the zoom lens to an apex of a most-reduction-side lens surface in the entire system of the zoom lens.
Further, in the zoom lens for projection according to the first aspect of the present invention and the zoom lens for projection according to the second aspect of the present invention, it is desirable that the following formula (8) is satisfied:

$$0.3<f_2/f_3<1.2 \quad (8),\text{ where}$$

$f_2$: focal length of the second lens group, and
$f_3$: focal length of the third lens group.
Further, in the zoom lens for projection according to the first aspect of the present invention and the zoom lens for projection according to the second aspect of the present invention, it is desirable that the following formula (9) is satisfied:

$$1.0<Bf/fw \quad (9),\text{ where}$$

Bf: back focus in air on the reduction side, and
fw: focal length of the entire system of the zoom lens at wide end.
Further, in the zoom lens for projection according to the first aspect of the present invention and the zoom lens for projection according to the second aspect of the present invention, the fourth lens group may be composed of five lenses of a negative lens, a positive lens, a negative lens, a positive lens, and a positive lens, which are sequentially arranged from the magnification side. In this case, it is desirable that the negative lens that is the third lens from the magnification side and the positive lens that is the fourth lens from the magnification side in the fourth lens group are cemented together to form a cemented lens.
In the zoom lens for projection according to the second aspect of the present invention, the fourth lens group may be composed of six lenses of a negative lens, a positive lens, a positive lens, a negative lens, a positive lens, and a positive lens, which are sequentially arranged from the magnification side. In this case, it is desirable that the negative lens that is the first lens from the magnification side and the positive lens that is the second lens from the magnification side in the fourth lens group are cemented together to form a cemented lens, and that the negative lens that is the fourth lens from the magnification side and the positive lens that is the fifth lens from the magnification side in the fourth lens group are cemented together to form a cemented lens.
Further, in the zoom lens for projection according to the first aspect of the present invention and the zoom lens for projection according to the second aspect of the present invention, it is desirable that the first lens group includes at least an aspheric surface.
Further, in the zoom lens for projection according to the first aspect of the present invention and the zoom lens for projection according to the second aspect of the present invention, it is desirable that the first lens group is composed of an aspheric lens and a negative single lens, which are sequentially arranged from the magnification side.
Further, in the zoom lens for projection according to the first aspect of the present invention and the zoom lens for projection according to the second aspect of the present invention, it is desirable that all lenses in the second lens group, the third lens group, the fourth lens group, and the fifth lens group are spherical lenses.

Further, in the zoom lens for projection according to the first aspect of the present invention and the zoom lens for projection according to the second aspect of the present invention, it is desirable that focusing is performed by moving the first lens group in the direction of the optical axis of the zoom lens.

A projection-type display apparatus according to the present invention is a projection-type display apparatus comprising:

a light source;

a light bulb;

an illumination optical unit that guides a light beam from the light source to the light bulb; and one of the aforementioned zoom lenses for projection according to the present invention, wherein the light bulb performs light modulation on the light beam output from the light source, and wherein the zoom lens for projection projects an image onto a screen.

The term "magnification side" refers to the projected side (screen side). When reduction projection is performed, the screen side is also referred to as the magnification side, for convenience. The term "reduction side" refers to the original image display region side (light bulb side). When reduction projection is performed, the light bulb side is also referred to as the reduction side.

In the zoom lens for projection according to the first aspect of the present invention and the projection-type display apparatus using the zoom lens for projection, the negative first lens group, the positive second lens group, the positive third lens group, the fourth lens group, and the positive fifth lens group are sequentially arranged from the magnification side of the zoom lens. The first lens group and the fifth lens group are fixed, and the second lens group, the third lens group and the fourth lens group move along the optical axis of the zoom lens when magnification of the zoom lens is changed. Further, each of the first lens group and the second lens group is composed of two lenses, and the third lens group is composed of a positive lens. The fourth lens group is composed of five lenses, and the fifth lens group is composed of a positive lens. The zoom lens for projection is composed of 11 lenses in total.

Since the zoom lens for projection according to the first aspect of the present invention and the projection-type display apparatus are structured as described above, it is possible to realizes a zoom ratio that is higher than or equal to 1.6 times, while making the F-number at wide end lower than or equal to 1.7, which is low. Further, it is possible to greatly reduce the number of lenses, while correcting various aberrations in an excellent manner through the whole range of variable magnification. Therefore, it is possible to reduce the production cost, compared with the conventional technique.

Further, in the zoom lens for projection according to the second aspect of the present invention and the projection-type display apparatus using the zoom lens for projection, the negative first lens group, the positive second lens, the positive third lens group, the fourth lens group, and the positive fifth lens group are sequentially arranged from the magnification side of the zoom lens. The first lens group and the fifth lens group are fixed, and the second lens group, the third lens group and the fourth lens group move along the optical axis of the zoom lens when magnification of the zoom lens is changed. Further, the reduction side of the zoom lens is telecentric. The Abbe number vd of glass material forming all lenses in each of the lens groups is less than or equal to 80, and the most-reduction-side lens in the fourth lens group is a positive lens. Further, the aforementioned formulas (3) and (4) are satisfied.

When the formulas (3) and (4) are satisfied, it is possible to suppress variation of lateral chromatic aberration without using anomalous dispersion glass, while realizing a high zoom ratio that is higher than or equal to 1.6 times.

Since the zoom lens for projection according to the second aspect of the present invention and the projection-type display apparatus are structured as described above, it is possible to realize a zoom ratio that is higher than or equal to 1.6 times, while making the F-number at wide end lower than or equal to 1.7. Further, it is possible to avoid use of anomalous dispersion glass as the glass material for a lens, while correcting various aberrations, such as lateral chromatic aberration, in an excellent manner through the whole range of variable magnification. Therefore, it is possible to reduce the production cost, compared with the conventional technique.

BRIEF DESCRIPTION OF THE DRAWINGS

FIG. 1A is a schematic diagram illustrating the structure of a zoom lens for projection in Example 1 of the present invention at wide end;

FIG. 1B is a schematic diagram illustrating the structure of a zoom lens for projection in Example 1 of the present invention at tele end;

FIG. 2A is a schematic diagram illustrating the structure of a zoom lens for projection in Example 2 of the present invention at wide end;

FIG. 2B is a schematic diagram illustrating the structure of a zoom lens for projection in Example 2 of the present invention at tele end;

FIG. 3A is a schematic diagram illustrating the structure of a zoom lens for projection in Example 3 of the present invention at wide end;

FIG. 3B is a schematic diagram illustrating the structure of a zoom lens for projection in Example 3 of the present invention at tele end;

FIG. 4A is a schematic diagram illustrating the structure of a zoom lens for projection in Example 4 of the present invention at wide end;

FIG. 4B is a schematic diagram illustrating the structure of a zoom lens for projection in Example 4 of the present invention at tele end;

FIG. 5A is a schematic diagram illustrating the structure of a zoom lens for projection in Example 5 of the present invention at wide end;

FIG. 5B is a schematic diagram illustrating the structure of a zoom lens for projection in Example 5 of the present invention at tele end;

FIG. 6A is a schematic diagram illustrating the structure of a zoom lens for projection in Example 6 of the present invention at wide end;

FIG. 6B is a schematic diagram illustrating the structure of a zoom lens for projection in Example 6 of the present invention at tele end;

FIG. 7A is a schematic diagram illustrating the structure of a zoom lens for projection in Example 7 of the present invention at wide end;

FIG. 7B is a schematic diagram illustrating the structure of a zoom lens for projection in Example 7 of the present invention at tele end;

FIG. 8A is a schematic diagram illustrating the structure of a zoom lens for projection in Example 8 of the present invention at wide end;

FIG. 8B is a schematic diagram illustrating the structure of a zoom lens for projection in Example 8 of the present invention at tele end;

FIG. 9A is a schematic diagram illustrating the structure of a zoom lens for projection in Example 9 of the present invention at wide end;

FIG. 9B is a schematic diagram illustrating the structure of a zoom lens for projection in Example 9 of the present invention at tele end;

FIG. 10A is a schematic diagram illustrating the structure of a zoom lens for projection in Example 10 of the present invention at wide end;

FIG. 10B is a schematic diagram illustrating the structure of a zoom lens for projection in Example 10 of the present invention at tele end;

FIG. 11A is a schematic diagram illustrating the structure of a zoom lens for projection in Example 11 of the present invention at wide end;

FIG. 11B is a schematic diagram illustrating the structure of a zoom lens for projection in Example 11 of the present invention at tele end;

FIG. 12A is a schematic diagram illustrating the structure of a zoom lens for projection in Example 12 of the present invention at wide end;

FIG. 12B is a schematic diagram illustrating the structure of a zoom lens for projection in Example 12 of the present invention at tele end;

FIG. 13A is a schematic diagram illustrating the structure of a zoom lens for projection in Example 13 of the present invention at wide end;

FIG. 13B is a schematic diagram illustrating the structure of a zoom lens for projection in Example 13 of the present invention at tele end;

FIG. 14A is a schematic diagram illustrating the structure of a zoom lens for projection in Example 14 of the present invention at wide end;

FIG. 14B is a schematic diagram illustrating the structure of a zoom lens for projection in Example 14 of the present invention at tele end;

FIG. 15A is a schematic diagram illustrating the structure of a zoom lens for projection in Example 15 of the present invention at wide end;

FIG. 15B is a schematic diagram illustrating the structure of a zoom lens for projection in Example 15 of the present invention at tele end;

FIG. 16A is a schematic diagram illustrating the structure of a zoom lens for projection in Example 16 of the present invention at wide end;

FIG. 16B is a schematic diagram illustrating the structure of a zoom lens for projection in Example 16 of the present invention at tele end;

FIG. 17A is a schematic diagram illustrating the structure of a zoom lens for projection in Example 17 of the present invention at wide end;

FIG. 17B is a schematic diagram illustrating the structure of a zoom lens for projection in Example 17 of the present invention at tele end;

FIGS. 18A-$i$, 18A-ii, 18A-iii and 18A-iv are aberration diagrams illustrating various aberrations (spherical aberration, astigmatism, distortion, and lateral chromatic aberration, respectively) of a zoom lens for projection in Example 1 at wide end (WIDE);

FIGS. 18B-$i$, 18B-ii, 18B-iii and 18B-iv are aberration diagrams illustrating various aberrations (spherical aberration, astigmatism, distortion, and lateral chromatic aberration, respectively) of a zoom lens for projection in Example 1 at middle position (MIDDLE);

FIGS. 18C-$i$, 18C-ii, 18C-iii and 18C-iv are aberration diagrams illustrating various aberrations (spherical aberration, astigmatism, distortion, and lateral chromatic aberration, respectively) of a zoom lens for projection in Example 1 at tele end (TELE);

FIGS. 19A-$i$, 19A-ii, 19A-iii and 19A-iv are aberration diagrams illustrating various aberrations (spherical aberration, astigmatism, distortion, and lateral chromatic aberration, respectively) of a zoom lens for projection in Example 2 at wide end (WIDE);

FIGS. 19B-$i$, 19B-ii, 19B-iii and 19B-iv are aberration diagrams illustrating various aberrations (spherical aberration, astigmatism, distortion, and lateral chromatic aberration, respectively) of a zoom lens for projection in Example 2 at middle position (MIDDLE);

FIGS. 19C-$i$, 19C-ii, 19C-iii and 19C-iv are aberration diagrams illustrating various aberrations (spherical aberration, astigmatism, distortion, and lateral chromatic aberration, respectively) of a zoom lens for projection in Example 2 at tele end (TELE);

FIGS. 20A-$i$, 20A-ii, 20A-iii and 20A-iv are aberration diagrams illustrating various aberrations (spherical aberration, astigmatism, distortion, and lateral chromatic aberration, respectively) of a zoom lens for projection in Example 3 at wide end (WIDE);

FIGS. 20B-$i$, 20B-ii, 20B-iii and 20B-iv are aberration diagrams illustrating various aberrations (spherical aberration, astigmatism, distortion, and lateral chromatic aberration, respectively) of a zoom lens for projection in Example 3 at middle position (MIDDLE);

FIGS. 20C-$i$, 20C-ii, 20C-iii and 20C-iv are aberration diagrams illustrating various aberrations (spherical aberration, astigmatism, distortion, and lateral chromatic aberration, respectively) of a zoom lens for projection in Example 3 at tele end (TELE);

FIGS. 21A-$i$, 21A-ii, 21A-iii and 21A-iv are aberration diagrams illustrating various aberrations (spherical aberration, astigmatism, distortion, and lateral chromatic aberration, respectively) of a zoom lens for projection in Example 4 at wide end (WIDE);

FIGS. 21B-$i$, 21B-ii, 21B-iii and 21B-iv are aberration diagrams illustrating various aberrations (spherical aberration, astigmatism, distortion, and lateral chromatic aberration, respectively) of a zoom lens for projection in Example 4 at middle position (MIDDLE);

FIGS. 21C-$i$, 21C-ii, 21C-iii and 21C-iv are aberration diagrams illustrating various aberrations (spherical aberration, astigmatism, distortion, and lateral chromatic aberration, respectively) of a zoom lens for projection in Example 4 at tele end (TELE);

FIGS. 22A-$i$, 22A-ii, 22A-iii and 22A-iv are aberration diagrams illustrating various aberrations (spherical aberration, astigmatism, distortion, and lateral chromatic aberration, respectively) of a zoom lens for projection in Example 5 at wide end (WIDE);

FIGS. 22B-$i$, 22B-ii, 22B-iii and 22B-iv are aberration diagrams illustrating various aberrations (spherical aberration, astigmatism, distortion, and lateral chromatic aberration, respectively) of a zoom lens for projection in Example 5 at middle position (MIDDLE);

FIGS. 22C-$i$, 22C-ii, 22C-iii and 22C-iv are aberration diagrams illustrating various aberrations (spherical aberration, astigmatism, distortion, and lateral chromatic aberration, respectively) of a zoom lens for projection in Example 5 at tele end (TELE);

FIGS. 23A-$i$, 23A-ii, 23A-iii and 23A-iv are aberration diagrams illustrating various aberrations (spherical aberration, astigmatism, distortion, and lateral chromatic aberration, respectively) of a zoom lens for projection in Example 6 at wide end (WIDE);

FIGS. 23B-i, 23B-ii, 23B-iii and 23B-iv are aberration diagrams illustrating various aberrations (spherical aberration, astigmatism, distortion, and lateral chromatic aberration, respectively) of a zoom lens for projection in Example 6 at middle position (MIDDLE);

FIGS. 23C-i, 23C-ii, 23C-iii and 23C-iv are aberration diagrams illustrating various aberrations (spherical aberration, astigmatism, distortion, and lateral chromatic aberration, respectively) of a zoom lens for projection in Example 6 at tele end (TELE);

FIGS. 24A-i, 24A-ii, 24A-iii and 24A-iv are aberration diagrams illustrating various aberrations (spherical aberration, astigmatism, distortion, and lateral chromatic aberration, respectively) of a zoom lens for projection in Example 7 at wide end (WIDE);

FIGS. 24B-i, 24B-ii, 24B-iii and 24B-iv are aberration diagrams illustrating various aberrations (spherical aberration, astigmatism, distortion, and lateral chromatic aberration, respectively) of a zoom lens for projection in Example 7 at middle position (MIDDLE);

FIGS. 24C-i, 24C-ii, 24C-iii and 24C-iv are aberration diagrams illustrating various aberrations (spherical aberration, astigmatism, distortion, and lateral chromatic aberration, respectively) of a zoom lens for projection in Example 7 at tele end (TELE);

FIGS. 25A-i, 25A-ii, 25A-iii and 25A-iv are aberration diagrams illustrating various aberrations (spherical aberration, astigmatism, distortion, and lateral chromatic aberration, respectively) of a zoom lens for projection in Example 8 at wide end (WIDE);

FIGS. 25B-i, 25B-ii, 25B-iii and 25B-iv are aberration diagrams illustrating various aberrations (spherical aberration, astigmatism, distortion, and lateral chromatic aberration, respectively) of a zoom lens for projection in Example 8 at middle position (MIDDLE);

FIGS. 25C-i, 25C-ii, 25C-iii and 25C-iv are aberration diagrams illustrating various aberrations (spherical aberration, astigmatism, distortion, and lateral chromatic aberration, respectively) of a zoom lens for projection in Example 8 at tele end (TELE);

FIGS. 26A-i, 26A-ii, 26A-iii and 26A-iv are aberration diagrams illustrating various aberrations (spherical aberration, astigmatism, distortion, and lateral chromatic aberration, respectively) of a zoom lens for projection in Example 9 at wide end (WIDE);

FIGS. 26B-i, 26B-ii, 26B-iii and 26B-iv are aberration diagrams illustrating various aberrations (spherical aberration, astigmatism, distortion, and lateral chromatic aberration, respectively) of a zoom lens for projection in Example 9 at middle position (MIDDLE);

FIGS. 26C-i, 26C-ii, 26C-iii and 26C-iv are aberration diagrams illustrating various aberrations (spherical aberration, astigmatism, distortion, and lateral chromatic aberration, respectively) of a zoom lens for projection in Example 9 at tele end (TELE);

FIGS. 27A-i, 27A-ii, 27A-iii and 27A-iv are aberration diagrams illustrating various aberrations (spherical aberration, astigmatism, distortion, and lateral chromatic aberration, respectively) of a zoom lens for projection in Example 10 at wide end (WIDE);

FIGS. 27B-i, 27B-ii, 27B-iii and 27B-iv are aberration diagrams illustrating various aberrations (spherical aberration, astigmatism, distortion, and lateral chromatic aberration, respectively) of a zoom lens for projection in Example 10 at middle position (MIDDLE);

FIGS. 27C-i, 27C-ii, 27C-iii and 27C-iv are aberration diagrams illustrating various aberrations (spherical aberration, astigmatism, distortion, and lateral chromatic aberration, respectively) of a zoom lens for projection in Example 10 at tele end (TELE);

FIGS. 28A-i, 28A-ii, 28A-iii and 28A-iv are aberration diagrams illustrating various aberrations (spherical aberration, astigmatism, distortion, and lateral chromatic aberration, respectively) of a zoom lens for projection in Example 11 at wide end (WIDE);

FIGS. 28B-i, 28B-ii, 28B-iii and 28B-iv are aberration diagrams illustrating various aberrations (spherical aberration, astigmatism, distortion, and lateral chromatic aberration, respectively) of a zoom lens for projection in Example 11 at middle position (MIDDLE);

FIGS. 28C-i, 28C-ii, 28C-iii and 28C-iv are aberration diagrams illustrating various aberrations (spherical aberration, astigmatism, distortion, and lateral chromatic aberration, respectively) of a zoom lens for projection in Example 11 at tele end (TELE);

FIGS. 29A-i, 29A-ii, 29A-iii and 29A-iv are aberration diagrams illustrating various aberrations (spherical aberration, astigmatism, distortion, and lateral chromatic aberration, respectively) of a zoom lens for projection in Example 12 at wide end (WIDE);

FIGS. 29B-i, 29B-ii, 29B-iii and 29B-iv are aberration diagrams illustrating various aberrations (spherical aberration, astigmatism, distortion, and lateral chromatic aberration, respectively) of a zoom lens for projection in Example 12 at middle position (MIDDLE);

FIGS. 29C-i, 29C-ii, 29C-iii and 29C-iv are aberration diagrams illustrating various aberrations (spherical aberration, astigmatism, distortion, and lateral chromatic aberration, respectively) of a zoom lens for projection in Example 12 at tele end (TELE);

FIGS. 30A-i, 30A-ii, 30A-iii and 30A-iv are aberration diagrams illustrating various aberrations (spherical aberration, astigmatism, distortion, and lateral chromatic aberration, respectively) of a zoom lens for projection in Example 13 at wide end (WIDE);

FIGS. 30B-i, 30B-ii, 30B-iii and 30B-iv are aberration diagrams illustrating various aberrations (spherical aberration, astigmatism, distortion, and lateral chromatic aberration, respectively) of a zoom lens for projection in Example 13 at middle position (MIDDLE);

FIGS. 30C-i, 30C-ii, 30C-iii and 30C-iv are aberration diagrams illustrating various aberrations (spherical aberration, astigmatism, distortion, and lateral chromatic aberration, respectively) of a zoom lens for projection in Example 13 at tele end (TELE);

FIGS. 31A-i, 31A-ii, 31A-iii and 31A-iv are aberration diagrams illustrating various aberrations (spherical aberration, astigmatism, distortion, and lateral chromatic aberration, respectively) of a zoom lens for projection in Example 14 at wide end (WIDE);

FIGS. 31B-i, 31B-ii, 31B-iii and 31B-iv are aberration diagrams illustrating various aberrations (spherical aberration, astigmatism, distortion, and lateral chromatic aberration, respectively) of a zoom lens for projection in Example 14 at middle position (MIDDLE);

FIGS. 31C-i, 31C-ii, 31C-iii and 31C-iv are aberration diagrams illustrating various aberrations (spherical aberration, astigmatism, distortion, and lateral chromatic aberration, respectively) of a zoom lens for projection in Example 14 at tele end (TELE);

FIGS. 32A-i, 32A-ii, 32A-iii and 32A-iv are aberration diagrams illustrating various aberrations (spherical aberration, astigmatism, distortion, and lateral chromatic aberration, respectively) of a zoom lens for projection in Example 15 at wide end (WIDE);

FIGS. 32B-i, 32B-ii, 32B-iii and 32B-iv are aberration diagrams illustrating various aberrations (spherical aberration, astigmatism, distortion, and lateral chromatic aberration, respectively) of a zoom lens for projection in Example 15 at middle position (MIDDLE);

FIGS. 32C-i, 32C-ii, 32C-iii and 32C-iv are aberration diagrams illustrating various aberrations (spherical aberration, astigmatism, distortion, and lateral chromatic aberration, respectively) of a zoom lens for projection in Example 15 at tele end (TELE);

FIGS. 33A-i, 33A-ii, 33A-iii and 33A-iv are aberration diagrams illustrating various aberrations (spherical aberration, astigmatism, distortion, and lateral chromatic aberration, respectively) of a zoom lens for projection in Example 16 at wide end (WIDE);

FIGS. 33B-i, 33B-ii, 33B-iii and 33B-iv are aberration diagrams illustrating various aberrations (spherical aberration, astigmatism, distortion, and lateral chromatic aberration, respectively) of a zoom lens for projection in Example 16 at middle position (MIDDLE);

FIGS. 33C-i, 33C-ii, 33C-iii and 33C-iv are aberration diagrams illustrating various aberrations (spherical aberration, astigmatism, distortion, and lateral chromatic aberration, respectively) of a zoom lens for projection in Example 16 at tele end (TELE);

FIGS. 34A-i, 34A-ii, 34A-iii and 34A-iv are aberration diagrams illustrating various aberrations (spherical aberration, astigmatism, distortion, and lateral chromatic aberration, respectively) of a zoom lens for projection in Example 17 at wide end (WIDE);

FIGS. 34B-i, 34B-ii, 34B-iii and 34B-iv are aberration diagrams illustrating various aberrations (spherical aberration, astigmatism, distortion, and lateral chromatic aberration, respectively) of a zoom lens for projection in Example 17 at middle position (MIDDLE);

FIGS. 34C-i, 34C-ii, 34C-iii and 34C-iv are aberration diagrams illustrating various aberrations (spherical aberration, astigmatism, distortion, and lateral chromatic aberration, respectively) of a zoom lens for projection in Example 17 at tele end (TELE);

FIG. 35A is a diagram illustrating the structure of the zoom lens for projection in Example 2 of the present invention at wide end, together with optical paths of rays and movement paths of lens groups;

FIG. 35B is a diagram illustrating the structure of the zoom lens for projection in Example 2 of the present invention at tele end, together with optical paths of rays and movement paths of lens groups;

FIG. 36A is a schematic diagram for explaining the effect of the zoom lens for projection according to a first embodiment of the present invention at wide end;

FIG. 36B is a schematic diagram for explaining the effect of the zoom lens for projection according to a first embodiment of the present invention at tele end.

DESCRIPTION OF THE PREFERRED EMBODIMENTS

Figure 37:
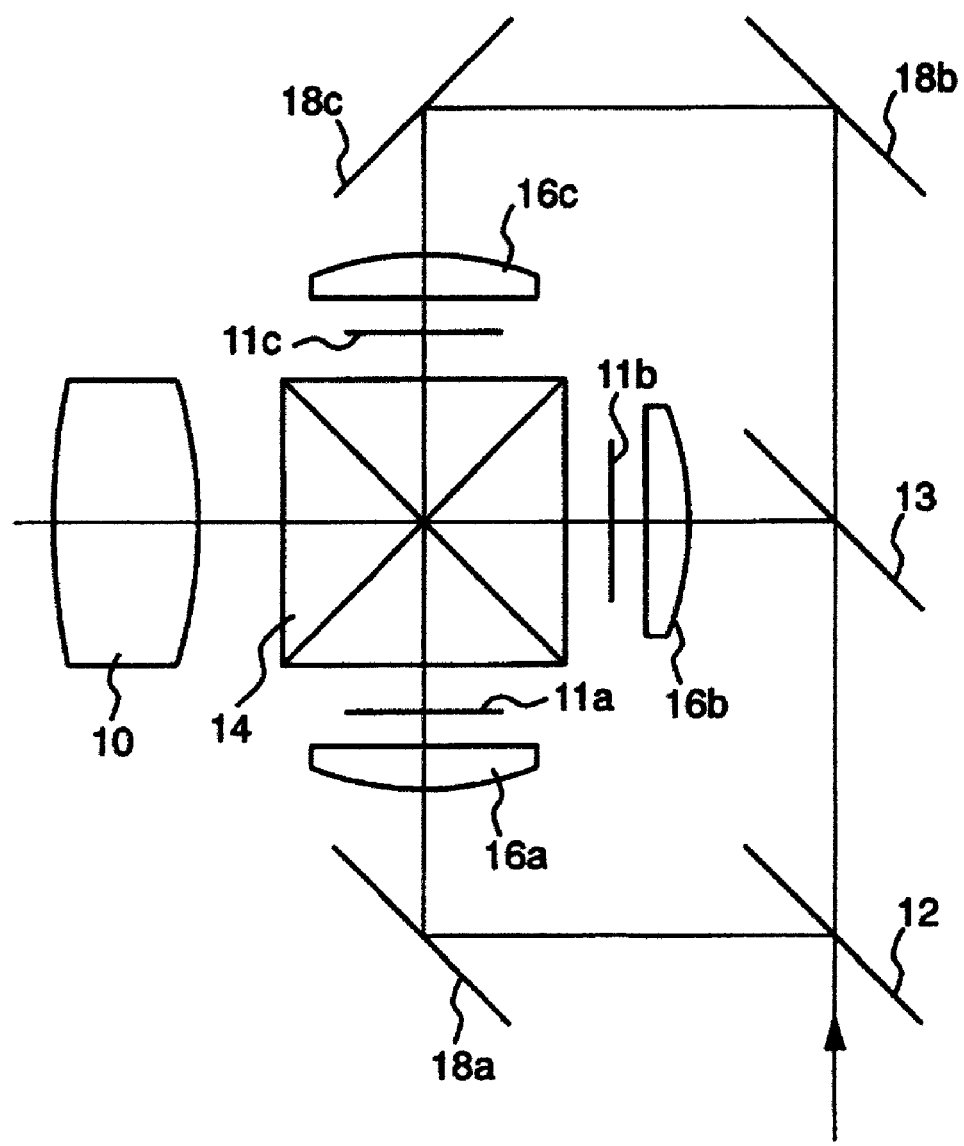
FIG. 37 is a schematic diagram illustrating the structure of a projection-type display apparatus according to an embodiment of the present invention.

Hereinafter, embodiments of the present invention will be described with reference to drawings.

Embodiment 1 (Examples 1 through 13, 16 and 17)

In a zoom lens for projection according to an embodiment of the present invention illustrated in FIGS. 1A and 1B (Example 1 is used as an example), first lens group $G_1$ having negative refractive power, second lens group $G_2$ having positive refractive power, third lens group $G_3$ having positive refractive power, fourth lens group $G_4$, and fifth lens group $G_5$ having positive refractive power are sequentially arranged from the magnification side (screen side) of the zoom lens. Further, a glass block (including a filter portion) 2, which is mainly a color combination prism, and an image display plane 1 of light bulbs, such as a liquid crystal display panel, are arranged after the lens groups.

The zoom lens for projection according to the present embodiment is a retrofocus-type lens. Therefore, a sufficient length of back focus for the focal length of the zoom lens can be secured. Further, it is possible to make the reduction side (light bulb side) substantially telecentric.

In the zoom lens for projection according to the present embodiment, the first lens group $G_1$ and the fifth lens group $G_5$ are fixed, and the second lens group $G_2$, the third lens group $G_3$ and the fourth lens group $G_4$ move along optical axis Z of the zoom lens in such a manner to be independent from each other, when magnification of the zoom lens is changed. The zoom function of the zoom lens for projection may be achieved by structuring the zoom lens in such a manner that two or three of the second lens group $G_2$, the third lens group $G_3$ and the fourth lens group $G_4$ move together as one body.

Since the three lens groups of the second lens group $G_2$, the third lens group $G_3$ and the fourth lens group $G_4$ are movable, it is possible to correct aberrations in an excellent manner, while structuring the zoom lens using a relatively small number of lenses.

In the zoom lens for projection of the first embodiment, each of the first lens group $G_1$ and the second lens group $G_2$ is composed of two lenses, the third lens group $G_3$ is composed of a positive lens, the fourth lens group $G_4$ is composed of five lenses, and the fifth lens group $G_5$ is composed of a positive lens. The zoom lens for projection of the first embodiment is composed of 11 lenses in total.

Since the zoom lens for projection is structured as described above, it is possible to correct various aberrations efficiently by using a small number of lenses. Further, it is possible to provide the zoom lens for projection having a low F-number and a high zoom ratio.

Further, when the zoom lens for projection is structured in such a manner that all movable lens groups (lens groups to be moved) move toward the magnification side when magnification is changed from wide end to tele end, it is possible to set a high variable magnification ratio.

This means that the position of each of the movable lens groups at tele end is set closer to the magnification side, compared with the position of the respective movable lens groups at wide end. Therefore, the movable lens groups may temporarily move toward the reduction side in the middle region between the tele end and the wide end.

An aperture stop is not illustrated in FIGS. 1A and 1B. However, the aperture stop may be arranged at an appropriate position (or a mask may be provided). Further, an aperture stop may move together with a movable lens group (for example, fourth lens group $G_4$) as one body during zooming.

It is desirable that focus is adjusted by moving the first lens group $G_1$ in the direction of optical axis Z. Alternatively, focus may be adjusted by moving a different lens group or groups.

In the zoom lens for projection of the present embodiment, the fourth lens group $G_4$ is composed of a negative lens (sixth lens $L_6$), a positive lens (seventh lens $L_7$), a negative lens (eighth lens $L_8$), a positive lens (ninth lens $L_9$), and a positive lens (10th lens $L_{10}$), which are sequentially arranged from the magnification side.

Since the fourth lens group $G_4$ is structured as described above, it is possible to suppress variation of various aberrations that may be caused by a change in magnification. Especially, since the fourth lens group $G_4$, which includes many lenses, is arranged in the vicinity of the pupil position of the optical system (position at which a principal ray and optical axis Z intersect in FIGS. 36A and 36B), it is possible to effectively correct various aberrations, especially, field curvature (especially, curvature of a sagittal image plane) and distortion. Problems of field curvature and distortion arise when the magnification of the zoom lens for projection is increased or the angle of view of the zoom lens for projection is increased.

Further, it is desirable that the negative lens that is the third lens from the magnification side (eighth lens $L_8$) and the positive lens that is the fourth lens from the magnification side (ninth lens $L_9$) in the fourth lens group $G_4$ are cemented together to form a cemented lens. Accordingly, it is possible to reduce field curvature, distortion, lateral chromatic aberration, and the like.

Further, it is desirable that the first lens group $G_1$ includes at least an aspheric surface.

When the first lens group $G_1$ includes at least an aspheric surface, it is possible to effectively correct aberrations, especially, field curvature and distortion.

When the first lens group $G_1$ is structured in such a manner that an aspheric lens and a negative single lens are sequentially arranged from the magnification side, it is possible to make the structure of the first lens group G1 simple and compact, while securing aberration correction effects.

When the aspheric lens is made of plastic, it is possible to further reduce the production cost.

When all lenses composing each of the second lens group $G_2$ through the fifth lens group $G_5$ are spherical lenses, it is possible to reduce cost.

Further, in the zoom lens for projection according to the first embodiment, it is desirable that at least one of the following formulas (6) and (7) is satisfied:

$$|FFW(4,5)/L|<0.2 \qquad (6)$$

$$|(FFT(4,5)-FFW(4,5))/L|<0.2 \qquad (7), \text{where}$$

FFW(4,5): absolute value of distance between a front-side combined focal position of the fourth lens group $G_4$ and the fifth lens group $G_5$ and the most-magnification-side lens surface of the fourth lens group $G_4$ at wide end, FFT(4,5): absolute value of distance between a front-side combined focal position of the fourth lens group $G_4$ and the fifth lens group $G_5$ and the most-magnification-side lens surface of the fourth lens group $G_4$ at tele end, and L: absolute value of distance from an apex of a most-magnification-side lens surface in the entire system of the zoom lens to an apex of a most-reduction-side lens surface in the entire system of the zoom lens.

When the formula (6) or (7) is satisfied, the following advantageous effects are achieved.

Since the reduction side of the zoom lens for projection of the present embodiment is substantially telecentric, the focal position of parallel light entering the optical system from the reduction side thereof is substantially the same as the position of the pupil of the optical system, as illustrated in FIGS. 36A and 36B. When the formula (6) is satisfied, the position of the pupil at wide end is located in the vicinity of a lens surface closest to the magnification side in the fourth lens group $G_4$. Meanwhile, when the formula (7) is satisfied, the position of the pupil at wide end and the position of the pupil at tele end are close to each other.

Since all rays including central rays to peripheral rays gather in the vicinity of the pupil, if many lenses are arranged in the vicinity of the pupil, it is possible to correct various aberrations in an excellent manner. In the present embodiment, at least one of the formulas (6) and (7) is satisfied, and the fourth lens group $G_4$, which is composed of many lenses, is arranged in the vicinity of the pupil, as illustrated in FIGS. 36A and 36B. Therefore, it is possible to correct various aberrations, such as spherical aberration and field curvature, in an excellent manner. When the formula (7) is satisfied, the distance from the fourth lens group $G_4$ to the pupil position does not substantially change between wide end (FEW) and tele end (FFT). Therefore, it is possible to correct aberrations in an excellent manner for the entire zoom range.

Therefore, it is desirable that the following formula (6') is satisfied instead of the formula (6):

$$|FFW(4,5)/L|<0.15 \qquad (6').$$

Further, it is desirable that the following formula (7') is satisfied instead of the formula (7):

$$|(FFT(4,5)-FFW(4,5))/L|<0.1 \qquad (7').$$

It is even more desirable that the following formula (7") is satisfied instead of the formula (7'):

$$|(FFT(4,5)-FFW(4,5))/L|<0.08 \qquad (7'').$$

Further, it is desirable that the zoom lens for projection of the present embodiment satisfies at least one of the following formulas (8) and (9):

$$0.3<f_2/f_3<1.2 \qquad (8); \text{and}$$

$$1.0<Bf/fw \qquad (9), \text{where}$$

$f_2$: focal length of the second lens group $G_2$,
$f_3$: focal length of the third lens group $G_3$.
Bf: back focus in air on the reduction side, and
fw: focal length of the entire system of the zoom lens at wide end.

When the formula (8) is satisfied, it is possible to correct spherical aberration and coma aberration in a well balanced manner. In other words, when the value of $f_2/f_3$ exceeds the upper limit of the formula (8), the power of the third lens group $G_3$ becomes too strong, and it becomes difficult to correct, especially, spherical aberration. In contrast, when the value of $f_2/f_3$ is lower than the lower limit of the formula (8), the power of the second lens group $G_2$ becomes too strong, and coma aberration becomes too large.

Therefore, it is desirable that the following formula (8') is satisfied instead of the formula (8):

$$0.4<f_2/f_3<1.0 \qquad (8').$$

When the formula (9) is satisfied, it is possible to secure a required back focus. In other words, when the value of Bf/fw is lower than the lower limit of the formula (9), it becomes difficult to arrange a prism for combining colors or the like, and to solve thermal problems.

Further, in the zoom lens for projection of the present embodiment, it is desirable that the second lens group $G_2$ is composed of two positive lenses, and satisfies the following formulas (1) and (2):

$$0.5<(R3a+R3b)/(R3a-R3b) \quad (1); \text{ and}$$

$$(R4a+R4b)/(R4a-R4b)<-1 \quad (2), \text{ where}$$

R3a: curvature radius of a magnification-side surface of the third lens from the magnification side of the zoom lens, the third lens being the magnification-side lens $L_3$ in the second lens group $G_2$, R3b: curvature radius of a reduction-side surface of the third lens from the magnification side of the zoom lens, the third lens being the magnification-side lens $L_3$ in the second lens group $G_2$, R4a: curvature radius of a magnification-side surface of the fourth lens from the magnification side of the zoom lens, the fourth lens being the reduction-side lens $L_4$ in the second lens group $G_2$, and R4b: curvature radius of a reduction-side surface of the fourth lens from the magnification side of the zoom lens, the fourth lens being the reduction-side lens $L_4$ in the second lens group $G_2$.

When the formulas (1) and (2) are satisfied, it is possible to correct coma aberration in an excellent manner. When the value (R3a+R3b)/(R3a-R3b) becomes lower than the lower limit of formula (1), or the value (R4a+R4b)/(R4a-R4b) exceeds the upper limit of formula (2), it becomes difficult to correct coma aberration in an excellent manner.

Here, the form of the aspheric surfaces (two sides of the most magnification side lens $L_1$ in the first lens group $G_1$) in the zoom lens for projection of the present embodiment is represented by the following aspheric equation (aspheric surfaces in the second embodiments and Examples 1 through 17 are represented by the aspheric equation in a similar manner):

$$Z = \frac{Y^2/R}{1+\sqrt{1-K \times Y^2/R^2}} + \sum_{i=3}^{18} A_i Y^i, \quad \text{[Equation 1]}$$

where

Z: the length of a perpendicular line from a point on an aspheric surface at distance Y from the optical axis to a tangent plane (plane perpendicular to the optical axis) on the vertex of the aspheric surface, Y: a distance from the optical axis, R: a curvature radius of the aspheric surface in the vicinity of the optical axis, K: eccentricity, and $A_i$: aspheric coefficient (i=3 through 18).

Further, in the zoom lens for projection of the present embodiment, it is desirable that the Abbe number vd of glass material forming all lenses in each of the lens groups is less than or equal to 80, and that the most-reduction-side lens in the fourth lens group $G_4$ is a positive lens, and that the following formulas (3) through (5) are satisfied:

$$vd(a)<30 \quad (3);$$

$$0.01<\theta gF(a)-(0.6415-0.001618 \times vd(a)) \quad (4); \text{ and}$$

$$1.5<fa/fw<3.0 \quad (5), \text{ where}$$

vd(a): Abbe number of the most-reduction-side lens in the fourth lens group,

θgF(a): partial dispersion ratio of the most-reduction-side lens in the fourth lens group when partial dispersion ratio θgF is represented by (Ng−NF)/(NF−NC), fa: focal length of the most-reduction-side lens in the fourth lens group, fw: focal length of the entire system of the zoom lens at wide end, Ng: refractive index of lens glass material for g-line, NF: refractive index of lens glass material for F-line, and NC: refractive index of lens glass material for C-line.

As described above, the positive lens on the most reduction side in the fourth lens group $G_4$ (10th lens $L_{10}$ in Examples 1 through 10, 12, 13, 16 and 17, 11th lens $L_{11}$ in Example 14, and 12th lens $L_{12}$ in Example 15) satisfies all of the formulas (3) through (5).

Generally, a glass material having a large Abbe number, and which is greatly away from a straight line represented by expression "θgF−(0.6415−0.001618×vd)=0.00" on plane vd−θgF, is referred to as anomalous dispersion glass. Use of the anomalous dispersion glass as the material for the positive lens in the fourth lens group $G_4$ or the fifth lens group $G_5$ is advantageous to correction of chromatic aberrations. However, the cost for production increases.

Therefore, in the present embodiment, a glass material satisfying the formulas (3) and (4) is effectively used, instead of anomalous dispersion glass, to correct chromatic aberrations. Use of the glass material satisfying the formulas (3) and (4) as the material for the positive lens located on the reduction side of the fourth lens group $G_4$ is advantageous to correction of longitudinal chromatic aberration and lateral chromatic aberration. Meanwhile, it is desirable that the material satisfying the formulas (3) and (4) is used as the material for the movable lens group to prevent variation of aberrations by zooming. Therefore, it is effective to use the glass material satisfying the formulas (3) and (4) as the glass material for the positive lens on the most magnification side of the fourth lens group $G_4$. In this case, when the range of power represented by the formula (5) is satisfied, it is possible to correct chromatic aberrations.

In the present embodiment, it is possible to realize a high zoom ratio, which is higher than or equal to 1.6 times, without using anomalous dispersion glass. Further, it is possible to suppress variation of lateral chromatic aberration that is caused by zooming in an excellent manner.

Therefore, it is desirable that the following formula (4') is satisfies instead of the formula (4):

$$0.012<\theta gF(a)-(0.6415-0.001618 \times vd(a)) \quad (4').$$

Further, it is desirable that the following formula (5') is satisfied instead of the formula (5):

$$1.7<fa/fw<2.8 \quad (5').$$

Embodiment 2 (Examples 1 through 10 and 12 through 17

In the zoom lens for projection according to an embodiment (Example 12 is used as an example) illustrated in FIGS. 12A and 12B, first lens group $G_1$ having negative refractive power, second lens group $G_2$ having positive refractive power, third lens group $G_3$ having positive refractive power, fourth lens group $G_4$, and fifth lens group $G_5$ having positive refractive power are sequentially arranged from the magnification side (screen side) of the zoom lens. Further, a glass block (including a filter portion) 2, which is mainly a color combination prism, and an image display plane 1 of light bulbs, such as a liquid crystal display panel, are arranged after the five lens groups.

The zoom lens for projection according to the present embodiment is a retrofocus-type lens. Therefore, a sufficient length of back focus for the focal length of the zoom lens can be secured. Further, it is possible to make the reduction side (light bulb side) substantially telecentric.

In the zoom lens for projection according to the present embodiment, the first lens group $G_1$ and the fifth lens group $G_5$ are fixed, and the second lens group $G_2$, the third lens group $G_3$ and the fourth lens group $G_4$ move along optical axis Z of the zoom lens in such a manner to be independent from each other, when magnification of the zoom lens is changed. The zoom function of the zoom lens for projection may be achieved by structuring the zoom lens in such a manner that two or three of the second lens group $G_2$, the third lens group $G_3$ and the fourth lens group $G_4$ move together as one body.

When the three lens groups, namely the second lens group $G_2$, the third lens group $G_3$ and the fourth lens group $G_4$, are movable groups as described above, it is possible to correct aberrations in an excellent manner by using a small number of lenses.

In the zoom lens for projection according to the second embodiment of the present invention, the number of lens or lenses in each of the lens groups is not limited. For example, the first lens group $G_1$ is composed of two lenses, and the second lens group $G_2$ is composed of two or three lenses. Further, the third lens group $G_3$ is composed of a positive lens, and the fourth lens group $G_4$ is composed five or six lenses. Further, the fifth lens group $G_5$ is composed of a positive lens. In total, the zoom lens for projection according to the second embodiment is composed of 11 to 13 lenses.

Since the zoom lens for projection is structured as described above, it is possible to correct various aberrations efficiently by using a small number of lenses. Further, it is possible to provide the zoom lens for projection having a low F-number and a high zoom ratio.

Further, when the zoom lens for projection is structured in such a manner that all movable lens groups move toward the magnification side when magnification is changed from wide end to tele end, it is possible to set a high variable magnification ratio.

This means that the position of each of the movable lens groups at tele end is set closer to the magnification side, compared with the position of the respective movable lens groups at wide end. Therefore, the movable lens groups may temporarily move toward the reduction side in the middle region between the tele end and the wide end.

An aperture stop is not illustrated in FIGS. 12A and 12B. However, the aperture stop may be arranged at an appropriate position (or a mask may be provided). Further, an aperture stop may move together with a movable lens group (for example, fourth lens group $G_4$) as one body during zooming.

It is desirable that focus is adjusted by moving the first lens group $G_1$ in the direction of optical axis Z. Alternatively, focus may be adjusted by moving a different lens group or groups.

In the zoom lens for projection of the present embodiment, the fourth lens group $G_4$ may be composed of five lenses. For example, a negative lens, a positive lens, a negative lens, a positive lens, and a positive lens may be sequentially arranged from the magnification side (Examples 1 through 13, 16 and 17). Alternatively, the fourth lens group $G_4$ may be composed of six lenses. For example, a negative lens, a positive lens, a positive lens, a negative lens, a positive lens, and a positive lens may be sequentially arranged from the magnification side (please refer to Examples 14 and 15).

When the fourth lens group $G_4$ is structured as described above, it is possible to suppress variation of various aberrations that may be caused by a change in magnification. Especially, when the fourth lens group $G_4$, which includes many lenses, is arranged in the vicinity of the pupil position of the optical system (position at which a principal ray and optical axis Z intersect in FIGS. 36A and 36B), it is possible to effectively correct various aberrations, especially, field curvature (especially, curvature of a sagittal image plane) and distortion. Problems of the field curvature and distortion arise when the magnification of the zoom lens for projection is increased or the angle of view of the zoom lens for projection is increased.

When fourth lens group $G_4$ is composed of five lenses, it is desirable that the negative lens that is the third lens from the magnification side and the positive lens that is the fourth lens from the magnification side in the fourth lens group $G_4$ are cemented together to form a cemented lens. Further, when the fourth lens group $G_4$ is composed of six lenses, it is desirable that the negative lens that is the first lens from the magnification side and the positive lens that is the second lens from the magnification side in the fourth lens group $G_4$ are cemented together to form a cemented lens, and that the negative lens that is the fourth lens from the magnification side and the positive lens that is the fifth lens from the magnification side in the fourth lens group $G_4$ are cemented together to form a cemented lens. Accordingly, it is possible to reduce field curvature, distortion (aberration), lateral chromatic aberration, and the like.

It is desirable that the first lens group $G_1$ includes at least an aspheric surface.

When the first lens group $G_1$ includes at least an aspheric surface, it is possible to effectively correct aberrations, especially, field curvature and distortion.

When the first lens group $G_1$ is structured in such a manner that an aspheric lens and a negative single lens are arranged from the magnification side, it is possible to make the structure of the first lens group G1 simple and compact, while securing the aberration correction effect.

When the aspheric lens is made of plastic, it is possible to further reduce the production cost.

When all lenses composing each of the second lens group $G_2$ through the fifth lens group $G_5$ are spherical lenses, it is possible to reduce cost.

Further, in the zoom lens for projection of the present embodiment, it is desirable that the Abbe number vd of glass material forming all lenses in each of the lens groups is less than or equal to 80, and that the most-reduction-side lens in the fourth lens group $G_4$ is a positive lens, and that at least one of the following formulas (3) and (4) is satisfied. Further, it is desirable that the formula (5) is satisfied:

$$vd(a) < 30 \qquad (3);$$

$$0.01 < \theta gF(a) - (0.6415 - 0.001618 \times vd(a)) \qquad (4); \text{ and}$$

$$1.5 < fa/fw < 3.0 \qquad (5), \text{ where}$$

vd(a): Abbe number of the most-reduction-side lens in the fourth lens group,

θgF(a): partial dispersion ratio of the most-reduction-side lens in the fourth lens group when partial dispersion ratio θgF is represented by (Ng−NF)/(NF−NC), fa: focal length of the most-reduction-side lens in the fourth lens group, fw: focal length of the entire system of the zoom lens at wide end, Ng: refractive index of lens glass material for g-line, NF: refractive index of lens glass material for F-line, and NC: refractive index of lens glass material for C-line.

As described above, the positive lens on the most reduction side in the fourth lens group $G_4$ (10th lens $L_{10}$ in Examples 1 through 13, 16 and 17, 11th lens $L_{11}$ in Example 14, and 12th lens $L_{12}$ in Example 15) satisfies all of the formulas (3) through (5).

Generally, a glass material having a large Abbe number, and which is greatly away from a straight line represented by expression "$\theta gF-(0.6415-0.001618\times vd)=0.00$" on plane vd–θgF, is referred to as anomalous dispersion glass. Use of anomalous dispersion glass as the material for the positive lens in the fourth lens group $G_4$ or the fifth lens group $G_5$ is advantageous to correction of chromatic aberrations. However, the cost for production increases.

Therefore, in the present embodiment, a glass material satisfying the formulas (3) and (4) is effectively used, instead of anomalous dispersion glass, to correct chromatic aberrations. Use of the glass material satisfying the formulas (3) and (4) as the material for the positive lens located on the reduction side of the fourth lens group $G_4$ is advantageous to correction of longitudinal chromatic aberration and lateral chromatic aberration. Meanwhile, it is desirable that the material satisfying the formulas (3) and (4) is used as the material for the movable lens group to prevent variation of aberrations by zooming. Therefore, it is effective to use the glass material satisfying the formulas (3) and (4) as the glass material for the positive lens on the most magnification side of the fourth lens group $G_4$. In this case, when the range of power represented by the formula (5) is satisfied, it is possible to correct chromatic aberrations.

In the present embodiment, it is possible to realize a high zoom ratio, which is higher than or equal to 1.6 times, without using anomalous dispersion glass. Further, it is possible to suppress variation of lateral chromatic aberration that is caused by zooming in an excellent manner.

Therefore, it is desirable that the following formula (4') is satisfies instead of the formula (4):

$$0.012<\theta gF(a)-(0.6415-0.001618\times vd(a)) \tag{4'}$$

Further, it is desirable that the following formula (5') is satisfied instead of the formula (5)

$$1.7<fa/fw<2.8 \tag{5'}$$

Further, in the zoom lens for projection according to the second embodiment, it is desirable that at least one of the following formulas (6) and (7) is satisfied:

$$|FFW(4,5)/L|<0.2 \tag{6}$$

$$|(FFT(4,5)-FFW(4,5))/L|<0.2 \tag{7}$$

where

FFW(4,5): absolute value of distance between a front-side combined focal position of the fourth lens group $G_4$ and the fifth lens group $G_5$ and the most-magnification-side lens surface of the fourth lens group $G_4$ at wide end, FFT(4,5): absolute value of distance between a front-side combined focal position of the fourth lens group $G_4$ and the fifth lens group $G_5$ and the most-magnification-side lens surface of the fourth lens group $G_4$ at tele end, and L: absolute value of distance from an apex of a most-magnification-side lens surface in the entire system of the zoom lens to an apex of a most-reduction-side lens surface in the entire system of the zoom lens.

When the formula (6) or (7) is satisfied, the following advantageous effects are achieved.

Since the reduction side of the zoom lens for projection of the present embodiment is substantially telecentric, the focal position of parallel light entering the optical system from the reduction side thereof is substantially the same as the position of the pupil of the optical system, as illustrated in FIGS. 36A and 36B. When the formula (6) is satisfied, the position of the pupil at wide end is located in the vicinity of a lens surface closest to the magnification side in the fourth lens group $G_4$. Meanwhile, when the formula (7) is satisfied, the position of the pupil at wide end and the position of the pupil at tele end are close to each other.

Since all rays including central rays to peripheral rays gather in the vicinity of the pupil, if many lenses are arranged in the vicinity of the pupil, it is possible to correct various aberrations in an excellent manner. In the present embodiment, at least one of the formula (6) or (7) is satisfied, and the fourth lens group $G_4$, which is composed of many lenses, is arranged in the vicinity of the pupil, as illustrated in FIGS. 36A and 36B. Therefore, it is possible to correct various aberrations, such as spherical aberration and field curvature, in an excellent manner. When the formula (7) is satisfied, the distance from the fourth lens group $G_4$ to the pupil position does not substantially change between the wide end (FEW) and tele end (FFT). Therefore, it is possible to correct aberrations in an excellent manner for the entire zoom range.

Therefore, it is desirable that the following formula (6') is satisfied instead of the formula (6):

$$|FFW(4,5)/L|<0.15 \tag{6'}$$

Further, it is desirable that the following formula (7') is satisfied instead of the formula (7):

$$|(FFT(4,5)-FFW(4,5))/L|<0.1 \tag{7'}$$

It is even more desirable that the following formula (7") is satisfied instead of the formula (7'):

$$|(FFT(4,5)-FFW(4,5))/L|<0.08 \tag{7"}$$

Further, it is desirable that the zoom lens for projection of the present embodiment satisfies at least one of the following formulas (8) and (9):

$$0.3<f_2/f_3<1.2 \tag{8}$$

and $$1.0<Bf/fw \tag{9}$$

where $f_2$: focal length of the second lens group $G_2$, and $f_3$: focal length of the third lens group $G_3$.

Bf: back focus in air on the reduction side, fw: focal length of the entire system of the zoom lens at wide end.

When the formula (8) is satisfied, it is possible to correct spherical aberration and coma aberration in a well balanced manner. In other words, when the value of $f_2/f_3$ exceeds the upper limit of the formula (8), the power of the third lens group $G_3$ becomes too strong, and it becomes difficult to correct, especially, spherical aberration. In contrast, when the value of $f_2/f_3$ is lower than the lower limit of the formula (8), the power of the second lens group $G_2$ becomes too strong, and coma aberration becomes too large.

Therefore, it is desirable that the following formula (8') is satisfied instead of the formula (8):

$$0.4<f_2/f_3<1.0 \tag{8'}$$

When the formula (9) is satisfied, it is possible to secure a required back focus. In other words, when the value of Bf/fw is lower than the lower limit of the formula (9), it becomes difficult to arrange a prism for combining colors or the like, and to solve thermal problems.

Further, in the zoom lens for projection of the present embodiment, it is desirable that the second lens group $G_2$ is composed of two positive lenses, and satisfies the following formulas (1) and (2):

$$0.5 < (R3a+R3b)/(R3a-R3b) \quad (1); \text{ and}$$

$$(R4a+R4b)/(R4a-R4b) < -1 \quad (2), \text{ where}$$

R3a: curvature radius of a magnification-side surface of the third lens from the magnification side of the zoom lens, the third lens being the magnification-side lens $L_3$ in the second lens group $G_2$, R3b: curvature radius of a reduction-side surface of the third lens from the magnification side of the zoom lens, the third lens being the magnification-side lens $L_3$ in the second lens group $G_2$, R4a: curvature radius of a magnification-side surface of the fourth lens from the magnification side of the zoom lens, the fourth lens being the reduction-side lens $L_4$ in the second lens group $G_2$, and R4b: curvature radius of a reduction-side surface of the fourth lens from the magnification side of the zoom lens, the fourth lens being the reduction-side lens $L_4$ in the second lens group $G_2$.

When the formulas (1) and (2) are satisfied, it is possible to correct coma aberration in an excellent manner. When the value (R3a+R3b)/(R3a−R3b) becomes lower than than the lower limit of formula (1), or the value (R4a+R4b)/(R4a−R4b) exceeds the upper limit of formula (2), it becomes difficult to correct coma aberration in an excellent manner.

Embodiment of Projection-Type Display Apparatus

Next, an example of a project-type display apparatus on which the zoom lens for projection is mounted will be described with reference to FIG. 37. A projection-type display apparatus illustrated in FIG. 37 includes, as light bulbs, transmission-type liquid crystal panels 11a through 11c. Further, the projection-type display apparatus uses, as a zoom lens 10 for projection, a zoom lens for projection according to the aforementioned embodiments of the present invention. Further, an integrator (not illustrated), such as a fly-eye integrator, is arranged between a light source (not illustrated), and a dichroic mirror 12. White light output from the light source is transmitted through an illumination optical unit, and enters liquid crystal panels 11a through 11c, which correspond to light beams of three colors (G light, B light, and R light) respectively. The light that has entered the liquid crystal panels 11a through 11c is modulated, and the colors are combined by a cross-dichroic prism 14. Further, the combined light is projected onto a screen, which is not illustrated, by the zoom lens 10 for projection. This apparatus includes the dichroic mirrors 12 and 13 for separating colors, a cross-dichroic prism 14 for combining colors, condenser lenses 16a through 16c, and total reflection mirrors 18a through 18c.

The projection-type display apparatus of the present embodiment uses the zoom lens for projection according to the embodiments of the present invention. Therefore, the projection-type display apparatus of the present embodiment has a wide angle of view and a high zoom ratio. Further, images projected by the projection-type display apparatus have excellent image qualities, and the size of the projection-type display apparatus is small.

Use of the zoom lens for projection of the present invention is not limited to use as a zoom lens for projection of a projection-type display apparatus using a transmission-type liquid crystal display panel. Alternatively, the zoom lens for projection of the present invention may be used as a zoom lens for projection or the like of an apparatus using a different light modulation means, such as a reflection-type liquid crystal display panel or a DMD (digital micromirror device).

EXAMPLES

The zoom lens for projection of the present invention will be further described using specific examples.

Example 1

FIGS. 1A and 1B are schematic diagrams illustrating the structure of a zoom lens for projection according to Example 1. As described earlier, in the zoom lens for projection of Example 1, first lens group $G_1$ having negative refractive power, second lens group $G_2$ having positive refractive power, third lens group $G_3$ having positive refractive power, fourth lens group $G_4$ having positive refractive power, and fifth lens group $G_5$ having positive refractive power are sequentially arranged from the magnification side of the zoom lens. Further, a glass block (including a filter portion) 2, which is mainly a color combination prism, and an image display plane 1 of light bulbs, such as a liquid crystal display panel, are arranged after the lens groups $G_1$ through $G_5$.

The first lens group $G_1$ is composed of two lenses of first lens $L_1$ and second lens $L_2$. The two sides of the first lens $L_1$ are aspheric (plano-concave lens form having a concave surface facing the magnification side on optical axis Z), and the second lens $L_2$ is a double concave lens. Further, the second lens group $G_2$ is composed of two lenses of third lens $L_3$ and fourth lens $L_4$. The third lens $L_3$ is a positive meniscus lens having a convex surface facing the reduction side, and the fourth lens $L_4$ is a positive meniscus lens having a convex surface facing the magnification side.

Third lens group $G_3$ is composed of only fifth lens $L_5$, which is a double convex lens. Further, fourth lens group $G_4$ is composed of five lenses of sixth lens $L_6$, seventh lens $L_7$, eighth lens $L_8$, ninth lens $L_9$, and 10th lens $L_{10}$. The sixth lens $L_6$ is a double-concave lens, and the seventh lens $L_7$ is a positive meniscus lens having a convex surface facing the reduction side. The eighth lens $L_8$ is a double-concave lens, and the ninth lens $L_9$ is a double-convex lens. Further, the 10th lens $L_{10}$ is a double-convex lens. The eighth lens $L_8$ and the ninth lens $L_9$ are cemented together to form a cemented lens.

Fifth lens group $G_5$ is composed of only 11th lens L11, which is a double convex lens.

In the zoom lens for projection of Example 1, the first lens group $G_1$ and the fifth lens group $G_5$ are fixed, and the second lens group $G_2$, the third lens group $G_3$ and the fourth lens group $G_4$ move along optical axis Z of the zoom lens when magnification of the zoom lens is changed. The second lens group $G_2$, the third lens group $G_3$ and the fourth lens group $G_4$ move toward the magnification side in such a manner to be independent from each other (same for Examples 2 through 15).

Focus is adjusted by moving the first lens group $G_1$ in the direction of the optical axis Z (same for Examples 2 through 15).

The middle section of Table 1 shows curvature radius R of each lens surface (normalized so that the focal length of the entire lens system at wide end is 1.00; same for Tables 3, 5, 7, 9, 11, 13, 15, 17, 19, 21, 23, 25, 27, and 29) in Example 1. Further, the middle section of Table 1 shows the center thickness D of each lens and air gap D between the lenses (normalized in a similar manner to the curvature radius R; same for Tables 3, 5, 7, 9, 11, 13, 15, 17, 19, 21, 23, 25, 27, and 29). Further, the middle section of Table 1 shows refractive index $N_d$ and Abbe number $v_d$ of each lens for d-line. In Table 1 and Tables 3, 5, 7, 9, 11, 13, 15, 17, 19, 21, 23, 25, 27, and 29, which will be described later, numbers (on the column of surface numbers) corresponding to each sign R, D, $N_d$, and $v_d$ sequentially increase from the magnification side. Further, the upper section of Table 1 shows focal length f of the entire system, F-number Fno., and full angle of view 2ω (degrees) in Example 1.

Further, the lower section of Table 1 show Variable 1 (interval between the first lens group $G_1$ and the second lens group $G_2$), Variable 2 (interval between the second lens group $G_2$ and the third lens group $G_3$), Variable 3 (interval between the third lens group $G_3$ and the fourth lens group $G_4$) and Variable 4 (interval between the fourth lens group $G_4$ and the fifth lens group $G_5$) for each case of zoom ratio at 1.00, 1.42, and 1.60 (same for Tables 3, 5, 7, 9, 11, 13, 15, 17, 19, 21, 23, 25, 27, and 29). Further, Table 2 shows values of constants K, $A_3$ through $A_{10}$ corresponding to each of aspheric surfaces.

TABLE 1 f = 1.00~1.60, Fno. = 1.71~2.09, 2ω = 56.8°~36.6°

| SURFACE NUMBER | R | D | Nd | vd | PARTIAL DISPERSION RATIO |
|---|---|---|---|---|---|
| 1* | −9.783 | 0.215 | 1.4910 | 57.6 | |
| 2* | ∞ | 0.438 | | | |
| 3 | −2.442 | 0.077 | 1.6584 | 50.9 | |
| 4 | 1.557 | (VARIABLE 1) | | | |
| 5 | −24.079 | 0.151 | 1.8061 | 40.9 | |
| 8 | −3.224 | 0.005 | | | |
| 7 | 1.835 | 0.195 | 1.8340 | 37.2 | |
| 8 | 8.674 | (VARIABLE 2) | | | |
| 9 | 1.941 | 0.169 | 1.4875 | 70.2 | |
| 10 | −15.221 | (VARIABLE 3) | | | |
| 11 | −2.269 | 0.051 | 1.8052 | 25.4 | |
| 12 | 1.758 | 0.065 | | | |
| 13 | −9.479 | 0.146 | 1.6385 | 55.4 | |
| 14 | −1.284 | 0.060 | | | |
| 15 | −0.816 | 0.077 | 1.8052 | 25.4 | |
| 10 | 2.738 | 0.337 | 1.6516 | 58.5 | |
| 17 | −1.230 | 0.046 | | | |
| 18 | 10.442 | 0.269 | 1.8052 | 25.4 | 0.6161 |
| 19 | −1.998 | (VARIABLE 4) | | | |
| 20 | 3.357 | 0.243 | 1.6031 | 60.6 | |
| 21 | −4.731 | 0.623 | | | |
| 22 | ∞ | 1.343 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.477 | 1.040 | 1.196 | 0.102 | 0.025 |
| MIDDLE | 1.42 | 132.720 | 0.538 | 0.624 | 0.709 | 0.483 |
| TELE END | 1.60 | 149.526 | 0.421 | 0.345 | 0.921 | 0.666 |

*ASPHERIC

TABLE 2

ASPHERIC COEFFICIENT

| SURFACE NUMBER | K | $A_3$ | $A_4$ | $A_5$ | $A_6$ |
|---|---|---|---|---|---|
| 1 | −80.0000 | 0.0000E+00 | 1.8043E−01 | 0.0000E+00 | −1.2492E−01 |
| 2 | −6.7887 | 0.0000E+00 | 1.5578E−01 | 0.0000E+00 | −1.6356E−01 |

| SURFACE NUMBER | $A_7$ | $A_8$ | $A_9$ | $A_{10}$ |
|---|---|---|---|---|
| 1 | 0.0000E+00 | 1.3512E−01 | 0.0000E+00 | −5.6910E−02 |
| 2 | 0.0000E+00 | 8.9350E−02 | 0.0000E+00 | −2.4146E−02 |

FIGS. 18A-*i*, 18A-ii, 18A-iii and 18A-iv are aberration diagrams illustrating various aberrations (spherical aberration, astigmatism, distortion, and lateral chromatic aberration, respectively) of a zoom lens for projection in Example 1 at wide end (WIDE). FIGS. 18B-*i*, 18B-ii, 18B-iii and 18B-iv are aberration diagrams illustrating various aberrations (spherical aberration, astigmatism, distortion, and lateral chromatic aberration, respectively) of a zoom lens for projection in Example 1 at middle position (MIDDLE). FIGS. 18C-*i*, 18C-ii, 18C-iii and 18C-iv are aberration diagrams illustrating various aberrations (spherical aberration, astigmatism, distortion, and lateral chromatic aberration, respectively) of a zoom lens for projection in Example 1 at tele end (TELE). Each of FIGS. 18A-*i*, 18B-i and 18C-i, and FIGS. 19A-*i*, 19B-i and 19C-i through FIGS. 34A-*i*, 34B-i and 34C-i illustrates spherical aberrations for d-line, F-line and C-line. Further, each diagram of astigmatism illustrates aberrations for a sagittal image plane and tangential image plane. Further, each diagram illustrating lateral chromatic aberration illustrates aberrations for F-line and C-line.

As FIGS. 18A-*i*, 18A-ii, 18A-iii, 18A-iv, 18B-i, 18B-ii, 18B-iii, 18B-iv, 18C-i, 18C-ii, 18C-iii and 18C-iv clearly show, the F-number of the zoom lens for projection in Example 1 at wide end is 1.71, which is low. Further, each aberration is corrected in an excellent manner.

Table 35 shows numerical values corresponding to the formulas in Examples 1 through 17.

As Table 35 shows, the zoom lens for projection in Example 1 satisfies formulas (1) through (9), (4') through (8'), and (7"). Further, the full angle of view $2\omega$ at wide end is 56.8 degrees, and the zoom ratio is 1.60. Therefore, the zoom lens for projection in Example 1 realizes a wide angle of view and a high magnification ratio.

Example 2

FIGS. 2A and 2B are schematic diagrams illustrating the structure of a zoom lens for projection in Example 2.

The zoom lens for projection in Example 2 is composed of 11 lenses, the number of which is similar to the number of lenses in Example 1. Further, the structure of the lenses is similar to that of Example 1. In Example 2, the first lens $L_1$, both sides of which are aspheric, has negative meniscus lens form having a concave surface facing the reduction side on the optical axis Z.

The middle section of Table 3 shows curvature radius R of each lens surface, and the center thickness D of each lens and air gap D between the lenses in Example 2. Further, the middle section of Table 3 shows refractive index $N_d$ and Abbe number $v_d$ of each lens for d-line. Further, the upper section of Table 3 shows focal length f of the entire system, F-number Fno., and full angle of view $2\omega$ (degrees) in Example 2. Further, Table 4 shows values of constants K, $A_3$ through $A_{10}$ corresponding to each of aspheric surfaces.

TABLE 3

| | | | | | |
|---|---|---|---|---|---|
| $f = 1.00\sim1.60$, Fno. $= 1.71\sim2.10$, $2\omega = 61.8°\sim40.4°$ | | | | | |
| SURFACE NUMBER | R | D | Nd | vd | PARTIAL DISPERSION RATIO |
| 1* | 206.667 | 0.229 | 1.4910 | 57.6 | |
| 2* | 12.152 | 0.513 | | | |
| 3 | −3.399 | 0.082 | 1.7130 | 53.9 | |
| 4 | 1.644 | (VARIABLE 1) | | | |
| 5 | −29.727 | 0.169 | 1.8340 | 37.2 | |
| 6 | −3.959 | 0.005 | | | |
| 7 | 2.063 | 0.226 | 1.7995 | 42.2 | |
| 8 | 9.097 | (VARIABLE 2) | | | |
| 9 | 2.114 | 0.179 | 1.5163 | 64.1 | |
| 10 | −16.961 | (VARIABLE 3) | | | |
| 11 | −2.687 | 0.055 | 1.8052 | 25.4 | |
| 12 | 1.843 | 0.060 | | | |
| 13 | −18.427 | 0.146 | 1.6385 | 55.4 | |
| 14 | −1.517 | 0.071 | | | |
| 15 | −0.853 | 0.082 | 1.8052 | 25.4 | |
| 16 | 2.726 | 0.376 | 1.6516 | 58.5 | |
| 17 | −1.310 | 0.034 | | | |
| 18 | 10.292 | 0.296 | 1.8052 | 25.4 | 0.6161 |
| 19 | −2.080 | (VARIABLE 4) | | | |
| 20 | 3.624 | 0.262 | 1.6031 | 60.6 | |
| 21 | −5.013 | 0.666 | | | |
| 22 | ∞ | 1.436 | 1.5163 | 64.1 | |
| 23 | ∞ | | | | |

| | | | MOVEMENT INTERVAL | | |
|---|---|---|---|---|---|
| | ZOOM RATIO | PROJECTION DISTANCE | (VARIABLE 1) | (VARIABLE 2) | (VARIABLE 3) | (VARIABLE 4) |
| WIDE END | 1.00 | 93.212 | 1.377 | 1.480 | 0.124 | 0.026 |
| MIDDLE | 1.42 | 132.340 | 0.747 | 0.970 | 0.750 | 0.535 |
| TELE END | 1.60 | 149.104 | 0.597 | 0.684 | 0.974 | 0.744 |

*ASPHERIC

TABLE 4

ASPHERIC COEFFICIENT

| SURFACE NUMBER | K | $A_3$ | $A_4$ | $A_5$ | $A_6$ |
|---|---|---|---|---|---|
| 1 | −80.0018 | 0.0000E+00 | 1.0354E−01 | 0.0000E+00 | −4.1499E−02 |
| 2 | −71.9810 | 0.0000E+00 | 8.2281E−02 | 0.0000E+00 | −5.4829E−02 |

| SURFACE NUMBER | $A_7$ | $A_8$ | $A_9$ | $A_{10}$ |
|---|---|---|---|---|
| 1 | 0.0000E+00 | 1.6873E−02 | 0.0000E+00 | −2.2482E−03 |
| 2 | 0.0000E+00 | 2.0869E−02 | 0.0000E+00 | −4.9802E−03 |

FIGS. 19A-i, 19A-ii, 19A-iii and 19A-iv are aberration diagrams illustrating various aberrations (spherical aberration, astigmatism, distortion, and lateral chromatic aberration, respectively) of a zoom lens for projection in Example 2 at wide end (WIDE). FIGS. 19B-i, 19B-ii, 19B-iii and 19B-iv are aberration diagrams illustrating various aberrations (spherical aberration, astigmatism, distortion, and lateral chromatic aberration, respectively) of a zoom lens for projection in Example 2 at middle position (MIDDLE). FIGS. 19C-i, 19C-ii, 19C-iii and 19C-iv are aberration diagrams illustrating various aberrations (spherical aberration, astigmatism, distortion, and lateral chromatic aberration, respectively) of a zoom lens for projection in Example 2 at tele end (TELE).

As FIGS. 19A-i through 19A-iv, 19B-i through 19B-iv, and 19C-i through 19C-iv clearly show, the F-number of the zoom lens for projection in Example 2 at wide end is 1.71, which is low. Further, each aberration is corrected in an excellent manner.

Further, as Table 35 shows, the zoom lens for projection in Example 2 satisfies formulas (1) through (9), (4') through (8'), and (7"). Further, the full angle of view 2ω at wide end is 61.8 degrees, and the zoom ratio is 1.60. Therefore, the zoom lens for projection in Example 2 realizes a wide angle of view and a high magnification ratio.

Example 3

FIGS. 3A and 3B are schematic diagrams illustrating the structure of a zoom lens for projection in Example 3.

The zoom lens for projection in Example 3 is composed of 11 lenses, the number of which is similar to the number of lenses in Example 1. Further, the structure of the lenses is similar to that of Example 1. However, Example 3 differs from Example 1 in that the second lens (seventh lens $L_7$) from the magnification side in the fourth lens group $G_4$ is a double-convex lens in Example 3. The first lens $L_1$, both sides of which are aspheric, has double-concave lens form on the optical axis Z.

The middle section of Table 5 shows curvature radius R of each lens surface, and the center thickness D of each lens and air gap D between the lenses in Example 3. Further, the middle section of Table 5 shows refractive index $N_d$ and Abbe number $v_d$ of each lens for d-line. Further, the upper section of Table 5 shows focal length f of the entire system, F-number Fno., and full angle of view 2ω (degrees) in Example 3. Further, Table 6 shows values of constants K, $A_3$ through $A_{10}$ corresponding to each of aspheric surfaces.

TABLE 5 f = 1.00~1.80, Fno. = 1.71~2.16, 2ω = 65.4°~38.6°

| SURFACE NUMBER | R | D | Nd | vd | PARTIAL DISPERSION RATIO |
|---|---|---|---|---|---|
| 1* | −55.016 | 0.246 | 1.4910 | 57.6 | |
| 2* | 6.733 | 0.669 | | | |
| 3 | −3.410 | 0.088 | 1.6385 | 55.4 | |
| 4 | 1.752 | (VARIABLE 1) | | | |
| 5 | −40.517 | 0.262 | 1.8340 | 37.2 | |
| 6 | −4.884 | 0.006 | | | |
| 7 | 2.525 | 0.240 | 1.7995 | 42.2 | |
| 8 | 10.936 | (VARIABLE 2) | | | |
| 9 | 2.141 | 0.231 | 1.5638 | 60.7 | |
| 10 | −13.559 | (VARIABLE 3) | | | |
| 11 | −3.458 | 0.059 | 1.8052 | 25.4 | |
| 12 | 1.914 | 0.066 | | | |
| 13 | 131.663 | 0.155 | 1.7440 | 44.8 | |
| 14 | −1.960 | 0.074 | | | |
| 15 | −1.041 | 0.088 | 1.8052 | 25.4 | |
| 16 | 3.137 | 0.441 | 1.6031 | 60.6 | |
| 17 | −1.522 | 0.058 | | | |
| 18 | 9.374 | 0.306 | 1.8052 | 25.4 | 0.6161 |
| 19 | −2.645 | (VARIABLE 4) | | | |
| 20 | 4.899 | 0.296 | 1.5638 | 60.7 | |
| 21 | −3.965 | 0.714 | | | |
| 22 | ∞ | 1.539 | 1.5163 | 64.1 | |
| 23 | ∞ | | | | |

TABLE 5-continued

<table>
<tr><th colspan="6">MOVEMENT INTERVAL</th></tr>
<tr><th></th><th>ZOOM RATIO</th><th>PROJECTION DISTANCE</th><th>(VARIABLE 1)</th><th>(VARIABLE 2)</th><th>(VARIABLE 3)</th><th>(VARIABLE 4)</th></tr>
<tr><td>WIDE END</td><td>1.00</td><td>93.037</td><td>1.717</td><td>1.884</td><td>0.147</td><td>0.028</td></tr>
<tr><td>MIDDLE</td><td>1.48</td><td>137.668</td><td>0.837</td><td>1.482</td><td>0.809</td><td>0.642</td></tr>
<tr><td>TELE END</td><td>1.80</td><td>167.417</td><td>0.569</td><td>1.015</td><td>1.150</td><td>1.032</td></tr>
</table>

*ASPHERIC

TABLE 6

<table>
<tr><th colspan="6">ASPHERIC COEFFICIENT</th></tr>
<tr><th>SURFACE NUMBER</th><th>K</th><th>$A_3$</th><th>$A_4$</th><th>$A_5$</th><th>$A_6$</th></tr>
<tr><td>1</td><td>−77.5909</td><td>0.0000E+00</td><td>8.9799E−02</td><td>0.0000E+00</td><td>−3.2867E−02</td></tr>
<tr><td>2</td><td>−80.0000</td><td>0.0000E+00</td><td>1.0212E−01</td><td>0.0000E+00</td><td>−5.4693E−02</td></tr>
<tr><th>SURFACE NUMBER</th><th>$A_7$</th><th>$A_8$</th><th>$A_9$</th><th>$A_{10}$</th><th></th></tr>
<tr><td>1</td><td>0.0000E+00</td><td>9.9245E−03</td><td>0.0000E+00</td><td>−1.1292E−03</td><td></td></tr>
<tr><td>2</td><td>0.0000E+00</td><td>1.6013E−02</td><td>0.0000E+00</td><td>−2.9719E−03</td><td></td></tr>
</table>

FIGS. 20A-i, 20A-ii, 20A-iii and 20A-iv are aberration diagrams illustrating various aberrations (spherical aberration, astigmatism, distortion, and lateral chromatic aberration, respectively) of a zoom lens for projection in Example 3 at wide end (WIDE). FIGS. 20B-i, 20B-ii, 20B-iii and 20B-iv are aberration diagrams illustrating various aberrations (spherical aberration, astigmatism, distortion, and lateral chromatic aberration, respectively) of a zoom lens for projection in Example 3 at middle position (MIDDLE). FIGS. 20C-i, 20C-ii, 20C-iii and 20C-iv are aberration diagrams illustrating various aberrations (spherical aberration, astigmatism, distortion, and lateral chromatic aberration, respectively) of a zoom lens for projection in Example 3 at tele end (TELE).

As FIGS. 20A-i through 20A-iv, 20B-i through 20B-iv, and 20C-i through 20C-iv clearly show, the F-number of the zoom lens for projection in Example 3 at wide end is 1.71, which is low. Further, each aberration is corrected in an excellent manner.

Further, as Table 35 shows, the zoom lens for projection in Example 3 satisfies formulas (1) through (9), (4') through (8'), and (7"). Further, the full angle of view 2ω at wide end is 65.4 degrees, and the zoom ratio is 1.80. Therefore, the zoom lens for projection in Example 3 realizes a wide angle of view and a high magnification ratio.

Example 4

FIGS. 4A and 4B are schematic diagrams illustrating the structure of a zoom lens for projection in Example 4.

The zoom lens for projection in Example 4 is composed of 11 lenses, the number of which is similar to the number of lenses in Example 1. Further, the structure of the lenses is similar to that of Example 1. However, Example 4 differs from Example 1 in that the magnification-side lens (third lens $L_3$) in the second lens group $G_2$ is a double-convex lens in Example 4. The first lens $L_1$, both sides of which are aspheric, has plano-concave lens form having a concave surface facing the magnification side on the optical axis Z.

The middle section of Table 7 shows curvature radius R of each lens surface, and the center thickness D of each lens and air gap D between the lenses in Example 4. Further, the middle section of Table 7 shows refractive index $N_d$ and Abbe number $v_d$ of each lens for d-line. Further, the upper section of Table 7 shows focal length f of the entire system, F-number Fno., and full angle of view 2ω (degrees) in Example 4. Further, Table 8 shows values of constants K, $A_3$ through $A_{14}$ corresponding to each of aspheric surfaces.

TABLE 7

<table>
<tr><th colspan="6">f = 1.00~1.66, Fno. = 1.70~2.11, 2ω = 62.2°~39.2°</th></tr>
<tr><th>SURFACE NUMBER</th><th>R</th><th>D</th><th>Nd</th><th>vd</th><th>PARTIAL DISPERSION RATIO</th></tr>
<tr><td>1*</td><td>−4.096</td><td>0.212</td><td>1.4910</td><td>57.6</td><td></td></tr>
<tr><td>2*</td><td>∞</td><td>0.627</td><td></td><td></td><td></td></tr>
<tr><td>3</td><td>−3.580</td><td>0.087</td><td>1.6385</td><td>55.4</td><td></td></tr>
<tr><td>4</td><td>1.861</td><td>(VARIABLE 1)</td><td></td><td></td><td></td></tr>
<tr><td>5</td><td>52.157</td><td>0.197</td><td>1.8340</td><td>37.2</td><td></td></tr>
<tr><td>6</td><td>−3.864</td><td>0.017</td><td></td><td></td><td></td></tr>
<tr><td>7</td><td>1.956</td><td>0.188</td><td>1.8340</td><td>37.2</td><td></td></tr>
<tr><td>8</td><td>3.666</td><td>(VARIABLE 2)</td><td></td><td></td><td></td></tr>
<tr><td>9</td><td>2.382</td><td>0.190</td><td>1.4875</td><td>70.2</td><td></td></tr>
</table>

TABLE 7-continued

| | | | | | |
|---|---|---|---|---|---|
| 10 | −8.798 | (VARIABLE 3) | | | |
| 11 | −2.609 | 0.057 | 1.8467 | 23.8 | |
| 12 | 2.419 | 0.074 | | | |
| 13 | −20.334 | 0.158 | 1.7725 | 49.6 | |
| 14 | −1.718 | 0.079 | | | |
| 15 | −0.961 | 0.069 | 1.8052 | 25.4 | |
| 16 | 3.265 | 0.378 | 1.6031 | 60.6 | |
| 17 | −1.433 | 0.033 | | | |
| 18 | 16.016 | 0.312 | 1.8052 | 25.4 | 0.6161 |
| 19 | −2.010 | (VARIABLE 4) | | | |
| 20 | 3.146 | 0.257 | 1.6031 | 60.6 | |
| 21 | −7.852 | 0.701 | | | |
| 22 | ∞ | 1.504 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.222 | 1.314 | 1.508 | 0.223 | 0.026 |
| MIDDLE | 1.40 | 130.498 | 0.718 | 0.924 | 0.873 | 0.551 |
| TELE END | 1.66 | 154.899 | 0.524 | 0.458 | 1.207 | 0.875 |

*ASPHERIC

TABLE 8

ASPHERIC COEFFICIENT

| SURFACE NUMBER | K | $A_3$ | $A_4$ | $A_5$ | $A_6$ |
|---|---|---|---|---|---|
| 1 | −9.9973 | 0.0000E+00 | 2.9467E−01 | −3.9070E−02 | −3.5461E−01 |
| 2 | −9.9784 | 0.0000E+00 | 3.7994E−01 | −4.8095E−01 | 7.1945E−01 |

| SURFACE NUMBER | $A_7$ | $A_8$ | $A_9$ | $A_{10}$ | $A_{11}$ |
|---|---|---|---|---|---|
| 1 | 3.5538E−01 | −1.1140E−01 | 2.9809E−02 | −5.9436E−02 | 3.2601E−02 |
| 2 | −8.4803E−01 | 2.6702E−01 | 4.3195E−01 | −3.5526E−01 | 4.6397E−02 |

| SURFACE NUMBER | $A_{12}$ | $A_{13}$ | $A_{14}$ |
|---|---|---|---|
| 1 | 1.2920E−02 | −1.6142E−02 | 4.1020E−03 |
| 2 | −9.9130E−02 | 1.5784E−01 | −5.6164E−02 |

FIGS. 21A-i, 21A-ii, 21A-iii and 21A-iv are aberration diagrams illustrating various aberrations (spherical aberration, astigmatism, distortion, and lateral chromatic aberration, respectively) of a zoom lens for projection in Example 4 at wide end (WIDE). FIGS. 21B-i, 21B-ii, 21B-iii and 21B-iv are aberration diagrams illustrating various aberrations (spherical aberration, astigmatism, distortion, and lateral chromatic aberration, respectively) of a zoom lens for projection in Example 4 at middle position (MIDDLE). FIGS. 21C-i, 21C-ii, 21C-iii and 21C-iv are aberration diagrams illustrating various aberrations (spherical aberration, astigmatism, distortion, and lateral chromatic aberration, respectively) of a zoom lens for projection in Example 4 at tele end (TELE).

As FIGS. 21A-i through 21A-iv, 21B-i through 21B-iv, and 21C-i through 21C-iv clearly show, the F-number of the zoom lens for projection in Example 4 at wide end is 1.70, which is low. Further, each aberration is corrected in an excellent manner.

Further, as Table 35 shows, the zoom lens for projection in Example 4 satisfies formulas (1) through (9), (4') through (8'), and (7"). Further, the full angle of view 2ω at wide end is 62.2 degrees, and the zoom ratio is 1.66. Therefore, the zoom lens for projection in Example 4 realizes a wide angle of view and a high magnification ratio.

Example 5

FIGS. 5A and 5B are schematic diagrams illustrating the structure of a zoom lens for projection in Example 5.

The zoom lens for projection in Example 5 is composed of 11 lenses, the number of which is similar to the number of lenses in Example 1. Further, the structure of the lenses is similar to that of Example 1. The first lens $L_1$, both sides of which are aspheric, has negative meniscus lens form having a concave surface facing the reduction side on the optical axis Z. The middle section of Table 9 shows curvature radius R of each lens surface, and the center thickness D of each lens and air gap D between the lenses in Example 5. Further, the middle section of Table 9 shows refractive index $N_d$ and Abbe number $v_d$ of each lens for Further, the upper section of Table 9 shows focal length f of the entire system, F-number Fno., and full angle of view 2ω (degrees) in Example 5. Further, Table 10 shows values of constants K, $A_3$ through $A_{10}$ corresponding to each of aspheric surfaces.

TABLE 9 f = 1.00~1.60, Fno. = 1.54~1.96, 2ω = 59.8°~38.6°

| SURFACE NUMBER | R | D | Nd | vd | PARTIAL DISPERSION RATIO |
|---|---|---|---|---|---|
| 1* | 32.385 | 0.238 | 1.4910 | 57.6 | |
| 2* | 5.515 | 0.745 | | | |
| 3 | −2.658 | 0.075 | 1.6779 | 55.3 | |
| 4 | 1.899 | (VARIABLE 1) | | | |
| 5 | −23.936 | 0.195 | 1.8340 | 37.2 | |
| 6 | −3.685 | 0.005 | | | |
| 7 | 2.424 | 0.255 | 1.7725 | 49.6 | |
| 8 | 35.597 | (VARIABLE 2) | | | |
| 9 | 2.377 | 0.242 | 1.4875 | 70.2 | |
| 10 | −7.234 | (VARIABLE 3) | | | |
| 11 | −2.733 | 0.052 | 1.8467 | 23.8 | |
| 12 | 1.909 | 0.072 | | | |
| 13 | −20.328 | 0.156 | 1.6516 | 58.5 | |
| 14 | −1.563 | 0.088 | | | |
| 15 | −0.851 | 0.078 | 1.7215 | 29.2 | |
| 16 | 3.170 | 0.409 | 1.6779 | 55.3 | |
| 17 | −1.322 | 0.010 | | | |
| 18 | 9.612 | 0.289 | 1.7552 | 27.5 | 0.6103 |
| 19 | −2.593 | (VARIABLE 4) | | | |
| 20 | 3.635 | 0.308 | 1.6779 | 55.3 | |
| 21 | −5.021 | 0.690 | | | |
| 22 | ∞ | 1.237 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 95.650 | 1.197 | 1.592 | 0.157 | 0.026 |
| MIDDLE | 1.42 | 95.650 | 0.622 | 0.973 | 0.910 | 0.467 |
| TELE END | 1.60 | 95.650 | 0.494 | 0.674 | 1.173 | 0.632 |

*ASPHERIC

TABLE 10

ASPHERIC COEFFICIENT

| SURFACE NUMBER | K | $A_3$ | $A_4$ | $A_5$ | $A_6$ |
|---|---|---|---|---|---|
| 1 | −33.4435 | 0.0000E+00 | 6.2832E−02 | 3.2251E−02 | −4.8965E−02 |
| 2 | −73.2790 | 0.0000E+00 | 9.0797E−02 | 4.6267E−02 | −1.1055E−01 |

| SURFACE NUMBER | $A_7$ | $A_8$ | $A_9$ | $A_{10}$ |
|---|---|---|---|---|
| 1 | −6.6481E−03 | 2.1615E−02 | 2.5003E−04 | −2.7944E−03 |
| 2 | −1.3868E−02 | 6.4494E−02 | −5.2814E−03 | −1.1319E−02 |

FIGS. 22A-i, 22A-ii, 22A-iii and 22A-iv are aberration diagrams illustrating various aberrations (spherical aberration, astigmatism, distortion, and lateral chromatic aberration, respectively) of a zoom lens for projection in Example 5 at wide end (WIDE). FIGS. 22B-i, 22B-ii, 22B-iii and 22B-iv are aberration diagrams illustrating various aberrations (spherical aberration, astigmatism, distortion, and lateral chromatic aberration, respectively) of a zoom lens for projection in Example 5 at middle position (MIDDLE). FIGS. 22C-i, 22C-ii, 22C-iii and 22C-iv are aberration diagrams illustrating various aberrations (spherical aberration, astigmatism, distortion, and lateral chromatic aberration, respectively) of a zoom lens for projection in Example 5 at tele end (TELE).

As FIGS. 22A-i through 22A-iv, 22B-i through 22B-iv, and 22C-i through 22C-iv clearly show, the F-number of the zoom lens for projection in Example 5 at wide end is 1.54, which is low. Further, each aberration is corrected in an excellent manner.

Further, as Table 35 shows, the zoom lens for projection in Example 5 satisfies formulas (1) through (9), (4') through (8'), and (7"). Further, the full angle of view 2ω at wide end is 59.8 degrees, and the zoom ratio is 1.60. Therefore, the zoom lens for projection in Example 5 realizes a wide angle of view and a high magnification ratio.

Example 6

FIGS. 6A and 6B are schematic diagrams illustrating the structure of a zoom lens for projection in Example 6.

The zoom lens for projection in Example 6 is composed of 11 lenses, the number of which is similar to the number of lenses in Example 1. Further, the structure of the lenses is substantially similar to that of Example 1. However, Example 6 differs from Example 1 in that the magnification-side lens (third lens $L_3$) in the second lens group $G_2$ is a double-convex lens in Example 6, and that the second lens (seventh lens $L_7$) from the magnification side in the fourth lens group $G_4$ is a double-convex lens in Example 6. The first lens $L_1$, both sides of which are aspheric, has double-concave lens form on the optical axis Z.

The middle section of Table 11 shows curvature radius R of each lens surface, and the center thickness D of each lens and air gap D between the lenses in Example 6. Further, the middle section of Table 11 shows refractive index $N_d$ and Abbe number $v_d$ of each lens for d-line. Further, the upper section of Table 11 shows focal length f of the entire system, F-number Fno., and full angle of view $2\omega$ (degrees) in Example 6. Further, Table 12 shows values of constants K, $A_3$ through $A_{14}$ corresponding to each of aspheric surfaces.

TABLE 11

$f = 1.00\sim1.60$, Fno. $= 1.66\sim2.14$, $2\omega = 59.8°\sim38.8°$

| SURFACE NUMBER | R | D | Nd | vd | PARTIAL DISPERSION RATIO |
|---|---|---|---|---|---|
| 1* | −3.192 | 0.205 | 1.4910 | 57.6 | |
| 2* | 14.431 | 0.467 | | | |
| 3 | −2.944 | 0.084 | 1.5163 | 64.1 | |
| 4 | 1.614 | (VARIABLE 1) | | | |
| 5 | 43.313 | 0.179 | 1.8340 | 37.2 | |
| 6 | −4.544 | 0.017 | | | |
| 7 | 2.075 | 0.232 | 1.6968 | 55.5 | |
| 8 | 11.271 | (VARIABLE 2) | | | |
| 9 | 1.840 | 0.227 | 1.4875 | 70.2 | |
| 10 | −10.620 | (VARIABLE 3) | | | |
| 11 | −3.439 | 0.055 | 1.8467 | 23.8 | |
| 12 | 1.655 | 0.065 | | | |
| 13 | 11.046 | 0.190 | 1.8340 | 37.2 | |
| 14 | −2.172 | 0.093 | | | |
| 15 | −0.912 | 0.067 | 1.8052 | 25.4 | |
| 16 | 3.963 | 0.350 | 1.5163 | 64.1 | |
| 17 | −1.215 | 0.021 | | | |
| 18 | 18.336 | 0.268 | 1.8052 | 25.4 | 0.6161 |
| 19 | −1.995 | (VARIABLE 4) | | | |
| 20 | 3.581 | 0.276 | 1.5163 | 64.1 | |
| 21 | −3.348 | 0.594 | | | |
| 22 | ∞ | 1.349 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.727 | 1.380 | 1.372 | 0.230 | 0.026 |
| MIDDLE | 1.40 | 93.727 | 0.766 | 0.977 | 0.713 | 0.551 |
| TELE END | 1.60 | 93.727 | 0.594 | 0.707 | 0.925 | 0.781 |

*ASPHERIC

TABLE 12

ASPHERIC COEFFICIENT

| SURFACE NUMBER | K | $A_3$ | $A_4$ | $A_5$ | $A_6$ |
|---|---|---|---|---|---|
| 1 | −29.9814 | 0.0000E+00 | 3.0060E−01 | −3.6085E−02 | −3.9808E−01 |
| 2 | −61.5069 | 0.0000E+00 | 4.6125E−01 | −4.4373E−01 | 4.9617E−01 |

| SURFACE NUMBER | $A_7$ | $A_8$ | $A_9$ | $A_{10}$ | $A_{11}$ |
|---|---|---|---|---|---|
| 1 | 3.2058E−01 | −6.6135E−02 | 1.0473E−01 | −7.1731E−02 | −2.6076E−01 |
| 2 | −7.1886E−01 | 2.5903E−01 | 3.0915E−01 | −2.2879E−01 | 1.7938E−01 |

| SURFACE NUMBER | $A_{12}$ | $A_{13}$ | $A_{14}$ |
|---|---|---|---|
| 1 | 4.6224E−01 | −2.9164E−01 | 6.6945E−02 |
| 2 | −2.7400E−01 | 1.6169E−01 | −3.2499E−02 |

FIGS. 23A-*i*, 23A-ii, 23A-iii and 23A-iv are aberration diagrams illustrating various aberrations (spherical aberration, astigmatism, distortion, and lateral chromatic aberration, respectively) of a zoom lens for projection in Example 6 at wide end (WIDE). FIGS. 23B-*i*, 23B-ii, 23B-iii and 23B-iv are aberration diagrams illustrating various aberrations (spherical aberration, astigmatism, distortion, and lateral chromatic aberration, respectively) of a zoom lens for projection in Example 6 at middle position (MIDDLE). FIGS. 23C-*i*, 23C-ii, 23C-iii and 23C-iv are aberration diagrams illustrating various aberrations (spherical aberration, astigmatism, distortion, and lateral chromatic aberration, respectively) of a zoom lens for projection in Example 6 at tele end (TELE).

As FIGS. 23A-*i* through 23A-iv, 23B-*i* through 23B-iv, and 23C-*i* through 23C-iv clearly show, the F-number of the zoom lens for projection in Example 6 at wide end is 1.66, which is low. Further, each aberration is corrected in an excellent manner.

Further, as Table 35 shows, the zoom lens for projection in Example 6 satisfies formulas (1) through (9), (4') through (8'), and (7"). Further, the full angle of view 2ω at wide end is 59.8 degrees, and the zoom ratio is 1.60. Therefore, the zoom lens for projection in Example 6 realizes a wide angle of view and a high magnification ratio.

Example 7

FIGS. 7A and 7B are schematic diagrams illustrating the structure of a zoom lens for projection in Example 7.

The zoom lens for projection in Example 7 is composed of 11 lenses, the number of which is similar to the number of lenses in Example 1. Further, the structure of the lenses is substantially similar to that of Example 1. However, Example 7 differs from Example 1 in that the magnification-side lens (third lens $L_3$) in the second lens group $G_2$ is a double-convex lens in Example 7. The first lens $L_1$, both sides of which are aspheric, has meniscus lens form having a concave surface facing the magnification side on the optical axis Z. The middle section of Table 13 shows curvature radius R of each lens surface, and the center thickness D of each lens and air gap D between the lenses in Example 7. Further, the middle section of Table 13 shows refractive index $N_d$ and Abbe number $v_d$ of each lens for d-line. Further, the upper section of Table 13 shows focal length f of the entire system, F-number Fno., and full angle of view 2ω (degrees) in Example 7. Further, Table 14 shows values of constants K, $A_3$ through $A_{10}$ corresponding to each of aspheric surfaces.

TABLE 13 f = 1.00~1.60, Fno. = 1.63~1.90, 2ω = 59.4°~38.6°

| SURFACE NUMBER | R | D | Nd | vd | PARTIAL DISPERSION RATIO |
|---|---|---|---|---|---|
| 1* | −2.313 | 0.249 | 1.4910 | 57.6 | |
| 2* | −2.910 | 0.265 | | | |
| 3 | −2.610 | 0.078 | 1.7130 | 53.9 | |
| 4 | 1.726 | (VARIABLE 1) | | | |
| 5 | 34.419 | 0.267 | 1.7995 | 42.2 | |
| 6 | −3.845 | 0.010 | | | |
| 7 | 2.153 | 0.230 | 1.7995 | 42.2 | |
| 8 | 10.225 | (VARIABLE 2) | | | |
| 9 | 2.026 | 0.207 | 1.6385 | 55.4 | |
| 10 | −23.185 | (VARIABLE 3) | | | |
| 11 | −4.276 | 0.052 | 1.8052 | 25.4 | |
| 12 | 1.560 | 0.076 | | | |
| 13 | −9.979 | 0.118 | 1.7995 | 42.2 | |
| 14 | −1.933 | 0.076 | | | |
| 15 | −0.906 | 0.078 | 1.8052 | 25.4 | |
| 16 | 2.411 | 0.336 | 1.6204 | 60.3 | |
| 17 | −1.278 | 0.171 | | | |
| 18 | 10.255 | 0.280 | 1.7552 | 27.5 | 0.6103 |
| 19 | −2.123 | (VARIABLE 4) | | | |
| 20 | 3.466 | 0.253 | 1.6516 | 58.5 | |
| 21 | −5.305 | 0.637 | | | |
| 22 | ∞ | 1.229 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.462 | 1.223 | 1.398 | 0.107 | 0.026 |
| MIDDLE | 1.42 | 132.900 | 0.610 | 0.982 | 0.613 | 0.543 |
| TELE END | 1.60 | 149.805 | 0.466 | 0.737 | 0.793 | 0.750 |

*ASPHERIC

TABLE 14

| | ASPHERIC COEFFICIENT | | | | |
|---|---|---|---|---|---|
| SURFACE NUMBER | K | $A_3$ | $A_4$ | $A_5$ | $A_6$ |
| 1 | 1.6816 | 0.0000E+00 | 4.0205E−01 | −2.7346E−01 | 5.6557E−02 |
| 2 | 4.9992 | 0.0000E+00 | 3.5659E−01 | −2.7158E−01 | 7.1059E−02 |

| SURFACE NUMBER | $A_7$ | $A_8$ | $A_9$ | $A_{10}$ |
|---|---|---|---|---|
| 1 | 0.0000E+00 | 1.5457E−02 | 0.0000E+00 | −2.7008E−03 |
| 2 | 0.0000E+00 | 1.3387E−03 | 0.0000E+00 | 1.5767E−03 |

FIGS. 24A-*i*, 24A-ii, 24A-iii and 24A-iv are aberration diagrams illustrating various aberrations (spherical aberration, astigmatism, distortion, and lateral chromatic aberration, respectively) of a zoom lens for projection in Example 7 at wide end (WIDE). FIGS. 24B-*i*, 24B-ii, 24B-iii and 24B-iv are aberration diagrams illustrating various aberrations (spherical aberration, astigmatism, distortion, and lateral chromatic aberration, respectively) of a zoom lens for projection in Example 7 at middle position (MIDDLE). FIGS. 24C-*i*, 24C-ii, 24C-iii and 24C-iv are aberration diagrams illustrating various aberrations (spherical aberration, astigmatism, distortion, and lateral chromatic aberration, respectively) of a zoom lens for projection in Example 7 at tele end (TELE).

As FIGS. 24A-*i* through 24A-iv, 24B-i through 24B-iv, and 24C-i through 24C-iv clearly show, the F-number of the zoom lens for projection in Example 7 at wide end is 1.63, which is low. Further, each aberration is corrected in an excellent manner.

Further, as Table 35 shows, the zoom lens for projection in Example 7 satisfies formulas (1) through (9), (4') through (8'), and (7"). Further, the full angle of view 2ω at wide end is 59.4 degrees, and the zoom ratio is 1.60. Therefore, the zoom lens for projection in Example 7 achieves a wide angle of view and a high magnification ratio.

Example 8

FIGS. 8A and 8B are schematic diagrams illustrating the structure of a zoom lens for projection in Example 8.

The zoom lens for projection in Example 8 is composed of 11 lenses, the number of which is similar to the number of lenses in Example 1. Further, the structure of the lenses is similar to that of Example 1. The first lens $L_1$, both sides of which are aspheric, has negative meniscus lens form having a concave surface facing the magnification side on the optical axis Z.

The middle section of Table 15 shows curvature radius R of each lens surface, and the center thickness D of each lens and air gap D between the lenses in Example 8. Further, the middle section of Table 15 shows refractive index $N_d$ and Abbe number $\nu_d$ of each lens for d-line. Further, the upper section of Table 15 shows focal length f of the entire system, F-number Fno., and full angle of view 2ω (degrees) in Example 8. Further, Table 16 shows values of constants K, $A_3$ through $A_{10}$ corresponding to each of aspheric surfaces.

TABLE 15

| f = 1.00~1.60, Fno.= 1.61~1.82, 2ω = 63.2°~41.4° | | | | | |
|---|---|---|---|---|---|
| SURFACE NUMBER | R | D | Nd | νd | PARTIAL DISPERSION RATIO |
| 1* | −4.189 | 0.239 | 1.4910 | 57.6 | |
| 2* | −7.999 | 0.624 | | | |
| 3 | −3.033 | 0.075 | 1.7725 | 49.6 | |
| 4 | 2.020 | (VARIABLE 1) | | | |
| 5 | −12.714 | 0.217 | 1.8340 | 37.2 | |
| 6 | −3.517 | 0.005 | | | |
| 7 | 2.497 | 0.246 | 1.7995 | 42.2 | |
| 8 | 14.047 | (VARIABLE 2) | | | |
| 9 | 2.630 | 0.235 | 1.6385 | 55.4 | |
| 10 | −9.892 | (VARIABLE 3) | | | |
| 11 | −2.645 | 0.052 | 1.8052 | 25.4 | |
| 12 | 2.055 | 0.070 | | | |
| 13 | −18.759 | 0.149 | 1.7995 | 42.2 | |
| 14 | −1.737 | 0.082 | | | |
| 15 | −0.931 | 0.079 | 1.8052 | 25.4 | |
| 16 | 4.073 | 0.357 | 1.6204 | 60.3 | |
| 17 | −1.434 | 0.010 | | | |
| 18 | 18.073 | 0.336 | 1.7552 | 27.5 | 0.6103 |
| 19 | −1.877 | (VARIABLE 4) | | | |
| 20 | 3.898 | 0.308 | 1.6031 | 60.6 | |
| 21 | −5.161 | 0.835 | | | |
| 22 | ∞ | 1.241 | 1.5163 | 64.1 | |
| 23 | ∞ | | | | |

TABLE 15-continued

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 94.435 | 1.263 | 1.764 | 0.208 | 0.026 |
| MIDDLE | 1.42 | 134.245 | 0.644 | 1.196 | 0.876 | 0.540 |
| TELE END | 1.60 | 151.302 | 0.511 | 0.889 | 1.084 | 0.771 |

*ASPHERIC

TABLE 16

ASPHERIC COEFFICIENT

| SURFACE NUMBER | K | $A_3$ | $A_4$ | $A_5$ | $A_6$ |
|---|---|---|---|---|---|
| 1 | −33.4435 | 0.0000E+00 | 8.6960E−02 | 2.6037E−02 | −5.3858E−02 |
| 2 | −73.2790 | 0.0000E+00 | 9.1219E−02 | 4.8670E−02 | −9.3562E−02 |

| SURFACE NUMBER | $A_7$ | $A_8$ | $A_9$ | $A_{10}$ |
|---|---|---|---|---|
| 1 | −2.7447E−03 | 2.0862E−02 | −2.7054E−03 | −1.2015E−03 |
| 2 | −1.8541E−02 | 5.4274E−02 | −6.3744E−03 | −6.5984E−03 |

FIGS. 25A-$i$, 25A-iii and 25A-iv are aberration diagrams illustrating various aberrations (spherical aberration, astigmatism, distortion, and lateral chromatic aberration, respectively) of a zoom lens for projection in Example 8 at wide end (WIDE). FIGS. 25B-$i$, 25B-ii, 25B-iii and 25B-iv are aberration diagrams illustrating various aberrations (spherical aberration, astigmatism, distortion, and lateral chromatic aberration, respectively) of a zoom lens for projection in Example 8 at middle position (MIDDLE). FIGS. 25C-$i$, 25C-ii, 25C-iii and 25C-iv are aberration diagrams illustrating various aberrations (spherical aberration, astigmatism, distortion, and lateral chromatic aberration, respectively) of a zoom lens for projection in Example 8 at tele end (TELE).

As FIGS. 25A-$i$ through 25A-iv, 25B-i through 25B-iv, and 25C-i through 25C-iv clearly show, the F-number of the zoom lens for projection in Example 8 at wide end is 1.61, which is low. Further, each aberration is corrected in an excellent manner.

Further, as Table 35 shows, the zoom lens for projection in Example 8 satisfies formulas (1) through (9), (4') through (8'), and (7"). Further, the full angle of view 2ω at wide end is 63.2 degrees, and the zoom ratio is 1.60. Therefore, the zoom lens for projection in Example 8 realizes a wide angle of view and a high magnification ratio.

Example 9

FIGS. 9A and 9B are schematic diagrams illustrating the structure of a zoom lens for projection in Example 9.

The zoom lens for projection in Example 9 is composed of 11 lenses, the number of which is similar to the number of lenses in Example 1. Further, the structure of the lenses is similar to that of Example 1. However, Example 9 differs from Example 1 in that the fourth lens group $G_4$ has negative refractive power in Example 9. The first lens $L_1$, both sides of which are aspheric, has meniscus lens form having a concave surface facing the magnification side on the optical axis Z.

The middle section of Table 17 shows curvature radius R of each lens surface, and the center thickness D of each lens and air gap D between the lenses in Example 9. Further, the middle section of Table 17 shows refractive index $N_d$ and Abbe number $v_d$ of each lens for d-line. Further, the upper section of Table 17 shows focal length f of the entire system, F-number Fno., and full angle of view 2ω (degrees) in Example 9. Further, Table 18 shows values of constants K, $A_3$ through $A_{10}$ corresponding to each of aspheric surfaces.

TABLE 17 f = 100~1.60, Fno. = 1.62~1.94, 2ω = 51.2°~32.6°

| SURFACE NUMBER | R | D | Nd | vd | PARTIAL DISPERSION RATIO |
|---|---|---|---|---|---|
| 1* | −2.323 | 0.209 | 1.4910 | 57.6 | |
| 2* | −2.337 | 0.206 | | | |
| 3 | −2.440 | 0.065 | 1.7130 | 53.9 | |
| 4 | 1.570 | (VARIABLE 1) | | | |
| 5 | −36.751 | 0.136 | 1.7995 | 42.2 | |
| 6 | −3.162 | 0.009 | | | |
| 7 | 1.697 | 0.185 | 1.8061 | 40.9 | |
| 8 | 9.810 | (VARIABLE 2) | | | |
| 9 | 1.449 | 0.170 | 1.6385 | 55.4 | |
| 10 | −20.927 | (VARIABLE 3) | | | |
| 11 | −3.120 | 0.044 | 1.8052 | 25.4 | |
| 12 | 1.203 | 0.082 | | | |

TABLE 17-continued

| | | | | | |
|---|---|---|---|---|---|
| 13 | −3.521 | 0.093 | 1.7995 | 42.2 | |
| 14 | −1.500 | 0.074 | | | |
| 15 | −0.694 | 0.065 | 1.8052 | 25.4 | |
| 16 | 2.532 | 0.297 | 1.6204 | 60.3 | |
| 17 | −1.035 | 0.052 | | | |
| 18 | 13.482 | 0.252 | 1.7552 | 27.5 | 0.6103 |
| 19 | −1.541 | (VARIABLE 4) | | | |
| 20 | 2.887 | 0.214 | 1.6516 | 58.5 | |
| 21 | −4.730 | 0.642 | | | |
| 22 | ∞ | 1.030 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 94.025 | 0.929 | 1.107 | 0.086 | 0.021 |
| MIDDLE | 1.42 | 133.720 | 0.398 | 0.825 | 0.428 | 0.487 |
| TELE END | 1.60 | 150.738 | 0.269 | 0.663 | 0.559 | 0.645 |

*ASPHERIC

TABLE 18

ASPHERIC COEFFICIENT

| SURFACE NUMBER | K | $A_3$ | $A_4$ | $A_5$ | $A_6$ |
|---|---|---|---|---|---|
| 1 | −30.3719 | 0.0000E+00 | −1.0930E−01 | 5.6935E−01 | −5.1073E−01 |
| 2 | 4.9995 | 0.0000E+00 | 2.5235E−01 | 8.7860E−02 | −2.6471E−01 |

| SURFACE NUMBER | $A_7$ | $A_8$ | $A_9$ | $A_{10}$ |
|---|---|---|---|---|
| 1 | 0.0000E+00 | 1.5006E−01 | 0.0000E+00 | −1.6721E−02 |
| 2 | 0.0000E+00 | 1.1654E−01 | 0.0000E+00 | 2.6313E−02 |

FIGS. 26A-i, 26A-ii, 26A-iii and 26A-iv are aberration diagrams illustrating various aberrations (spherical aberration, astigmatism, distortion, and lateral chromatic aberration, respectively) of a zoom lens for projection in Example 9 at wide end (WIDE). FIGS. 26B-i, 26B-ii, 26B-iii and 26B-iv are aberration diagrams illustrating various aberrations (spherical aberration, astigmatism, distortion, and lateral chromatic aberration, respectively) of a zoom lens for projection in Example 9 at middle position (MIDDLE). FIGS. 26C-i, 26C-ii, 26C-iii and 26C-iv are aberration diagrams illustrating various aberrations (spherical aberration, astigmatism, distortion, and lateral chromatic aberration, respectively) of a zoom lens for projection in Example 9 at tele end (TELE).

As FIGS. 26A-i through 26A-iv, 26B-i through 26B-iv, and 26C-i through 26C-iv clearly show, the F-number of the zoom lens for projection in Example 9 at wide end is 1.62, which is low. Further, each aberration is corrected in an excellent manner.

Further, as Table 35 shows, the zoom lens for projection in Example 9 satisfies formulas (1) through (9), (4') through (8'), and (7"). Further, the full angle of view 2ω at wide end is 51.2 degrees, and the zoom ratio is 1.60. Therefore, the zoom lens for projection in Example 9 realizes a wide angle of view and a high magnification ratio.

Example 10

FIGS. 10A and 10B are schematic diagrams illustrating the structure of a zoom lens for projection in Example 10.

The zoom lens for projection in Example 10 is composed of 11 lenses, the number of which is similar to the number of lenses in Example 1. Further, the structure of the lenses is similar to that of Example 1. However, Example 10 differs from Example 1 in that the fourth lens group $G_4$ has negative refractive power in Example 10. The first lens $L_1$, both sides of which are aspheric, has negative meniscus lens form having a concave surface facing the magnification side on the optical axis Z.

The middle section of Table 19 shows curvature radius R of each lens surface, and the center thickness D of each lens and air gap D between the lenses in Example 10. Further, the middle section of Table 19 shows refractive index $N_d$ and Abbe number $v_d$ of each lens for d-line. Further, the upper section of Table 19 shows focal length f of the entire system, F-number Fno., and full angle of view 2ω (degrees) in Example 10. Further, Table 20 shows values of constants K, $A_3$ through $A_{10}$ corresponding to each of aspheric surfaces.

TABLE 19 f = 1.00~1.60, Fno. = 1.62~2.03, 2ω = 54.0°~34.8°

| SURFACE NUMBER | R | D | Nd | vd | PARTIAL DISPERSION RATIO |
|---|---|---|---|---|---|
| 1* | −3.608 | 0.197 | 1.4910 | 57.6 | |
| 2* | −9.417 | 0.440 | | | |
| 3 | −2.252 | 0.062 | 1.5163 | 64.1 | |
| 4 | 1.458 | (VARIABLE 1) | | | |
| 5 | −13.519 | 0.160 | 1.8340 | 37.2 | |
| 6 | −3.039 | 0.009 | | | |
| 7 | 1.587 | 0.202 | 1.7130 | 53.9 | |
| 8 | 4.650 | (VARIABLE 2) | | | |
| 9 | 1.574 | 0.260 | 1.6385 | 55.4 | |
| 10 | −11.321 | (VARIABLE 3) | | | |
| 11 | −2.112 | 0.043 | 1.8052 | 25.4 | |
| 12 | 1.436 | 0.074 | | | |
| 13 | −4.107 | 0.107 | 1.6968 | 55.5 | |
| 14 | −1.254 | 0.053 | | | |
| 15 | −0.773 | 0.065 | 1.7552 | 27.5 | |
| 16 | 3.020 | 0.265 | 1.7130 | 53.9 | |
| 17 | −1.211 | 0.155 | | | |
| 18 | 15.354 | 0.206 | 1.8052 | 25.4 | 0.6103 |
| 19 | −2.134 | (VARIABLE 4) | | | |
| 20 | 2.732 | 0.289 | 1.6031 | 60.6 | |
| 21 | −4.465 | 0.539 | | | |
| 22 | ∞ | 1.025 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.554 | 1.125 | 1.241 | 0.158 | 0.021 |
| MIDDLE | 1.42 | 133.084 | 0.498 | 1.044 | 0.472 | 0.525 |
| TELE END | 1.60 | 150.028 | 0.342 | 0.902 | 0.602 | 0.691 |

*ASPHERIC

TABLE 20

ASPHERIC COEFFICIENT

| SURFACE NUMBER | K | $A_3$ | $A_4$ | $A_5$ | $A_6$ |
|---|---|---|---|---|---|
| 1 | −44.0910 | 0.0000E+00 | 2.2536E−01 | −1.1346E−01 | −2.1071E−02 |
| 2 | 4.6585 | 0.0000E+00 | 3.6042E−01 | −3.5955E−01 | 2.1647E−01 |

| SURFACE NUMBER | $A_7$ | $A_8$ | $A_9$ | $A_{10}$ |
|---|---|---|---|---|
| 1 | 4.5134E−02 | 3.7777E−02 | −9.4121E−02 | 5.2811E−02 |
| 2 | −6.9602E−02 | −1.8838E−02 | −1.8970E−02 | 3.6918E−02 |

FIGS. **27A-*i*, 27A-ii, 27A-iii and 27A-IV are aberration diagrams illustrating various aberrations (spherical aberration, astigmatism, distortion, and lateral chromatic aberration, respectively) of a zoom lens for projection in Example 10 at wide end (WIDE). FIGS. 27B-*i*, 27B-ii, 27B-iii and 27B-IV are aberration diagrams illustrating various aberrations (spherical aberration, astigmatism, distortion, and lateral chromatic aberration, respectively) of a zoom lens for projection in Example 10 at middle position (MIDDLE). FIGS. 27C-*i*, 27C-ii, 27C-iii and 27C-iv** are aberration diagrams illustrating various aberrations (spherical aberration, astigmatism, distortion, and lateral chromatic aberration, respectively) of a zoom lens for projection in Example 10 at tele end (TELE).

As FIGS. **27A-*i* through 27A-iv, 27B-*i* through 27B-iv, and 27C-*i* through 27C-iv** clearly show, the F-number of the zoom lens for projection in Example 10 at wide end is 1.62, which is low. Further, each aberration is corrected in an excellent manner.

Further, as Table 35 shows, the zoom lens for projection in Example 10 satisfies formulas (1) through (9), (4') through (8'), and (7"). Further, the full angle of view 2ω at wide end is 54.0 degrees, and the zoom ratio is 1.60. Therefore, the zoom lens for projection in Example 10 realizes a wide angle of view and a high magnification ratio.

Example 11

FIGS. 11A and 11B are schematic diagrams illustrating the structure of a zoom lens for projection in Example 11.

The zoom lens for projection in Example 11 is composed of 11 lenses, the number of which is similar to the number of lenses in Example 1. Further, the structure of the lenses is substantially similar to that of Example 1. However, Example 11 differs from Example 1 in that the second lens (seventh lens $L_7$) from the magnification side in the fourth lens group $G_4$ is a double-convex lens in Example 11. The first lens $L_1$, both sides of which are aspheric, has plano-concave lens form having a concave surface facing the magnification side on the optical axis Z.

The middle section of Table 21 shows curvature radius R of each lens surface, and the center thickness D of each lens and air gap D between the lenses in Example 11. Further, the middle section of Table 21 shows refractive index $N_d$ and Abbe number $\theta_d$ of each lens for d-line. Further, the upper section of Table 21 shows focal length f of the entire system, F-number Fno., and full angle of view $2\omega$ (degrees) in Example 11. Further, Table 22 shows values of constants K, $A_3$ through $A_{14}$ corresponding to each of aspheric surfaces.

TABLE 21 f = 1.00~1.66, Fno. = 1.71~2.11, 2ω = 67.6°~43.4°

| SURFACE NUMBER | R | D | Nd | vd | PARTIAL DISPERSION RATIO |
|---|---|---|---|---|---|
| 1* | −4.094 | 0.218 | 1.4910 | 57.6 | |
| 2* | ∞ | 0.646 | | | |
| 3 | −3.853 | 0.087 | 1.6127 | 58.7 | |
| 4 | 1.687 | (VARIABLE 1) | | | |
| 5 | −53.936 | 0.264 | 1.8340 | 37.2 | |
| 6 | −4.775 | 0.018 | | | |
| 7 | 2.295 | 0.199 | 1.8340 | 37.2 | |
| 8 | 6.036 | (VARIABLE 2) | | | |
| 9 | 2.485 | 0.218 | 1.4875 | 70.2 | |
| 10 | −8.499 | (VARIABLE 3) | | | |
| 11 | −4.320 | 0.057 | 1.8052 | 25.4 | |
| 12 | 2.214 | 0.055 | | | |
| 13 | 8.761 | 0.173 | 1.8000 | 29.8 | |
| 14 | −2.316 | 0.099 | | | |
| 15 | −1.039 | 0.068 | 1.8467 | 23.8 | |
| 16 | 3.425 | 0.384 | 1.4970 | 81.5 | |
| 17 | −1.424 | 0.121 | | | |
| 18 | 27.768 | 0.350 | 1.8000 | 29.8 | 0.6017 |
| 19 | −1.917 | (VARIABLE 4) | | | |
| 20 | 3.092 | 0.289 | 1.6030 | 65.4 | |
| 21 | −10.948 | 0.738 | | | |
| 22 | ∞ | 1.508 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.448 | 1.422 | 1.418 | 0.421 | 0.034 |
| MIDDLE | 1.40 | 130.817 | 0.806 | 0.781 | 1.007 | 0.695 |
| TELE END | 1.66 | 155.189 | 0.613 | 0.283 | 1.307 | 1.084 |

*ASPHERIC

TABLE 22

ASPHERIC COEFFICIENT

| SURFACE NUMBER | K | $A_3$ | $A_4$ | $A_5$ | $A_6$ |
|---|---|---|---|---|---|
| 1 | −9.9973 | 0.0000E+00 | 8.1520E−02 | 6.4492E−01 | −1.2259E+00 |
| 2 | −9.9784 | 0.0000E+00 | 2.6681E−01 | −5.5883E−01 | 2.1748E−00 |

| SURFACE NUMBER | $A_7$ | $A_8$ | $A_9$ | $A_{10}$ | $A_{11}$ |
|---|---|---|---|---|---|
| 1 | 7.8408E−01 | −1.0583E−01 | −5.5520E−02 | 4.3623E−02 | −4.7745E−02 |
| 2 | −3.7861E+00 | 2.1659E+00 | 6.2188E−01 | −4.9144E−01 | −5.7989E−01 |

| SURFACE NUMBER | $A_{12}$ | $A_{13}$ | $A_{14}$ |
|---|---|---|---|
| 1 | −3.2150E−03 | 2.6220E−02 | −8.3050E−03 |
| 2 | 1.0350E−01 | 3.7870E−01 | −1.5410E−01 |

FIGS. 28A-i, 28A-iii and 28A-iv are aberration diagrams illustrating various aberrations (spherical aberration, astigmatism, distortion, and lateral chromatic aberration, respectively) of a zoom lens for projection in Example 11 at wide end (WIDE). FIGS. 28B-i, 28B-ii, 28B-iii and 28B-iv are aberration diagrams illustrating various aberrations (spherical aberration, astigmatism, distortion, and lateral chromatic aberration, respectively) of a zoom lens for projection in Example 11 at middle position (MIDDLE). FIGS. 28C-i, 28C-ii, 28C-iii and 28C-iv are aberration diagrams illustrating various aberrations (spherical aberration, astigmatism, distortion, and lateral chromatic aberration, respectively) of a zoom lens for projection in Example 11 at tele end (TELE).

As FIGS. 28A-i through 28A-iv, 28B-i through 28B-iv, and 28C-i through 28C-iv clearly show, the F-number of the zoom lens for projection in Example 11 at wide end is 1.71, which is low. Further, each aberration is corrected in an excellent manner.

Further, as Table 35 shows, the zoom lens for projection in Example 11 satisfies formulas (1) through (3), (5) through (9), (5') through (8'), and (7"). Further, the full angle of view 2ω at wide end is 67.6 degrees, and the zoom ratio is 1.66.

Therefore, the zoom lens for projection in Example 11 realizes a wide angle of view and a high magnification ratio.

Example 12

FIGS. 12A and 12B are schematic diagrams illustrating the structure of a zoom lens for projection in Example 12.

The zoom lens for projection in Example 12 is composed of 11 lenses, the number of which is similar to the number of lenses in Example 1. Further, the structure of the lenses is similar to that of Example 1. The first lens $L_1$, both sides of which are aspheric, has plano-concave lens form having a concave surface facing the magnification side on the optical axis Z.

The middle section of Table 23 shows curvature radius R of each lens surface, and the center thickness D of each lens and air gap D between the lenses in Example 12. Further, the middle section of Table 23 shows refractive index $N_d$ and Abbe number $v_d$ of each lens for d-line. Further, the upper section of Table 23 shows focal length f of the entire system, F-number Fno., and full angle of view 2ω (degrees) in Example 12. Further, Table 24 shows values of constants K, $A_3$ through $A_{10}$ corresponding to each of aspheric surfaces.

TABLE 23

| | f = 1.00~1.60, Fno. = 1.70~2.08, 2ω = 56.8°~36.6° | | | | |
|---|---|---|---|---|---|
| SURFACE NUMBER | R | D | Nd | vd | PARTIAL DISPERSION RATIO |
| 1* | −10.997 | 0.215 | 1.4910 | 57.6 | |
| 2* | ∞ | 0.427 | | | |
| 3 | −2.475 | 0.077 | 1.6584 | 50.9 | |
| 4 | 1.534 | (VARIABLE 1) | | | |
| 5 | −31.107 | 0.146 | 1.8061 | 40.9 | |
| 6 | −3.378 | 0.005 | | | |
| 7 | 1.824 | 0.188 | 1.8340 | 37.2 | |
| 8 | 9.275 | (VARIABLE 2) | | | |
| 9 | 1.862 | 0.168 | 1.4875 | 70.2 | |
| 10 | −18.007 | (VARIABLE 3) | | | |
| 11 | −2.205 | 0.051 | 1.8467 | 23.8 | |
| 12 | 1.720 | 0.064 | | | |
| 13 | −6.473 | 0.131 | 1.8000 | 29.8 | |
| 14 | −1.328 | 0.054 | | | |
| 15 | −0.833 | 0.077 | 1.8052 | 25.4 | |
| 16 | 2.356 | 0.324 | 1.6204 | 60.3 | |
| 17 | −1.243 | 0.071 | | | |
| 18 | 7.370 | 0.301 | 1.7174 | 29.5 | 0.6017 |
| 19 | −1.760 | (VARIABLE 4) | | | |
| 20 | 3.350 | 0.242 | 1.6031 | 60.6 | |
| 21 | −4.885 | 0.624 | | | |
| 22 | ∞ | 1.344 | 1.5163 | 64.1 | |
| 23 | ∞ | | | | |

| | | MOVEMENT INTERVAL | | | |
|---|---|---|---|---|---|
| | ZOOM RATIO | PROJECTION DISTANCE | (VARIABLE 1) | (VARIABLE 2) | (VARIABLE 3) | (VARIABLE 4) |
| WIDE END | 1.00 | 93.529 | 1.072 | 1.158 | 0.102 | 0.025 |
| MIDDLE | 1.42 | 132.791 | 0.556 | 0.626 | 0.669 | 0.499 |
| TELE END | 1.60 | 149.607 | 0.433 | 0.356 | 0.871 | 0.686 |

*ASPHERIC

TABLE 24

ASPHERIC COEFFICIENT

| SURFACE NUMBER | K | $A_3$ | $A_4$ | $A_5$ | $A_6$ |
|---|---|---|---|---|---|
| 1 | −80.0002 | 0.0000E+00 | 1.8771E−01 | 0.0000E+00 | −1.3070E−01 |
| 2 | −6.7969 | 0.0000E+00 | 1.6012E−01 | 0.0000E+00 | −1.6976E−01 |

| SURFACE NUMBER | $A_7$ | $A_8$ | $A_9$ | $A_{10}$ |
|---|---|---|---|---|
| 1 | 0.0000E+00 | 9.1879E−02 | 0.0000E+00 | −2.3983E−02 |
| 2 | 0.0000E+00 | 1.3718E−01 | 0.0000E+00 | −5.6545E−02 |

FIGS. 29A-i, 29A-ii, 29A-iii and 29A-iv are aberration diagrams illustrating various aberrations (spherical aberration, astigmatism, distortion, and lateral chromatic aberration, respectively) of a zoom lens for projection in Example 12 at wide end (WIDE). FIGS. 29B-i, 29B-ii, 29B-iii and 29B-iv are aberration diagrams illustrating various aberrations (spherical aberration, astigmatism, distortion, and lateral chromatic aberration, respectively) of a zoom lens for projection in Example 12 at middle position (MIDDLE). FIGS. 29C-i, 29C-ii, 29C-iii and 29C-iv are aberration diagrams illustrating various aberrations (spherical aberration, astigmatism, distortion, and lateral chromatic aberration, respectively) of a zoom lens for projection in Example 12 at tele end (TELE).

As FIGS. 29A-i through 29A-iv, 29B-i through 29B-iv, and 29C-i through 29C-iv clearly show, the F-number of the zoom lens for projection in Example 12 at wide end is 1.70, which is low. Further, each aberration is corrected in an excellent manner.

Further, as Table 35 shows, the zoom lens for projection in Example 12 satisfies formulas (1) through (9), (5') through (8'), and (7"). Further, the full angle of view 2ω at wide end is 56.8 degrees, and the zoom ratio is 1.60. Therefore, the zoom lens for projection in Example 12 realizes a wide angle of view and a high magnification ratio.

Example 13

FIGS. 13A and 13B are schematic diagrams illustrating the structure of a zoom lens for projection in Example 13.

The zoom lens for projection in Example 13 is composed of 11 lenses, the number of which is similar to the number of lenses in Example 1. Further, the structure of the lenses is substantially similar to that of Example 1. However, Example 13 differs from Example 1 in that the second lens (seventh lens $L_7$) from the magnification side in the fourth lens group $G_4$ is a double-convex lens in Example 13. The first lens $L_1$, both sides of which are aspheric, has negative meniscus lens form having a concave surface facing the reduction side on the optical axis Z.

The middle section of Table 25 shows curvature radius R of each lens surface, and the center thickness D of each lens and air gap D between the lenses in Example 13. Further, the middle section of Table 25 shows refractive index $N_d$ and Abbe number $v_d$ of each lens for d-line. Further, the upper section of Table 25 shows focal length f of the entire system, F-number Fno., and full angle of view 2ω (degrees) in Example 13. Further, Table 26 shows values of constants K, $A_3$ through $A_{10}$ corresponding to each of aspheric surfaces.

TABLE 25 f = 1.00~1.80, Fno. = 1.70~2.18, 2ω = 65.4°~38.6°

| SURFACE NUMBER | R | D | Nd | vd | PARTIAL DISPERSION RATIO |
|---|---|---|---|---|---|
| 1* | 107.040 | 0.246 | 1.4910 | 57.6 | |
| 2* | 6.929 | 0.633 | | | |
| 3 | −3.867 | 0.088 | 1.6968 | 55.5 | |
| 4 | 1.755 | (VARIABLE 1) | | | |
| 5 | −290.004 | 0.265 | 1.8340 | 37.2 | |
| 6 | −5.173 | 0.006 | | | |
| 7 | 2.545 | 0.232 | 1.7995 | 42.2 | |
| 8 | 10.535 | (VARIABLE 2) | | | |
| 9 | 2.226 | 0.224 | 1.5638 | 60.7 | |
| 10 | −15.478 | (VARIABLE 3) | | | |
| 11 | −3.500 | 0.059 | 1.8052 | 25.4 | |
| 12 | 1.952 | 0.064 | | | |
| 13 | 73.606 | 0.159 | 1.6516 | 58.5 | |
| 14 | −1.865 | 0.070 | | | |
| 15 | −1.041 | 0.088 | 1.8052 | 25.4 | |
| 16 | 2.902 | 0.442 | 1.6400 | 60.1 | |
| 17 | −1.540 | 0.082 | | | |
| 18 | 9.358 | 0.292 | 1.8467 | 23.8 | 0.6205 |
| 19 | −2.880 | (VARIABLE 4) | | | |
| 20 | 4.462 | 0.291 | 1.5638 | 60.7 | |
| 21 | −4.427 | 0.713 | | | |
| 22 | ∞ | 1.539 | 1.5163 | 64.1 | |
| 23 | ∞ | | | | |

TABLE 25-continued

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.012 | 1.781 | 1.829 | 0.175 | 0.028 |
| MIDDLE | 1.48 | 132.313 | 0.908 | 1.386 | 0.839 | 0.674 |
| TELE END | 1.80 | 149.160 | 0.639 | 0.895 | 1.183 | 1.086 |

*ASPHERIC

TABLE 26

ASPHERIC COEFFICIENT

| SURFACE NUMBER | K | $A_3$ | $A_4$ | $A_5$ | $A_6$ |
|---|---|---|---|---|---|
| 1 | −77.7326 | 0.0000E+00 | 8.7886E−02 | 0.0000E+00 | −3.1583E−02 |
| 2 | −80.0000 | 0.0000E+00 | 9.8226E−02 | 0.0000E+00 | −5.3840E−02 |

| SURFACE NUMBER | $A_7$ | $A_8$ | $A_9$ | $A_{10}$ |
|---|---|---|---|---|
| 1 | 0.0000E+00 | 9.7073E−03 | 0.0000E+00 | −1.0453E−03 |
| 2 | 0.0000E+00 | 1.6119E−02 | 0.0000E+00 | −2.8771E−03 |

FIGS. 30A-*i*, 30A-ii, and 30A-iv are aberration diagrams illustrating various aberrations (spherical aberration, astigmatism, distortion, and lateral chromatic aberration, respectively) of a zoom lens for projection in Example 13 at wide end (WIDE). FIGS. 30B-*i*, 30B-ii, 30B-iii and 30B-iv are aberration diagrams illustrating various aberrations (spherical aberration, astigmatism, distortion, and lateral chromatic aberration, respectively) of a zoom lens for projection in Example 13 at middle position (MIDDLE). FIGS. 30C-*i*, 30C-ii, 30C-iii and 30C-iv are aberration diagrams illustrating various aberrations (spherical aberration, astigmatism, distortion, and lateral chromatic aberration, respectively) of a zoom lens for projection in Example 13 at tele end (TELE).

As FIGS. 30A-*i* through 30A-iv, 30B-i through 30B-iv, and 30C-i through 30C-iv clearly show, the F-number of the zoom lens for projection in Example 13 at wide end is 1.70, which is low. Further, each aberration is corrected in an excellent manner.

Further, as Table 35 shows, the zoom lens for projection in Example 13 satisfies formulas (1) through (9), (4') through (8'), and (7"). Further, the full angle of view 2ω at wide end is 65.4 degrees, and the zoom ratio is 1.80. Therefore, the zoom lens for projection in Example 13 realizes a wide angle of view and a high magnification ratio.

Example 14

FIGS. 14A and 14B are schematic diagrams illustrating the structure of a zoom lens for projection in Example 14.

The structure of the zoom lens for projection in Example 14 is similar to that of Example 1. Further, the power (positive or negative) of each lens group in example 14 is similar to that of Example 1. However, Example 14 differs from Example 1 in that the number of lenses in the fourth lens group $G_4$ is six in Example 14, and that the total number of lenses in the entire system is 12 in Example 14. Specifically, in the zoom lens for projection of Example 14, each of the first lens group $G_1$ and the second lens group $G_2$ is composed of two lenses. The third lens group $G_3$ is composed of a positive lens, and the fourth lens group $G_4$ is composed of six lenses. Further, the fifth lens group $G_5$ is composed of a positive lens. Therefore, the zoom lens for projection of Example 14 is composed of 12 lenses in total.

Further, in the zoom lens for projection of Example 14, the fourth lens group $G_4$ is composed of six lenses of sixth lens $L_6$, seventh lens $L_7$, eighth lens $L_8$, ninth lens $L_9$, 10th lens $L_{10}$, and 11th lens $L_{11}$. The sixth lens $L_6$ is a double-concave lens. The seventh lens $L_7$ is a positive meniscus lens having a convex surface facing the magnification side. The eighth lens $L_8$ is a positive meniscus lens having a convex surface facing the reduction side. The ninth lens $L_9$ is a double-concave lens. The 10th lens $L_{10}$ is a double-convex lens. The 11th lens $L_{11}$ is a double-convex lens. Further, the sixth lens $L_6$ and the seventh lens $L_7$ are cemented together to form a cemented lens. Further, the ninth lens $L_9$ and the 10th lens $L_{10}$ are cemented together to form a cemented lens.

Further, in Example 14, the fifth lens group $G_5$ is composed of only 12th lens $L_{12}$, and the 12th lens $L_{12}$ is a double-convex lens.

The first lens L1, both sides of which are aspheric, has plano-concave lens form having a concave surface facing the magnification side on the optical axis Z.

The middle section of Table 27 shows curvature radius R of each lens surface, and the center thickness D of each lens and air gap D between the lenses in Example 14. Further, the middle section of Table 27 shows refractive index $N_d$ and Abbe number $v_d$ of each lens for d-line. Further, the upper section of Table 27 shows focal length f of the entire system, F-number Fno., and full angle of view 2ω (degrees) in Example 14. Further, Table 28 shows values of constants K, $A_3$ through $A_{18}$ corresponding to each of aspheric surfaces.

TABLE 27

| | f = 1.00~1.66, Fno. = 1.70~2.10, 2ω = 67.4°~43.4° | | | | |
|---|---|---|---|---|---|
| SURFACE NUMBER | R | D | Nd | vd | PARTIAL DISPERSION RATIO |
| 1* | −4.086 | 0.235 | 1.4910 | 57.6 | |
| 2* | ∞ | 0.651 | | | |
| 3 | −3.608 | 0.087 | 1.6127 | 58.7 | |
| 4 | 1.783 | (VARIABLE 1) | | | |
| 5 | −1395.293 | 0.189 | 1.8340 | 37.2 | |
| 6 | −4.704 | 0.018 | | | |
| 7 | 2.208 | 0.198 | 1.8340 | 37.2 | |
| 8 | 5.716 | (VARIABLE 2) | | | |
| 9 | 2.473 | 0.198 | 1.4875 | 70.2 | |
| 10 | −17.278 | (VARIABLE 3) | | | |
| 11 | −3.337 | 0.057 | 1.7174 | 29.5 | |
| 12 | 1.177 | 0.204 | 1.6031 | 60.6 | |
| 13 | 2.547 | 0.062 | | | |
| 14 | 21.938 | 0.179 | 1.6700 | 47.2 | |
| 15 | −1.985 | 0.095 | | | |
| 16 | −1.072 | 0.068 | 1.8467 | 23.8 | |
| 17 | 3.278 | 0.394 | 1.6204 | 60.3 | |
| 18 | −1.585 | 0.038 | | | |
| 19 | 13.382 | 0.317 | 1.8467 | 23.8 | 0.6205 |
| 20 | −2.338 | (VARIABLE 4) | | | |
| 21 | 3.710 | 0.290 | 1.6031 | 60.6 | |
| 22 | −6.297 | 0.716 | | | |
| 23 | ∞ | 1.507 | 1.5163 | 64.1 | |
| 24 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.373 | 1.541 | 1.427 | 0.261 | 0.034 |
| MIDDLE | 1.40 | 130.704 | 0.902 | 0.799 | 0.910 | 0.646 |
| TELE END | 1.66 | 155.057 | 0.689 | 0.290 | 1.249 | 1.027 |

*ASPHERIC

TABLE 28

| ASPHERIC COEFFICIENT | | | | | |
|---|---|---|---|---|---|
| SURFACE NUMBER | K | $A_3$ | $A_4$ | $A_5$ | $A_6$ |
| 1 | −4.5711 | 0.0000E+00 | 1.9430E−01 | 2.7224E−01 | −8.0311E−01 |
| 2 | −0.0573 | 0.0000E+00 | 2.4642E−01 | −7.4150E−02 | 1.0135E−01 |

| SURFACE NUMBER | $A_7$ | $A_8$ | $A_9$ | $A_{10}$ | $A_{11}$ |
|---|---|---|---|---|---|
| 1 | 6.9534E−01 | −2.0570E−01 | −4.9217E−02 | 1.9899E−02 | 2.7586E−02 |
| 2 | −3.8202E−01 | 2.2104E−01 | 1.3004E−01 | −6.9417E−02 | −4.4853E−02 |

| SURFACE NUMBER | $A_{12}$ | $A_{13}$ | $A_{14}$ | $A_{15}$ | $A_{16}$ |
|---|---|---|---|---|---|
| 1 | −6.7140E−03 | −1.0240E−02 | 4.3260E−03 | −3.2300E−05 | −1.0800E−05 |
| 2 | −3.0320E−02 | 5.2510E−02 | −1.2650E−02 | −8.4600E−06 | −1.1200E−05 |

| SURFACE NUMBER | $A_{17}$ | $A_{18}$ |
|---|---|---|
| 1 | 4.5780E−06 | 9.8420E−06 |
| 2 | −8.2540E−06 | −6.1930E−06 |

FIGS. 31A-i, 31A-ii, 31A-iii and 31A-iv are aberration diagrams illustrating various aberrations (spherical aberration, astigmatism, distortion, and lateral chromatic aberration, respectively) of a zoom lens for projection in Example 14 at wide end (WIDE). FIGS. 31B-i, 31B-ii, 31B-iii and 31B-iv are aberration diagrams illustrating various aberrations (spherical aberration, astigmatism, distortion, and lateral chromatic aberration, respectively) of a zoom lens for projection in Example 14 at middle position (MIDDLE). FIGS. 31C-i, 31C-ii, 31C-iii and 31C-iv are aberration diagrams illustrating various aberrations (spherical aberration, astigmatism, distortion, and lateral chromatic aberration, respectively) of a zoom lens for projection in Example 14 at tele end (TELE).

As FIGS. 31A-i through 31A-iv, 31B-i through 31B-iv, and 31C-i through 31C-iv clearly show, the F-number of the zoom lens for projection in Example 14 at wide end is 1.70, which is low. Further, each aberration is corrected in an excellent manner.

Further, as Table 35 shows, the zoom lens for projection in Example 14 satisfies formulas (3) through (9), (4') through (8'), and (7"). Further, the full angle of view 2ω at wide end is 67.4 degrees, and the zoom ratio is 1.66. Therefore, the zoom lens for projection in Example 14 realizes a wide angle of view and a high magnification ratio.

Example 15

FIGS. 15A and 15B are schematic diagrams illustrating the structure of a zoom lens for projection in Example 15. The structure of the zoom lens for projection in Example 15 is similar to that of Example 1. Further, the power (positive or negative) of each lens group in Example 15 is similar to that of Example 1. However, Example 15 differs from Example 1 in that the second lens group $G_2$ is composed of three lenses and the fourth lens group $G_4$ is composed of six lenses and the total number of lenses in the entire system is 13 in Example 15. Specifically, in the zoom lens for projection of Example 15, the first lens group $G_1$ is composed of two lenses, and the second lens group $G_2$ is composed of three lenses. The third lens group $G_3$ is composed of a positive lens, and the fourth lens group $G_4$ is composed of six lenses. The fifth lens group $G_5$ is composed of a positive lens. The zoom lens for projection in Example 15 is composed of 13 lenses in total.

In Example 15, the first lens group $G_1$ is composed of two lenses of the first lens $L_1$ and the second lens $L_2$. Both sides of the first lens $L_1$ are aspheric, and the second lens $L_2$ is a double-concave lens. The second lens group $G_2$ is composed of three lenses of the third lens $L_3$, the fourth lens $L_4$ and the fifth lens $L_5$. The third lens $L_3$ is a double-concave lens, and the fourth lens $L_4$ is a double-convex lens. The fifth lens $L_5$ is a positive meniscus lens having a convex surface facing the magnification side.

The third lens group $G_3$ is composed of the sixth lens $L_6$, which is a double convex lens.

The fourth lens group $G_4$ is composed of six lenses of the seventh lens $L_7$, the eighth lens $L_8$, the ninth lens $L_9$, the 10th lens $L_{10}$, the 11th lens $L_{11}$, and the 12th lens $L_{12}$. The seventh lens $L_7$ is a double-concave lens, and the eighth lens $L_8$ is a positive meniscus lens having a convex surface facing the magnification side. The ninth lens $L_9$ is a double-convex lens, and the 10th lens $L_{10}$ is a double-concave lens. The 11th lens $L_{11}$ is a double-convex lens, and the 12th lens $L_{12}$ is a double-convex lens. Further, the seventh lens $L_7$ and the eighth lens $L_8$ are cemented together to form a cemented lens, and the 10th lens $L_{10}$ and the 11th lens $L_{11}$ are cemented together to form a cemented lens.

Further, in Example 15, the fifth lens group $G_5$ is composed of only 13th lens $L_{13}$, which is a double-convex lens.

The first lens $L_1$, both sides of which are aspheric, has plano-concave lens form having a concave surface facing the magnification side on the optical axis Z.

The middle section of Table 29 shows curvature radius R of each lens surface, and the center thickness D of each lens and air gap D between the lenses in Example 15. Further, the middle section of Table 29 shows refractive index $N_d$ and Abbe number $v_d$ of each lens for d-line. Further, the upper section of Table 29 shows focal length f of the entire system, F-number Fno., and full angle of view 2ω (degrees) in Example 15. Further, Table 30 shows values of constants K, $A_3$ through $A_{14}$ corresponding to each of aspheric surfaces.

TABLE 29 f = 1.00~1.66, Fno. = 1.70~2.10, 2ω = 67.4°~43.2°

| SURFACE NUMBER | R | D | Nd | vd | PARTIAL DISPERSION RATIO |
|---|---|---|---|---|---|
| 1* | −4.296 | 0.229 | 1.4910 | 57.6 | |
| 2* | ∞ | 0.681 | | | |
| 3 | −3.958 | 0.087 | 1.6779 | 55.3 | |
| 4 | 1.895 | (VARIABLE 1) | | | |
| 5 | −11.236 | 0.080 | 1.4875 | 70.2 | |
| 6 | 3.657 | 0.093 | | | |
| 7 | 4.985 | 0.270 | 1.8340 | 37.2 | |
| 8 | −5.318 | 0.017 | | | |
| 9 | 2.431 | 0.222 | 1.7859 | 44.2 | |
| 10 | 13.643 | (VARIABLE 2) | | | |
| 11 | 2.237 | 0.204 | 1.4875 | 70.2 | |
| 12 | −25.261 | (VARIABLE 3) | | | |
| 13 | −4.249 | 0.057 | 1.8467 | 23.8 | |
| 14 | 1.032 | 0.203 | 1.6968 | 55.5 | |
| 15 | 2.708 | 0.063 | | | |
| 16 | 51.100 | 0.172 | 1.8340 | 37.2 | |
| 17 | −2.121 | 0.099 | | | |
| 18 | −1.075 | 0.068 | 1.7400 | 28.3 | |
| 19 | 3.695 | 0.394 | 1.4875 | 70.2 | |
| 20 | −1.518 | 0.018 | | | |
| 21 | 8.611 | 0.318 | 1.8052 | 25.4 | 0.6161 |
| 22 | −2.543 | (VARIABLE 4) | | | |
| 23 | 6.839 | 0.253 | 1.7725 | 49.6 | |
| 24 | −4.777 | 0.701 | | | |
| 25 | ∞ | 1.506 | 1.5163 | 64.1 | |
| 28 | ∞ | | | | |

TABLE 29-continued

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 93.359 | 1.273 | 1.503 | 0.215 | 0.034 |
| MIDDLE | 1.40 | 130.678 | 0.652 | 0.938 | 0.864 | 0.564 |
| TELE END | 1.66 | 155.021 | 0.442 | 0.467 | 1.205 | 0.902 |

*ASPHERIC

TABLE 30

ASPHERIC COEFFICIENT

| SURFACE NUMBER | K | $A_3$ | $A_4$ | $A_5$ | $A_6$ |
|---|---|---|---|---|---|
| 1 | −1.6995 | 0.0000E+00 | 1.9307E−01 | 2.6069E−01 | −7.0740E−01 |
| 2 | 0.0000 | 0.0000E+00 | 2.4691E−01 | −9.3139E−02 | 1.6215E−01 |

| SURFACE NUMBER | $A_7$ | $A_8$ | $A_9$ | $A_{10}$ | $A_{11}$ |
|---|---|---|---|---|---|
| 1 | 5.6248E−01 | −1.4807E−01 | −4.6762E−02 | 3.0053E−02 | 1.1119E−02 |
| 2 | −4.0570E−01 | 1.9941E−01 | 1.1713E−01 | −5.2635E−02 | −3.4450E−02 |

| SURFACE NUMBER | $A_{12}$ | $A_{13}$ | $A_{14}$ |
|---|---|---|---|
| 1 | −6.3080E−03 | −5.5450E−03 | 3.0180E−03 |
| 2 | −1.6310E−02 | 2.5510E−02 | −4.2070E−03 |

FIGS. 32A-*i*, 32A-ii, 32A-iii and 32A-iv are aberration diagrams illustrating various aberrations (spherical aberration, astigmatism, distortion, and lateral chromatic aberration, respectively) of a zoom lens for projection in Example 15 at wide end (WIDE). FIGS. 32B-*i*, 32B-ii, 32B-iii and 32B-iv are aberration diagrams illustrating various aberrations (spherical aberration, astigmatism, distortion, and lateral chromatic aberration, respectively) of a zoom lens for projection in Example 15 at middle position (MIDDLE). FIGS. 32C-*i*, 32C-ii, 32C-iii and 32C-iv are aberration diagrams illustrating various aberrations (spherical aberration, astigmatism, distortion, and lateral chromatic aberration, respectively) of a zoom lens for projection in Example 15 at tele end (TELE).

As FIGS. 32A-*i* through 32A-iv, 32B-i through 32B-iv, and 32C-i through 32C-iv clearly show the F-number of the zoom lens for projection in Example 15 at wide end is 1.70, which is low. Further, each aberration is corrected in an excellent manner.

Further, as Table 35 shows, the zoom lens for projection in Example 15 satisfies formulas (3) through (9), (4') through (8'), and (7"). Further, the full angle of view 2ω at wide end is 67.4 degrees, and the zoom ratio is 1.66. Therefore, the zoom lens for projection in Example 15 realizes a wide angle of view and a high magnification ratio.

Example 16

FIGS. 16A and 16B are schematic diagrams illustrating the structure of a zoom lens for projection in Example 16. The structure of the zoom lens for projection in Example 16 is similar to that of Example 1. Further, the power (positive or negative) of each lens group in Example 16 is similar to that of Example 1. Further, the number of lens or lenses in each lens group in Example 16 is similar to that of Example 1. However, Example 16 differs from Example 1 in that the first lens $L_1$ is an aspheric lens in negative meniscus form having a concave surface facing the magnification side in the vicinity of the optical axis, the third lens $L_3$ is a double-convex lens, and the seventh lens $L_7$ is a plan-convex lens having a flat surface facing the magnification side.

The middle section of Table 31 shows curvature radius R of each lens surface, and the center thickness D of each lens and air gap D between the lenses in Example 16. Further, the middle section of Table 31 shows refractive index $N_d$ and Abbe number $v_d$ of each lens for d-line. Further, the upper section of Table 31 shows focal length f of the entire system, F-number Fno., and full angle of view 2ω (degrees) in Example 16. Further, Table 32 shows values of constants K, $A_3$ through $A_{15}$ corresponding to each of aspheric surfaces.

TABLE 31

| f = 1.00~1.70, Fno. = 1.61~2.13, 2ω = 62.4°~38.8° | | | | | |
|---|---|---|---|---|---|
| SURFACE NUMBER | R | D | Nd | vd | PARTIAL DISPERSION RATIO |
| 1* | −4.130 | 0.196 | 1.4910 | 57.6 | |
| 2* | −20.393 | 0.570 | | | |
| 3 | −3.414 | 0.083 | 1.6230 | 58.2 | |
| 4 | 1.687 | (VARIABLE 1) | | | |

TABLE 31-continued

| | | | | |
|---|---|---|---|---|
| 5 | 16.348 | 0.276 | 1.8061 | 40.9 |
| 6 | −4.241 | 0.011 | | |
| 7 | 1.892 | 0.209 | 1.7725 | 49.6 |
| 8 | 3.502 | (VARIABLE 2) | | |
| 9 | 2.125 | 0.241 | 1.5163 | 64.1 |
| 10 | −16.147 | (VARIABLE 3) | | |
| 11 | −2.567 | 0.052 | 1.8052 | 25.4 |
| 12 | 1.981 | 0.075 | | |
| 13 | ∞ | 0.163 | 1.7725 | 49.6 |
| 14 | −1.828 | 0.087 | | |
| 15 | −0.939 | 0.077 | 1.7552 | 27.5 |
| 16 | 3.265 | 0.419 | 1.6230 | 58.2 |
| 17 | −1.362 | 0.017 | | |
| 18 | 10.720 | 0.270 | 1.8052 | 25.4 | 0.6161 |
| 19 | −2.737 | (VARIABLE 4) | | |
| 20 | 2.853 | 0.387 | 1.4875 | 70.2 |
| 21 | −3.702 | 0.628 | | |
| 22 | ∞ | 1.265 | 1.5163 | 64.1 |
| 23 | ∞ | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 123.894 | 1.502 | 1.546 | 0.249 | 0.024 |
| MIDDLE | 1.40 | 173.452 | 0.849 | 1.078 | 0.820 | 0.584 |
| TELE END | 1.70 | 210.620 | 0.598 | 0.593 | 1.166 | 0.974 |

*ASPHERIC

TABLE 32

ASPHERIC COEFFICIENT

| SURFACE NUMBER | K | $A_3$ | $A_4$ | $A_5$ | $A_6$1 |
|---|---|---|---|---|---|
| 1 | −75.1023 | 0.0000E+00 | −3.8294E−02 | 9.6886E−01 | −1.9929E+00 |
| 2 | −77.3999 | 0.0000E+00 | 2.0849E−01 | 1.1959E−01 | −8.7291E−03 |

| SURFACE NUMBER | $A_7$ | $A_8$ | $A_9$ | $A_{10}$ | $A_{11}$ |
|---|---|---|---|---|---|
| 1 | 1.7476E+00 | −4.5848E−01 | −2.9598E−01 | 1.5546E−01 | 5.3358E−02 |
| 2 | −9.4735E−01 | 9.8503E−01 | 2.1373E−01 | −5.0353E−01 | −7.3261E−02 |

| SURFACE NUMBER | $A_{12}$ | $A_{13}$ | $A_{14}$ | $A_{15}$ |
|---|---|---|---|---|
| 1 | −2.3632E−02 | −1.6434E−02 | 4.7602E−03 | 1.5136E−03 |
| 2 | 9.2026E−02 | 8.2467E−02 | −1.9196E−02 | −1.3168E−02 |

FIGS. 33A-i, 33A-ii, 33A-iii and 33A-iv are aberration diagrams illustrating various aberrations (spherical aberration, astigmatism, distortion, and lateral chromatic aberration, respectively) of a zoom lens for projection in Example 16 at wide end (WIDE). FIGS. 33B-i, 33B-ii, 33B-iii and 33B-iv are aberration diagrams illustrating various aberrations (spherical aberration, astigmatism, distortion, and lateral chromatic aberration, respectively) of a zoom lens for projection in Example 16 at middle position (MIDDLE). FIGS. 33C-i, 33C-ii, 33C-iii and 33C-iv are aberration diagrams illustrating various aberrations (spherical aberration, astigmatism, distortion, and lateral chromatic aberration, respectively) of a zoom lens for projection in Example 16 at tele end (TELE).

As FIGS. 33A-i through 33A-iv, 33B-i through 33B-iv, and 33C-i through 33C-iv clearly show, the F-number of the zoom lens for projection in Example 16 at wide end is 1.61, which is low. Further, each aberration is corrected in an excellent manner.

Further, as Table 35 shows, the zoom lens for projection in Example 16 satisfies formulas (1) through (9), (4') through (8'), and (7''). Further, the full angle of view 2ω at wide end is 62.4 degrees, and the zoom ratio is 1.70. Therefore, the zoom lens for projection in Example 16 realizes a wide angle of view and a high magnification ratio.

Example 17

FIGS. 17A and 17B are schematic diagrams illustrating the structure of a zoom lens for projection in Example 17. The structure of the zoom lens for projection in Example 17 is similar to that of Example 1. Further, the power (positive or negative) of each lens group in Example 17 is similar to that of Example 1. Further, the number of lens or lenses in each lens group in Example 17 is similar to that of Example 1. However, Example 17 differs from Example 1 in that the first lens $L_1$ is an aspheric lens in negative meniscus form having a concave surface facing the magnification side in the vicinity of the optical axis and the fifth lens $L_5$ is a plano-convex lens having a flat surface facing the reduction side.

The middle section of Table 33 shows curvature radius R of each lens surface, and the center thickness D of each lens and air gap D between the lenses in Example 17. Further, the middle section of Table 33 shows refractive index $N_d$ and Abbe number $\nu_d$ of each lens for d-line. Further, the upper section of Table 33 shows focal length f of the entire system, F-number Fno., and full angle of view 2ω (degrees) in Example 17. Further, Table 34 shows values of constants K, $A_3$ through $A_{10}$ corresponding to each of aspheric surfaces.

FIGS. 34A-i, 34A-ii, 34A-iii and 34A-iv are aberration diagrams illustrating various aberrations (spherical aberration, astigmatism, distortion, and lateral chromatic aberration, respectively) of a zoom lens for projection in Example 17 at wide end (WIDE). FIGS. 34B-i, 34B-ii, 34B-iii and 34B-iv are aberration diagrams illustrating various aberrations (spherical aberration, astigmatism, distortion, and lateral chromatic aberration, respectively) of a zoom lens for projection in Example 17 at middle position (MIDDLE). FIGS. 34C-i, 34C-ii, 34C-iii and 34C-iv are aberration diagrams illustrating various aberrations (spherical aberration, astigmatism, distortion, and lateral chromatic aberration, respectively) of a zoom lens for projection in Example 17 at tele end (TELE).

TABLE 33 f = 1.00~1.65, Fno. = 1.56~2.04, 2ω = 54.2°~34.2°

| SURFACE NUMBER | R | D | Nd | νd | PARTIAL DISPERSION RATIO |
|---|---|---|---|---|---|
| 1* | −4.844 | 0.165 | 1.491 | 57.6 | |
| 2* | −15.965 | 0.588 | | | |
| 3 | −2.611 | 0.07 | 1.5891 | 61.1 | |
| 4 | 1.639 | (VARIABLE 1) | | | |
| 5 | −33.244 | 0.2 | 1.834 | 37.2 | |
| 6 | −3.09 | 0.009 | | | |
| 7 | 1.547 | 0.205 | 1.713 | 53.9 | |
| 8 | 3.808 | (VARIABLE 2) | | | |
| 9 | 1.542 | 0.214 | 1.6584 | 50.9 | |
| 10 | ∞ | (VARIABLE 3) | | | |
| 11 | −2.636 | 0.044 | 1.8052 | 25.4 | |
| 12 | 1.308 | 0.106 | | | |
| 13 | −3.552 | 0.116 | 1.7725 | 49.6 | |
| 14 | −1.338 | 0.058 | | | |
| 15 | −0.799 | 0.065 | 1.7552 | 27.5 | |
| 16 | 2.144 | 0.327 | 1.713 | 53.9 | |
| 17 | −1.248 | 0.156 | | | |
| 18 | 11.477 | 0.211 | 1.8052 | 25.4 | 0.6161 |
| 19 | −2.443 | (VARIABLE 4) | | | |
| 20 | 2.342 | 0.343 | 1.5163 | 64.1 | |
| 21 | −3.613 | 0.554 | | | |
| 22 | ∞ | 1.03 | 1.5163 | 64.1 | |
| 23 | ∞ | | | | |

MOVEMENT INTERVAL

| | ZOOM RATIO | PROJECTION DISTANCE | (VARIABLE 1) | (VARIABLE 2) | (VARIABLE 3) | (VARIABLE 4) |
|---|---|---|---|---|---|---|
| WIDE END | 1.00 | 156.738 | 1.177 | 1.225 | 0.121 | 0.021 |
| MIDDLE | 1.45 | 227.271 | 0.512 | 0.990 | 0.473 | 0.579 |
| TELE END | 1.65 | 258.618 | 0.343 | 0.802 | 0.617 | 0.791 |

*ASPHERIC

TABLE 34

ASPHERIC COEFFICIENT

| SURFACE NUMBER | K | $A_3$ | $A_4$ | $A_5$ | $A_6$ |
|---|---|---|---|---|---|
| 1 | −34.4083 | 0.0000E+00 | 2.4712E−01 | −7.0551E−02 | −1.1347E−01 |
| 2 | −40.4016 | 0.0000E+00 | 2.9634E−01 | −2.3797E−01 | 1.5187E−01 |

| SURFACE NUMBER | $A_7$ | $A_8$ | $A_9$ | $A_{10}$ |
|---|---|---|---|---|
| 1 | 3.2470E−02 | 8.2804E−02 | −5.3824E−02 | 9.8125E−03 |
| 2 | −1.1817E−01 | −5.3963E−02 | 1.5986E−01 | −6.9953E−02 |

As FIGS. 34A-i through 34A-iv, 34B-i through 34B-iv, and 34C-i through 34C-iv clearly show, the F-number of the zoom lens for projection in Example 17 at wide end is 1.56, which is low. Further, each aberration is corrected in an excellent manner.

As Table 35 shows, the zoom lens for projection in Example 17 satisfies formulas (1) through (9), (4') through (8'), and (7"). Further, the full angle of view 2ω at wide end is 54.2 degrees, and the zoom ratio is 1.65. Therefore, the zoom lens for projection in Example 17 realizes a wide angle of view and a high magnification ratio.

TABLE 35

|  | FORMULA(1) (R3a + R3b)/ (R3a − R3b) | FORMULA(2) (R4a + R4b)/ (R4a − R4b) | FORMULA(3) vd(a) | FORMULA(4), (4') θgF(a) − (0.6415 − 0.001618 × vd(a)) | FORMULA (5), (5') fa/fw |
|---|---|---|---|---|---|
| EXAMPLE 1 | 1.309 | −1.537 | 25.4 | 0.0157 | 2.10 |
| EXAMPLE 2 | 1.307 | −1.587 | 25.4 | 0.0157 | 2.17 |
| EXAMPLE 3 | 1.274 | −1.600 | 25.4 | 0.0157 | 2.59 |
| EXAMPLE 4 | 0.862 | −3.287 | 25.4 | 0.0157 | 2.24 |
| EXAMPLE 5 | 1.364 | −1.146 | 27.5 | 0.0133 | 2.73 |
| EXAMPLE 6 | 0.810 | −1.451 | 25.4 | 0.0157 | 2.25 |
| EXAMPLE 7 | 0.799 | −1.533 | 27.5 | 0.0133 | 2.35 |
| EXAMPLE 8 | 1.765 | −1.432 | 27.5 | 0.0133 | 2.27 |
| EXAMPLE 9 | 1.188 | −1.418 | 27.5 | 0.0133 | 1.84 |
| EXAMPLE 10 | 1.580 | −2.036 | 25.4 | 0.0157 | 2.34 |
| EXAMPLE 11 | 1.194 | −2.227 | 29.8 | 0.0084 | 2.25 |
| EXAMPLE 12 | 1.244 | −1.490 | 29.5 | 0.0109 | 2.01 |
| EXAMPLE 13 | 1.036 | −1.637 | 23.8 | 0.0175 | 2.63 |
| EXAMPLE 14 | — | — | 23.8 | 0.0175 | 2.37 |
| EXAMPLE 15 | — | — | 25.4 | 0.0157 | 2.47 |
| EXAMPLE 16 | 0.588 | −3.350 | 25.4 | 0.0157 | 2.73 |
| EXAMPLE 17 | 1.205 | −2.368 | 25.4 | 0.0157 | 2.52 |

|  | FORMULA (6), (6') \|FFW(4,5)/L\| | FORMULA (7), (7'), (7") \|(FFT(4,5) − FFW(4,5))/L\| | FORMULA (8), (8') f2/f3 | FORMULA(9) Bf/fw |
|---|---|---|---|---|
| EXAMPLE 1 | 0.124 | 0.038 | 0.484 | 1.51 |
| EXAMPLE 2 | 0.110 | 0.035 | 0.559 | 1.61 |
| EXAMPLE 3 | 0.115 | 0.046 | 0.760 | 1.73 |
| EXAMPLE 4 | 0.118 | 0.039 | 0.582 | 1.69 |
| EXAMPLE 5 | 0.091 | 0.030 | 0.550 | 1.52 |
| EXAMPLE 6 | 0.129 | 0.048 | 0.645 | 1.49 |
| EXAMPLE 7 | 0.102 | 0.043 | 0.647 | 1.46 |
| EXAMPLE 8 | 0.121 | 0.036 | 0.690 | 1.66 |
| EXAMPLE 9 | 0.125 | 0.053 | 0.745 | 1.33 |
| EXAMPLE 10 | 0.129 | 0.053 | 0.876 | 1.22 |
| EXAMPLE 11 | 0.101 | 0.031 | 0.642 | 1.73 |
| EXAMPLE 12 | 0.120 | 0.038 | 0.491 | 1.51 |
| EXAMPLE 13 | 0.114 | 0.047 | 0.719 | 1.73 |
| EXAMPLE 14 | 0.095 | 0.042 | 0.539 | 1.71 |
| EXAMPLE 15 | 0.100 | 0.042 | 0.554 | 1.69 |
| EXAMPLE 16 | 0.103 | 0.049 | 0.621 | 1.463 |
| EXAMPLE 17 | 0.089 | 0.050 | 0.798 | 1.233 |

What is claimed is:

1. A zoom lens for projection comprising:
a first lens group having negative refractive power;
a second lens group having positive refractive power;
a third lens group having positive refractive power;
a fourth lens group; and
a fifth lens group having positive refractive power, which are sequentially arranged from the magnification side of the zoom lens,
wherein the first lens group and the fifth lens group are fixed, and the second lens group, the third lens group and the fourth lens group move along the optical axis of the zoom lens when magnification of the zoom lens is changed, and
wherein each of the first lens group and the second lens group is composed of two lenses, and
wherein each of the third lens group and the fifth lens group is composed of a positive lens, and
wherein the fourth lens group is composed of five lenses, and
wherein the reduction side of the zoom lens is telecentric.

2. A zoom lens for projection, as defined in claim 1, wherein the second lens group is composed of two positive lenses, and satisfies the following formulas (1) and (2):

$$0.5 < (R3a+R3b)/(R3a-R3b) \quad (1); \text{ and}$$

$$(R4a+R4b)/(R4a-R4b) \leq -1 \quad (2), \text{ where}$$

R3a: curvature radius of a magnification-side surface of the third lens from the magnification side of the zoom lens, the third lens being the magnification-side lens in the second lens group, R3b: curvature radius of a reduction-side surface of the third lens from the magnification side of the zoom lens, the third lens being the magnification-side lens in the second lens group, R4a: curvature radius of a magnification-side surface of the fourth lens from the magnification side of the zoom lens, the fourth lens being the reduction-side lens in the second lens group, and R4b: curvature radius of a reduction-side surface of the fourth lens from the magnification side of the zoom lens, the fourth lens being the reduction-side lens in the second lens group).

3. A zoom lens for projection, as defined in claim 1, wherein the following formula (6) is satisfied:

$$|FFW(4,5)/L| < 0.2 \quad (6), \text{ where}$$

FFW(4,5): absolute value of distance between a front-side combined focal position of the fourth lens group and the fifth lens group and the most-magnification-side lens surface of the fourth lens group at wide end, and L: absolute value of distance from an apex of a most-magnification-side lens surface in the entire system of the zoom lens to an apex of a most-reduction-side lens surface in the entire system of the zoom lens.

4. A zoom lens for projection, as defined in claim 1, wherein the following formula (7) is satisfied:

$$|(FFT(4,5)-FFW(4,5))/L|<0.2 \quad (7),\text{ where}$$

FFW(4,5): absolute value of distance between a front-side combined focal position of the fourth lens group and the fifth lens group and the most-magnification-side lens surface of the fourth lens group at wide end, FFT(4,5): absolute value of distance between a front-side combined focal position of the fourth lens group and the fifth lens group and the most-magnification-side lens surface of the fourth lens group at tele end, and L: absolute value of distance from an apex of a most-magnification-side lens surface in the entire system of the zoom lens to an apex of a most-reduction-side lens surface in the entire system of the zoom lens.

5. A zoom lens for projection, as defined in claim 1, wherein the following formula (8) is satisfied:

$$0.3<f_2/f_3<1.2 \quad (8),\text{ where}$$

$f_2$: focal length of the second lens group, and
$f_3$: focal length of the third lens group.

6. A zoom lens for projection, as defined in claim 1, wherein the following formula (9) is satisfied:

$$1.0<Bf/fw \quad (9),\text{ where}$$

Bf: back focus in air on the reduction side, and
fw: focal length of the entire system of the zoom lens at wide end.

7. A zoom lens for projection, as defined in claim 1, wherein the first lens group includes at least an aspheric surface.

8. A zoom lens for projection, as defined in claim 1, wherein the first lens group is composed of an aspheric lens and a negative single lens, which are sequentially arranged from the magnification side.

9. A zoom lens for projection, as defined in claim 1, wherein all lenses in the second lens group, the third lens group, the fourth lens group, and the fifth lens group are spherical lenses.

10. A zoom lens for projection, as defined in claim 1, wherein focusing is performed by moving the first lens group in the direction of the optical axis of the zoom lens.

11. A projection-type display apparatus comprising:
a light source;
a light bulb;
an illumination optical unit that guides a light beam from the light source to the light bulb; and
a zoom lens for projection, as defined in claim 1,
wherein the light bulb performs light modulation on the light beam output from the light source, and
wherein the zoom lens for projection projects an image onto a screen.

12. A zoom lens for projection, as defined in claim 1, wherein the fourth lens group is composed of five lenses of a negative lens, a positive lens, a negative lens, a positive lens, and a positive lens, which are sequentially arranged from the magnification side.

13. A zoom lens for projection, as defined in claim 12, wherein the negative lens that is the third lens from the magnification side and the positive lens that is the fourth lens from the magnification side in the fourth lens group are cemented together to form a cemented lens.

14. A zoom lens for projection comprising:
a first lens group having negative refractive power;
a second lens group having positive refractive power;
a third lens group having positive refractive power;
a fourth lens group; and
a fifth lens group having positive refractive power, which are sequentially arranged from the magnification side of the zoom lens,
wherein the first lens group and the fifth lens group are fixed, and the second lens group, the third lens group and the fourth lens group move along the optical axis of the zoom lens when magnification of the zoom lens is changed, and
wherein the reduction side of the zoom lens is telecentric, and
wherein the Abbe number vd of glass material forming all lenses in each of the lens groups is less than or equal to 80, and the most-reduction-side lens in the fourth lens group is a positive lens, and
wherein the following formulas (3) and (4) are satisfied:

$$vd(a)<30 \quad (3);$$

$$0.01<\theta gF(a)-(0.6415-0.001618\times vd(a)) \quad (4),\text{ where}$$

vd(a): Abbe number of the most-reduction-side lens in the fourth lens group,
θgF(a): partial dispersion ratio of the most-reduction-side lens in the fourth lens group when partial dispersion ratio θgF is represented by (Ng−NF)/(NF−NC),
Ng: refractive index of lens glass material for g-line,
NF: refractive index of lens glass material for F-line, and
NC: refractive index of lens glass material for C-line.

15. A zoom lens for projection, as defined in claim 14, wherein the following formula (5) is satisfied:

$$1.5<fa/fw<3.0 \quad (5),\text{ where}$$

fa: focal length of the most-reduction-side lens in the fourth lens group, and
fw: focal length of the entire system of the zoom lens at wide end.

16. A projection-type display apparatus comprising:
a light source;
a light bulb;
an illumination optical unit that guides a light beam from the light source to the light bulb; and
a zoom lens for projection, as defined in claim 14,
wherein the light bulb performs light modulation on the light beam output from the light source, and
wherein the zoom lens for projection projects an image onto a screen.

17. A zoom lens for projection, as defined in claim 14, wherein the fourth lens group is composed of six lenses of a negative lens, a positive lens, a positive lens, a negative lens, a positive lens, and a positive lens, which are sequentially arranged from the magnification side.

18. A zoom lens for projection, as defined in claim 17, wherein the negative lens that is the first lens from the magnification side and the positive lens that is the second lens from the magnification side in the fourth lens group are cemented together to form a cemented lens, and
wherein the negative lens that is the fourth lens from the magnification side and the positive lens that is the fifth lens from the magnification side in the fourth lens group are cemented together to form a cemented lens.

* * * * *